United States Patent
Lamkin et al.

(10) Patent No.: US 7,454,515 B2
(45) Date of Patent: Nov. 18, 2008

(54) PRESENTATION OF MEDIA CONTENT

(75) Inventors: Allan B. Lamkin, San Diego, CA (US); Todd R. Collart, Los Altos, CA (US); Greg Gewickey, Silver City, NM (US)

(73) Assignee: Sonic Solutions, A California corporation, Novato, CA (US)

( * ) Notice: Subject to any disclaimer, the term of this patent is extended or adjusted under 35 U.S.C. 154(b) by 623 days.

(21) Appl. No.: 11/134,794

(22) Filed: May 20, 2005

(65) Prior Publication Data

US 2005/0251749 A1 Nov. 10, 2005

Related U.S. Application Data

(63) Continuation of application No. 09/935,756, filed on Aug. 21, 2001, now Pat. No. 7,178,106, and a continuation-in-part of application No. 09/649,215, filed on Aug. 28, 2000, and a continuation-in-part of application No. 09/644,669, filed on Aug. 24, 2000, now abandoned, which is a continuation-in-part of application No. 09/644,669, filed on Aug. 24, 2000, now abandoned, said application No. 09/935,756 and a continuation-in-part of application No. 09/499,247, filed on Feb. 7, 2000, now Pat. No. 6,529,949, and a continuation-in-part of application No. 09/898,479, filed on Jul. 2, 2001, now Pat. No. 7,346,920, and a continuation-in-part of application No. 09/488,337, filed on Jan. 20, 2000, and a continuation-in-part of application No. 09/488,143, filed on Jan. 20, 2000, now abandoned, and a continuation-in-part of application No. 09/488,613, filed on Jan. 20, 2000, now Pat. No. 6,769,130, and a continuation-in-part of application No. 09/488,155, filed on Jan. 20, 2000, now Pat. No. 6,941,383, and a continuation-in-part of application No. 09/489,600, filed on Jan. 20, 2000, now Pat. No. 7,188,193, and a continuation-in-part of application No. 09/488,614, filed on Jan. 20, 2000, now abandoned, and a continuation-in-part of application No. 09/489,601, filed on Jan. 20, 2000, and a continuation-in-part of application No. 09/489,597, filed on Jan. 20, 2000, and a continuation-in-part of application No. 09/489,596, filed on Jan. 20, 2000, is a continuation-in-part of application No. 09/295,856, filed on Apr. 21, 1999, now abandoned, and a continuation-in-part of application No. 09/296,202, filed on Apr. 21, 1999, now abandoned, and a continuation-in-part of application No. 09/296,098, filed on Apr. 21, 1999, now Pat. No. 6,453,420, and a continuation-in-part of application No. 09/295,688, filed on Apr. 21, 1999, now abandoned, and a continuation-in-part of application No. 09/295,964, filed on Apr. 21, 1999, now Pat. No. 6,665,489, and a continuation-in-part of application No. 09/295,689, filed on Apr. 21, 1999, now Pat. No. 6,405,203, and a continuation-in-part of application No. 09/295,826, filed on Apr. 21, 1999, now abandoned, said application No. 09/935,756 is a continuation-in-part of application No. 09/912,079, filed on Jul. 24, 2001, now abandoned.

(60) Provisional application No. 60/226,758, filed on Aug. 21, 2000, provisional application No. 60/246,652, filed on Nov. 7, 2000, provisional application No. 60/251,965, filed on Dec. 5, 2000, provisional application No. 60/259,075, filed on Dec. 29, 2000, provisional application No. 60/302,778, filed on Jul. 2, 2001, provisional application No. 60/220,397, filed on Jul. 24, 2000, provisional application No. 60/216,822, filed on Jul. 7, 2000, provisional application No. 60/220,400, filed on Jul. 24, 2000.

(51) Int. Cl.
*G06F 13/00* (2006.01)

(52) U.S. Cl. .................. 709/232; 709/219; 709/250

(58) Field of Classification Search ................ 709/217, 709/219, 231, 232, 236, 250
See application file for complete search history.

(56) References Cited

U.S. PATENT DOCUMENTS

| | | |
|---|---|---|
| 4,672,572 A | 6/1987 | Alsberg |
| 4,709,813 A | 12/1987 | Wildt |
| 4,710,754 A | 12/1987 | Montean |
| 4,739,510 A | 4/1988 | Jeffers et al. |

| Patent No. | Date | Inventor |
|---|---|---|
| 4,785,472 A | 11/1988 | Shapiro |
| 4,888,638 A | 12/1989 | Bohn |
| 4,967,185 A | 10/1990 | Montean |
| 4,993,068 A | 2/1991 | Piosenka et al. |
| 5,023,907 A | 6/1991 | Johnson et al. |
| 5,109,482 A | 4/1992 | Bohrman |
| 5,128,752 A | 7/1992 | Von Kohorn |
| 5,274,758 A | 12/1993 | Beitel et al. |
| 5,289,439 A | 2/1994 | Koulopoulos et al. |
| 5,305,195 A | 4/1994 | Murphy |
| 5,305,197 A | 4/1994 | Axler et al. |
| 5,347,508 A | 9/1994 | Montbriand et al. |
| 5,353,218 A | 10/1994 | De Lapa et al. |
| 5,400,402 A | 3/1995 | Garfinkle |
| 5,410,343 A | 4/1995 | Coddington et al. |
| 5,413,383 A | 5/1995 | Laurash et al. |
| 5,420,403 A | 5/1995 | Allum et al. |
| 5,426,629 A | 6/1995 | Saitou et al. |
| 5,457,746 A | 10/1995 | Dolphin |
| 5,467,329 A | 11/1995 | Hashimoto |
| 5,483,658 A | 1/1996 | Grube et al. |
| 5,509,074 A | 4/1996 | Choudhury et al. |
| 5,530,686 A | 6/1996 | Schylander et al. |
| 5,550,577 A | 8/1996 | Verbiest et al. |
| 5,568,275 A | 10/1996 | Norton et al. |
| 5,617,502 A | 4/1997 | Ort et al. |
| 5,619,024 A | 4/1997 | Kolls |
| 5,619,733 A | 4/1997 | Noe et al. |
| 5,633,946 A | 5/1997 | Lachinski et al. |
| 5,640,453 A | 6/1997 | Schuchman et al. |
| 5,640,560 A | 6/1997 | Smith |
| 5,642,171 A | 6/1997 | Baumgartner et al. |
| 5,651,064 A | 7/1997 | Newell |
| 5,659,792 A | 8/1997 | Walmsley |
| 5,673,195 A | 9/1997 | Schwartz et al. |
| 5,677,953 A | 10/1997 | Dolphin |
| 5,694,546 A | 12/1997 | Reisman |
| 5,696,898 A | 12/1997 | Baker et al. |
| 5,717,879 A | 2/1998 | Moran et al. |
| 5,729,687 A | 3/1998 | Rothrock et al. |
| 5,734,719 A | 3/1998 | Tsevdos et al. |
| 5,734,898 A | 3/1998 | He |
| 5,736,977 A | 4/1998 | Hughes |
| 5,751,672 A | 5/1998 | Yankowski |
| RE35,839 E | 7/1998 | Asai et al. |
| 5,790,753 A | 8/1998 | Krishnamoorthy |
| 5,801,685 A | 9/1998 | Miller et al. |
| 5,802,294 A | 9/1998 | Ludwig et al. |
| 5,804,810 A | 9/1998 | Woolley et al. |
| 5,805,442 A | 9/1998 | Crater et al. |
| 5,805,804 A | 9/1998 | Laursen et al. |
| 5,808,662 A | 9/1998 | Kinney et al. |
| 5,809,250 A | 9/1998 | Kisor |
| 5,809,471 A | 9/1998 | Brodsky |
| 5,812,661 A | 9/1998 | Akiyama et al. |
| 5,818,935 A | 10/1998 | Maa |
| 5,819,284 A | 10/1998 | Farber |
| 5,822,123 A | 10/1998 | Davis et al. |
| 5,822,291 A | 10/1998 | Brindze et al. |
| 5,825,876 A | 10/1998 | Peterson, Jr. |
| 5,850,218 A | 12/1998 | LaJoie et al. |
| 5,857,021 A | 1/1999 | Kataoka et al. |
| 5,860,068 A | 1/1999 | Cook |
| 5,869,819 A | 2/1999 | Knowles et al. |
| 5,872,747 A | 2/1999 | Johnson |
| 5,875,296 A | 2/1999 | Shi et al. |
| 5,878,020 A | 3/1999 | Takahashi |
| 5,878,233 A | 3/1999 | Schloss |
| 5,882,291 A | 3/1999 | Bradshaw et al. |
| 5,883,623 A | 3/1999 | Cseri |
| 5,887,143 A | 3/1999 | Saito et al. |
| 5,889,980 A | 3/1999 | Smith, Jr. |
| 5,892,825 A | 4/1999 | Mages et al. |
| 5,892,900 A | 4/1999 | Ginter et al. |
| 5,892,908 A | 4/1999 | Hughes et al. |
| 5,893,910 A | 4/1999 | Martineau et al. |
| 5,895,073 A | 4/1999 | Moore |
| 5,896,132 A | 4/1999 | Berstis et al. |
| 5,899,980 A | 5/1999 | Wilf et al. |
| 5,907,322 A | 5/1999 | Kelly et al. |
| 5,907,704 A | 5/1999 | Gudmundson et al. |
| 5,909,551 A | 6/1999 | Tahara et al. |
| 5,913,210 A | 6/1999 | Call |
| 5,915,093 A | 6/1999 | Berlin et al. |
| 5,920,694 A | 7/1999 | Carleton et al. |
| 5,922,045 A | 7/1999 | Hanson |
| 5,924,013 A | 7/1999 | Guido et al. |
| 5,930,238 A | 7/1999 | Nguyen |
| 5,930,767 A | 7/1999 | Reber et al. |
| 5,931,906 A | 8/1999 | Fidelibus et al. |
| 5,933,497 A | 8/1999 | Beetcher et al. |
| 5,940,504 A | 8/1999 | Griswold |
| 5,943,304 A | 8/1999 | Kamada et al. |
| 5,945,988 A | 8/1999 | Williams et al. |
| 5,950,173 A | 9/1999 | Perkowski |
| 5,956,482 A | 9/1999 | Agraharam et al. |
| 5,960,398 A | 9/1999 | Fuchigami et al. |
| 5,969,898 A | 10/1999 | Hansen et al. |
| 5,977,964 A | 11/1999 | Williams et al. |
| 5,978,773 A | 11/1999 | Hudetz et al. |
| 5,986,690 A | 11/1999 | Hendricks |
| 5,987,454 A | 11/1999 | Hobbs |
| 5,987,525 A | 11/1999 | Roberts et al. |
| 5,991,374 A | 11/1999 | Hazenfield |
| 5,991,399 A | 11/1999 | Graunke et al. |
| 5,991,798 A | 11/1999 | Ozaki et al. |
| 5,995,965 A | 11/1999 | Experton |
| 6,006,328 A | 12/1999 | Drake |
| 6,009,410 A | 12/1999 | LeMole et al. |
| 6,012,071 A | 1/2000 | Krishna et al. |
| 6,016,166 A | 1/2000 | Huang et al. |
| 6,018,768 A | 1/2000 | Ullman et al. |
| 6,021,307 A | 2/2000 | Chan |
| 6,023,241 A | 2/2000 | Clapper |
| 6,034,937 A | 3/2000 | Kumagai |
| 6,035,329 A | 3/2000 | Mages et al. |
| 6,044,403 A | 3/2000 | Gerszberg et al. |
| 6,047,292 A | 4/2000 | Kelly et al. |
| 6,052,717 A | 4/2000 | Reynolds |
| 6,052,785 A | 4/2000 | Lin et al. |
| 6,055,314 A | 4/2000 | Spies et al. |
| 6,061,057 A | 5/2000 | Knowlton et al. |
| 6,064,979 A | 5/2000 | Perkowski |
| 6,073,124 A | 6/2000 | Krishnan et al. |
| 6,076,733 A | 6/2000 | Wilz, Sr. et al. |
| 6,078,348 A | 6/2000 | Klosterman et al. |
| 6,080,207 A | 6/2000 | Kroening et al. |
| 6,081,785 A | 6/2000 | Oshima et al. |
| 6,083,276 A | 7/2000 | Davidson et al. |
| 6,097,291 A | 8/2000 | Tsai et al. |
| 6,097,814 A | 8/2000 | Mochizuki |
| 6,101,180 A | 8/2000 | Donahue et al. |
| 6,101,534 A | 8/2000 | Rothschild |
| 6,108,002 A | 8/2000 | Ishizaki |
| 6,108,687 A | 8/2000 | Craig |
| 6,119,147 A | 9/2000 | Toomey et al. |
| 6,124,854 A | 9/2000 | Sartain et al. |
| 6,125,388 A | 9/2000 | Reisman |
| 6,128,649 A | 10/2000 | Smith et al. |
| 6,128,652 A | 10/2000 | Toh et al. |
| 6,134,533 A | 10/2000 | Shell |
| 6,134,593 A | 10/2000 | Alexander et al. |
| 6,138,150 A | 10/2000 | Nichols et al. |
| 6,141,010 A | 10/2000 | Hoyle |
| 6,145,006 A | 11/2000 | Vishlitsky et al. |
| 6,154,738 A | 11/2000 | Call |

| Patent No. | Date | Inventor |
|---|---|---|
| 6,154,773 A * | 11/2000 | Roberts et al. ............... 709/219 |
| 6,154,844 A | 11/2000 | Touboul et al. |
| 6,157,953 A | 12/2000 | Chang et al. |
| 6,161,132 A | 12/2000 | Roberts et al. |
| 6,175,842 B1 | 1/2001 | Kirk et al. |
| 6,175,872 B1 | 1/2001 | Neumann et al. |
| 6,182,222 B1 | 1/2001 | Oparaji |
| 6,184,877 B1 | 2/2001 | Dodson et al. |
| 6,189,032 B1 | 2/2001 | Susaki et al. |
| 6,192,340 B1 | 2/2001 | Abecassis |
| 6,195,693 B1 | 2/2001 | Berry et al. |
| 6,199,048 B1 | 3/2001 | Hudetz et al. |
| 6,202,061 B1 | 3/2001 | Khosla et al. |
| 6,208,805 B1 | 3/2001 | Abecassis |
| 6,219,675 B1 | 4/2001 | Pal et al. |
| 6,226,235 B1 | 5/2001 | Wehmeyer |
| 6,229,523 B1 | 5/2001 | Czako |
| 6,230,174 B1 | 5/2001 | Berger et al. |
| 6,230,324 B1 | 5/2001 | Tomita et al. |
| 6,233,618 B1 | 5/2001 | Shannon |
| 6,233,736 B1 | 5/2001 | Wolzien |
| 6,239,793 B1 | 5/2001 | Barnert et al. |
| 6,239,801 B1 | 5/2001 | Chiu et al. |
| 6,240,459 B1 | 5/2001 | Roberts et al. |
| 6,240,555 B1 | 5/2001 | Shoff et al. |
| 6,243,692 B1 | 6/2001 | Floyd et al. |
| 6,246,778 B1 | 6/2001 | Moore |
| 6,259,701 B1 | 7/2001 | Shur et al. |
| 6,263,501 B1 | 7/2001 | Schein et al. |
| 6,263,505 B1 | 7/2001 | Walker et al. |
| 6,282,713 B1 | 8/2001 | Kitsukawa et al. |
| 6,289,165 B1 | 9/2001 | Abecassis |
| 6,298,482 B1 | 10/2001 | Seidman et al. |
| 6,301,661 B1 | 10/2001 | Shambroom |
| 6,308,005 B1 | 10/2001 | Ando et al. |
| 6,321,252 B1 | 11/2001 | Bhola et al. |
| 6,330,719 B1 * | 12/2001 | Zigmond et al. ............ 725/121 |
| 6,331,865 B1 | 12/2001 | Sachs et al. |
| 6,341,375 B1 | 1/2002 | Watkins |
| 6,360,057 B1 | 3/2002 | Tsumagari et al. |
| 6,374,402 B1 | 4/2002 | Schmeidler et al. |
| 6,381,404 B1 | 4/2002 | deCarmo |
| 6,388,714 B1 | 5/2002 | Schein et al. |
| 6,389,467 B1 | 5/2002 | Eyal |
| 6,389,473 B1 | 5/2002 | Carmel et al. |
| 6,405,203 B1 | 6/2002 | Collart |
| 6,415,438 B1 | 7/2002 | Blackketter et al. |
| 6,418,471 B1 | 7/2002 | Shelton et al. |
| 6,426,778 B1 | 7/2002 | Valdez, Jr. |
| 6,449,653 B2 | 9/2002 | Klemets et al. |
| 6,452,609 B1 | 9/2002 | Katinsky et al. |
| 6,453,420 B1 | 9/2002 | Collart |
| 6,453,459 B1 | 9/2002 | Brodersen et al. |
| 6,460,086 B1 | 10/2002 | Swaminathan et al. |
| 6,460,180 B1 | 10/2002 | Park et al. |
| 6,462,754 B1 | 10/2002 | Chakraborty et al. |
| 6,463,468 B1 | 10/2002 | Buch et al. |
| 6,486,891 B1 | 11/2002 | Rice |
| 6,499,057 B1 | 12/2002 | Portuesi |
| 6,505,160 B1 | 1/2003 | Levy et al. |
| 6,505,169 B1 | 1/2003 | Bhagavath et al. |
| 6,510,467 B1 | 1/2003 | Behfar et al. |
| 6,516,467 B1 | 2/2003 | Schindler et al. |
| 6,523,063 B1 | 2/2003 | Miller et al. |
| 6,526,580 B2 | 2/2003 | Shimomura |
| 6,529,949 B1 | 3/2003 | Getsin et al. |
| 6,535,909 B1 | 3/2003 | Rust |
| 6,543,053 B1 | 4/2003 | Li et al. |
| 6,564,255 B1 | 5/2003 | Mobini et al. |
| 6,567,980 B1 | 5/2003 | Jain et al. |
| 6,573,907 B1 | 6/2003 | Madrane |
| 6,580,870 B1 | 6/2003 | Kanazawa et al. |
| 6,591,420 B1 | 7/2003 | McPherson et al. |
| 6,601,103 B1 | 7/2003 | Goldschmidt Iki et al. |
| 6,609,253 B1 | 8/2003 | Swix et al. |
| 6,615,408 B1 | 9/2003 | Kaiser et al. |
| 6,625,656 B2 | 9/2003 | Goldhor et al. |
| 6,636,888 B1 | 10/2003 | Bookspan et al. |
| 6,640,337 B1 | 10/2003 | Lu |
| 6,659,861 B1 | 12/2003 | Faris et al. |
| 6,691,106 B1 | 2/2004 | Sathyanarayan |
| 6,691,126 B1 | 2/2004 | Syeda-Mahmood |
| 6,694,309 B2 | 2/2004 | Cho et al. |
| 6,698,020 B1 | 2/2004 | Zigmond et al. |
| 6,721,748 B1 | 4/2004 | Knight et al. |
| 6,725,281 B1 | 4/2004 | Zintel et al. |
| 6,731,239 B2 | 5/2004 | Wall et al. |
| 6,732,162 B1 | 5/2004 | Wood et al. |
| 6,741,790 B1 | 5/2004 | Burgess |
| 6,760,043 B2 | 7/2004 | Markel |
| 6,769,130 B1 | 7/2004 | Getsin et al. |
| 6,771,290 B1 | 8/2004 | Hoyle |
| 6,803,950 B2 | 10/2004 | Miyamoto et al. |
| 6,865,746 B1 | 3/2005 | Herrington et al. |
| 6,868,225 B1 | 3/2005 | Brown |
| 6,941,383 B1 | 9/2005 | Getsin et al. |
| 6,944,621 B1 | 9/2005 | Collart |
| 6,952,297 B2 | 10/2005 | Rothschild |
| 6,952,697 B1 | 10/2005 | Rothschild |
| 6,959,339 B1 | 10/2005 | Wu et al. |
| 6,976,229 B1 | 12/2005 | Balabanovic et al. |
| 7,024,497 B1 | 4/2006 | Maffezoni |
| 7,043,693 B2 | 5/2006 | Wenzel et al. |
| 7,136,574 B2 | 11/2006 | Ando et al. |
| 7,165,071 B2 | 1/2007 | Fanning et al. |
| 7,165,098 B1 | 1/2007 | Boyer et al. |
| 7,171,480 B2 | 1/2007 | Chatani |
| 7,178,106 B2 | 2/2007 | Lamkin |
| 2001/0001160 A1 | 5/2001 | Shoff |
| 2001/0005903 A1 | 6/2001 | Goldschmidt et al. |
| 2001/0056434 A1 | 12/2001 | Kaplan et al. |
| 2001/0056478 A1 | 12/2001 | Wheeler et al. |
| 2002/0026321 A1 | 2/2002 | Faris et al. |
| 2002/0049978 A1 | 4/2002 | Rodriquez et al. |
| 2002/0056129 A1 | 5/2002 | Blackketter et al. |
| 2002/0057893 A1 | 5/2002 | Wood et al. |
| 2002/0059342 A1 | 5/2002 | Gupta et al. |
| 2002/0073152 A1 | 6/2002 | Andrew et al. |
| 2002/0078144 A1 | 6/2002 | Lamkin |
| 2002/0083377 A1 | 6/2002 | Clauss et al. |
| 2002/0088011 A1 | 7/2002 | Lamkin |
| 2002/0103855 A1 | 8/2002 | Chatani |
| 2002/0143774 A1 | 10/2002 | Vandersluis |
| 2002/0184627 A1 | 12/2002 | Alba et al. |
| 2003/0005461 A1 | 1/2003 | Shinohara |
| 2003/0028892 A1 | 2/2003 | Gewickey |
| 2003/0101232 A1 | 5/2003 | Ullman et al. |
| 2003/0204847 A1 | 10/2003 | Ellis et al. |
| 2004/0010510 A1 | 1/2004 | Hotti |
| 2004/0024889 A1 | 2/2004 | Getsin |
| 2004/0040042 A1 | 2/2004 | Feinleib |
| 2004/0139077 A1 | 7/2004 | Banker |
| 2004/0215755 A1 | 10/2004 | Oneill |
| 2004/0220791 A1 | 11/2004 | Lamkin |
| 2004/0220926 A1 | 11/2004 | Lamkin |
| 2004/0244041 A1 | 12/2004 | Collart |
| 2004/0255236 A1 | 12/2004 | Getsin |
| 2005/0041150 A1 | 2/2005 | Gewickey |
| 2005/0044481 A1 | 2/2005 | Collart |
| 2005/0050208 A1 | 3/2005 | Chatani |
| 2005/0154682 A1 | 7/2005 | Taylor |
| 2005/0166232 A1 | 7/2005 | Lamkin |
| 2005/0182828 A1 | 8/2005 | Lamkin |
| 2005/0193322 A1 | 9/2005 | Lamkin |
| 2005/0198574 A1 | 9/2005 | Lamkin |
| 2005/0223013 A1 | 10/2005 | Jarman |

| | | | |
|---|---|---|---|
| 2005/0240588 | A1 | 10/2005 | Siegel et al. |
| 2005/0251732 | A1 | 11/2005 | Lamkin |
| 2005/0265701 | A1 | 12/2005 | Lamkin et al. |
| 2005/0278435 | A1 | 12/2005 | Lamkin et al. |
| 2005/0278729 | A1 | 12/2005 | Lamkin et al. |
| 2006/0004778 | A1 | 1/2006 | Lamkin et al. |
| 2006/0041639 | A1 | 2/2006 | Lamkin |
| 2006/0041640 | A1 | 2/2006 | Lamkin |
| 2006/0107215 | A1 | 5/2006 | Gewickey |
| 2006/0112336 | A1 | 5/2006 | Gewickey |
| 2006/0117344 | A1 | 6/2006 | Lamkin |
| 2006/0159109 | A1 | 7/2006 | Lamkin |
| 2006/0161635 | A1 | 7/2006 | Lamkin |
| 2006/0181965 | A1 | 8/2006 | Collart |
| 2006/0182424 | A1 | 8/2006 | Lamkin et al. |
| 2006/0184538 | A1 | 8/2006 | Randall |
| 2006/0193606 | A1 | 8/2006 | Lamkin |
| 2006/0195600 | A1 | 8/2006 | Getsin |
| 2007/0094583 | A1 | 4/2007 | Randall |

FOREIGN PATENT DOCUMENTS

| | | |
|---|---|---|
| DE | 42 42 992 A1 | 6/1994 |
| EP | 0 372 716 A2 | 6/1990 |
| EP | 0 762 422 A2 | 3/1997 |
| EP | 0 802 527 A1 | 10/1997 |
| EP | 0 809 244 A2 | 11/1997 |
| EP | 0 814 419 A2 | 12/1997 |
| EP | 0 849 734 A2 | 6/1998 |
| EP | 0 853 315 A2 | 7/1998 |
| EP | 0 809 244 A3 | 12/1998 |
| EP | 0 849 734 A3 | 3/1999 |
| EP | 0 853 315 A3 | 12/1999 |
| JP | 10063562 A2 | 3/1998 |
| JP | 11039262 A2 | 2/1999 |
| JP | 2000236531 | 8/2000 |
| WO | WO 98/47080 | 10/1998 |
| WO | WO 98/58368 | 12/1998 |
| WO | WO 99/14678 | 3/1999 |
| WO | WO 99/51031 | 10/1999 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS

Adams et al., "Distributed Research Terms: Meeting Asynchronously in Virtual Space" FX Palo Alto Laboratory, Inc. JCMC, Jun. 1999.
Manohar et al., "Replay by Re-execution: a Paradigm for Asynchronous Collaboration via Record and Replay of of Interactive Multimedia Sessions" SIGOIS Bulletin, Dec. 1994.
Minneman et al., "A Confederation of Tools for Capturing and Accessing Collaborative Activity" ACM Multimedia 95-Electronic Proceedings, Nov. 1995.
Office Action from U.S. Appl. No. 09/295,964 dated Jun. 6, 2001.
Office Action from U.S. Appl. No. 09/489,601 dated Oct. 4, 2007.
Examiner's Answer to Appeal Brief from U.S. Appl. No. 09/489,597 dated Feb. 25, 2008.
Office Action from U.S. Appl. No. 09/489,596 dated Mar. 6, 2008.
Notice of Allowance from U.S. Appl. No. 09/898,479 dated Oct. 3, 2007.
Notice of Allowance from U.S. Appl. No. 10/190,307 dated Feb. 22, 2008.
Office Action from U.S. Appl. No. 10/860,351 dated Feb. 29, 2008.
Office Action from U.S. Appl. No. 10/860,350 dated Oct. 17, 2007.
Office Action from U.S. Appl. No. 10/860,350 dated Feb. 19, 2008.
Office Action from U.S. Appl. No. 10/123,816 dated Nov. 14, 2007.
Office Action from U.S. Appl. No. 10/957,377 dated Mar. 18, 2008.
Office Action from U.S. Appl. No. 11/060,638 dated May 16, 2007.
Office Action from U.S. Appl. No. 11/060,638 dated Nov. 13, 2007.
Office Action from U.S. Appl. No. 11/136,627 dated Feb. 29, 2008.
Office Action from U.S. Appl. No. 11/134,756 dated Apr. 16, 2008.
Notice of Allowance from U.S. Appl. No. 11/154,092 dated Sep. 21, 2007.
Notice of Allowance from U.S. Appl. No. 11/154,092 dated Jan. 24, 2008.
Office Action for 111324091 dated Mar. 11, 2008.
Office Action from U.S. Appl. No. 11/323,403 dated Apr. 14, 2008.
Office Action from U.S. Appl. No. 11/278,402 dated Dec. 10, 2007.
Office Action from U.S. Appl. No. 11/278,401 dated Jan. 18, 2008.
International Preliminary Report on Patentability; PCT/US2005/045521 (86673pct); issued Jun. 26, 2007.
Wikipedia.org; "Compact Disc"; http://en.wikipedia.org/wiki/Compact Disc; Feb. 15, 2008.
Optical Storage Technology Association; "CD-R &CD-RW Questions & Answers"; *OSTA-4 Revision 2.00*; Jul. 15, 1997.
"Rainbow Technologies Announces SentinelExpress 2.0 for Software Purchasing and Activation Over the Internet"; *Business Wire*; Nov. 17, 1998.
Patel, P.; "XML: Extensible Markup Language", *Database Programming &Design*; Jul. 1998.
Esposito, D.; "Introduction to XML"; *DNJ Online*; Jul. 1999.
Curtin, M.; "PCFriendly Enables DVD Backchannels", *Interhack*; Feb. 28, 2002.
Jacso, P.; "Real-Time Audio is Now Online for Real", Multimedia Medley; Mar. 1996.
Tivo FAQ; *Internet Wayback Machine (archive org)*; Aug. 15, 2000.
U.S. Appl. No. 09/649,215, filed Aug. 28, 2000, Lamkin.
U.S. Appl. No. 09/476,190, filed Jan. 3, 2000, Collart.
U.S. Appl. No. 09/488,345, filed Jan. 20, 2000, Collart.
U.S. Appl. No. 09/488,337, filed Jan. 20, 2000, Getsin.
U.S. Appl. No. 09/488,155, filed Jan. 20, 2000, Getsin.
U.S. Appl. No. 09/489,600 filed Jan. 20, 2000, Getsin.
U.S. Appl. No. 09/488,614 filed Jan. 20, 2000, Getsin.
U.S. Appl. No. 09/489,601 filed Jan. 20, 2000, Getsin.
U.S. Appl. No. 09/489,597 filed Jan. 20, 2000, Getsin.
U.S. Appl. No. 09/489,596 filed Jan. 20, 2000, Collart.
E Media Professional Reviews, NSM Galaxy Jukebox, by David Doering, Emedia Professional, Apr. 1999, (p. 78-80), http://www.emediapro.com/EM1999/doering4.html.
"Interactive Education: Transitioning CD-ROMs to the Web", by Michael Mascha and Gary Seaman, Department of Anthropology, University of Southern California, Los Angeles, California, USA, Computer Networks and ISDN Systems 27 (1994) 267-272.
"Active Video Watching Using Annotation," by Nuno Correia and Teresa Chambel, ACM Digital Library, International Multimedia Conference, Oct. 30-Nov. 5, 1999, in Orlando, Florida.
"No Modern Needed: TV Signals Bring the Web to Your PC," by Michael S. Lasky, Computing Storypage, CNN IDG.net, May 19, 1998.
"All About DIVX, Where the Facts are Told and the Decision is Yours!" Webmaster's Note Jan. 26, 1999, http://www.prodivx.com.
Advanced Television Enhancement Forum Specification (ATVEF), Comment Draft Version 1.0r1, 1-20 copy of printout from web site Http://www.atvef.com/atvef_spec/TVE-public.htm (Oct. 18, 1998).
MBONE Multicasting Tomorrow's Internet, Request for Comments (RFC) 1112 and 1458, Appendices A and B, Copyright 1996, 1998.
Abstract of "MBone Provides Audio and Video Across the Internet," M. R. Macedonia and D. P. Brutzman, IEEE Computer, vol. 27, No. 4, pp. 30-36 (Apr. 1994).
Family Tree Maker Announces 5.0 Patch, by Rick Roberts, The Global Gazette, http://globalgazette.net.gaztec/gaztec15.htm, posted Sep. 7, 1998, vol. II, No. 13.
"When Signed, Sealed, Delivered, It's Yours," by Precision Marketing, p30(1), Jul. 21, 1997.
http://www.spinware.net/portanet/portanet.html, printed on Jan. 8, 2003.
Abstract of Edgar Weippl's , "An Approach to Role-Based Access Control for Digital Content," 2001, IEEE, pp. 290-294.
Henry M. Gladney, "Safeguarding Digital Library Contents and Users: Document Access Control," Dlib Magazine, http://www.dlib.org/dlib/june97/ibm/06gladdney.html, Jun. 1997.

"All power to the Web; CD-ROM is dead—or is it?" by Richard Reisman, President, Teleshuttle Corporation, Jan. 1996 Teleshuttle white paper on Distributed Media, http://www.teleshuttle.com/tsdistrib.htm.

"CyberMedia Secures Major Licensing Agreement With Sony for Oil Change Software," http://www.cypbermedia.com/company.pr/sony.html, Nov. 26, 2001.

MarketScape's WebCD Pro Publisher, Ron Gustavson, Emedia Professional, Dec. 1997, http://www.emediative.com/awards/award11.html.

"Hybrid CD-ROM/Online Titles Will Surge in 1996," DCD Business, Apr. 1996, http://www.tapediscbusiness.com/issues/1996/0496/apr index.html.

PC Magazine, "Trends Online: Intel's Internet Plans: Hybrid Applications", Jul. 24, 1996.

"Internet tool triggers audio CDs," by Cate C. Corcoran, Jul. 24, 1995, http://www.access.ch/power/infoservices/MacWeek/MacWeek240795.html.

"MarketScape(R) WebCD(TM) 1.0 Bypasses internet Bottlenecks," DialogWeb, Aug. 26, 1996.

"Microsoft Expands Benefits for Site Builder Network Members," Microsoft Press Releases, San Jose, CA, Oct. 29, 1996, http://www.spindia.com/trisoftdesign.Press/SBN/SBNtwkpr.htm.

"CD-ROM/Online Hybrids, The Missing Link?", by Richard R. Reisman, CD-ROM Professional, vol. 8, No. 4, Apr. 1995, http://www.teleshuttle.com/cdpart.htm.

Netstuff postings; Apr. 2-Apr. 6, 1996, Aug. 26-Aug. 30, 1996, Aug. 19-Aug. 23, 1996, Aug. 12-Aug. 16, 1996, edited by James Careless with files from the Newsbytes News Network, http://www.monitor.ca/monitor/issues/vol4iss1/netstuff.html.

"Oil Change software hunts down upgrades," by Bary Cooper. The Orlando Sentinel, Web-Posted Oct. 30, 1996, The Augusta Chronicle Online, http://www.augustachronicle.com/headlines/103196/oil_change.html.

Player 2.0 Product Description, Copyright 1995-2000, InterActual Technologies.

Resource Guide on Distributed Media: Local-CD-ROM/Online/Web, updated Nov. 25, 1996, Richard R. Reisman, President, Teleshuttle, http://www.teleshuttle.com/resource.

"Topic is Veritably Everywhere: CD-ROM, the Web, Intranets, etc.," Seybold Report on Desktop Publishing, vol. 10, No. 7, Copyright 1996 by Seybold Publications, Inc.

"Spin Webs around a CD-ROM: The Next Generation of CD/WEB Hybrids," Richard R. Reisman, President, Teleshuttle Corporation, Mass High Tech, Sep. 2, 1996, http://www.teleshuttle.com/nextgen.htm.

"Update Your Software While You Sleep," Edited by Paul M. Eng, Bits & Bytes, BusinessWeek, Updated Jun. 17, 1996, http://www.businessweek.com/1996/25/b3480140.htm.

"Verity smooths Net searches," by CNET News.com Staff, Tech News—CNET.com, Feb. 20, 1996.

"Video and Audio: Organization and Retrieval in the WWW", White Paper. (1996) http://vosaic.com/corp/papers/www5.html. Http://citeseer.nj.nec.com/chen96video.html.

"Web/CD-ROM hybrids; A working definition," site established Oct. 2, 1998, http://www.philb.com/webcd.htm.

Who's Who Hybrid Internet/CD-ROM Magazine/Catalog, Google cache Nov. 26, 2001, http://www.ecatcorp.com/alpha/mci.htm.

WebCD, Internet Posting, Roger Clarke, Dec. 1, 1996, http://www.anu.edu.au/people/Roger.Clarke/II/WebCD.html.

Re: WebCD, Internet Postings, George Michaelson, Dec. 1, 1996, http://www.anu.edu.au/mail-archives/link/link9612/0003.html and Dec. 2, 1996, http://www.anu.edu.au/mail-archives/link/link9612/0011.html.

Re: WebCD, Internet Posting, Liddy Nevile, Dec. 2, 1996, http://www.anu.edu.au/mail-archives/link/link9612/0010.html.

Re: WebCD, Internet Posting, Rachel Polanskis, Dec. 2, 1996, http://www.anu.edu.au/mail-archives/link/link9612/0013.html.

www.techdirt.com/articles/20030516/1358202.shtml, May 16, 2003.

www.techdirt.com/articles/990616/1020235_F.shtml, Jun. 16, 2003.

"MultiSync: A Synchronization Model for Multimedia Systems," IEEE Journal On Selected Areas in Communications, vol. 14, No. 1, Jan. 1996, pp. 238-248.

"World-Wide Web: a distributed paradigm for global networking"; Heylighen, F., Proceeding SHARE Europe Spring Conference; pp. 355-368; Apr. 18, 1994.

"A Simplified and an Efficient Packet Level Internet Access Control Scheme"; Igbal, MS, et al.; ICCS/ISITA '92; Singapore; IEEE Publications; 1992; pp. 963-967.

"CDLink", Duguid, Brian; The Wire, Apr. 1996, available at http://www.hyperreal.org/~duguid/wirecdlk/html.

"CDLink: Multimedia Liner Notes to Complement Your Music Collection", Mirapaul, Matthew; N.Y. Times (online ed.); Jan. 25, 1996; available at http://is.gseis.ucla/edu/impact/w96/News/News3/0125mirapual.html.

"Voyager CDLink Turns Audio CDs into CD-ROMs"; Press Release, Voyager Co.; (Jul. 12, 1995), available at http://www.voyagerco.com from Jul. 12, 1995 to 1997.

"Net Surf", Wired Magazine, Issue 4.05 (May 1996), available at http://www.wired/com/wired/archive/4.05/net_surf.html.

"Voyager CDLink (VCD) Control Language Reference", available at http:web.archive.org/web/19970213172801/www.voyagerco.com/cdlink/about/vcd_ref/cmdref.html, originally available at http:www.voyagerco.com/cdlink/about/vcd_ref/cmdref/.html on Aug. 8, 1995.

"Labels Link CDs, Web Sites VIa CDLink", Marilyn A. Gillen, Billboard, Jul. 22, 1995, at 58.

HyperLOCK Technologies at a Trade Show at the Jacob K. Javits Convention Center, New York, New York, taken Aug. 1, 1996.

"Hybrid 'Net: CD-ROMs & the Web working in Tandem"; Rosebush, et al.; www.netscapeworld.com/netscapeworld/nw-08-1996/nw-08-hybridcd.html; published Aug. 15, 1996.

"Going Hybrid: The Online CD-ROM Connection"; Stansberry; NEWMEDIA, Jun. 1995, pp. 34-40.

"CD-ROM and Web browsers: HTML as the Lingua Franca", CD-ROM Professional, Aug. 1996, vol. 9, No. 8 at p. 26.

Standard ECMA-130, "Data interchange on read-only 120 mm optical data disks (CD-ROM)", 2nd Edition, Jun. 1996.

"Relative Uniform Resource Locators", Fielding, Jun. 1995, available at http://www.w3.org/Addressing/rfc1808.txt.

"A Beginners Guide to URLs", available at http://archive.ncsa.uiuc.edu/demoweb/url-primer.html.

"Naming and Addressing: URLs, URLs, . . . " Printed Mar. 17, 2004. Available at http://www.w3.org/Addressing/.

Sastry, Chellury R. et al., "Webtour: A System to Record and Playback Dynamic Multimedia Annotations on Web Document Content" Proceedings of the seventh ACM international conference on Multimedia; Oct. 1999, pp. 175-178.

Nkane, et al., Development of combined HDD and recordable-DVD video recorder, consumer Electronics, 2002, IEEE, 2002 Digest of Technical Papers, International Conference on Jun. 18-20, 2002, pp. 264-265.

"Software Distribution by CD-ROM Linked with Network," IBM Technical Disclosure Bulletin, vol. 38, No. 11, Nov. 1, 1995, pp. 111-112.

Re: WebCD, Internet Posting, Ron Ipsen, Dec. 1, 1996, http://www.anu.edu.au/mail-archives/link/link9612/0006.html.

Office Action, "from U.S. Appl. No. 11/154,092 dated May 14, 2007 explaining JP2000236531".

Office Action from U.S. Appl. No. 09/476,190 dated Aug. 27, 2001.

Office Action from U.S. Appl. No. 09/476,190 dated Sep. 15, 2003.

Notice of Allowance from U.S. Appl. No. 09/488,155 dated Oct. 13, 2004.

Office Action from U.S. Appl. No. 09/488,155 dated Jan. 21, 2004.

Office Action from U.S. Appl. No. 09/488,155 dated Jul. 2, 2003.

Office Action from U.S. Appl. No. 09/488,155 dated Jul. 3, 2001.

Advisory Action from U.S. Appl. No. 09/488,614 dated May 20, 2005.

Office Action from U.S. Appl. No. 09/488,614 dated Jan. 12, 2005.

Office Action from U.S. Appl. No. 09/488,614 dated Mar. 15, 2006.

Office Action from U.S. Appl. No. 09/488,614 dated Mar. 29, 2004.

Office Action from U.S. Appl. No. 09/488,614 dated Oct. 5, 2006.

Advisory Action from U.S. Appl. No. 09/489,601 dated Feb. 8, 2005.

Office Action from U.S. Appl. No. 09/489,601 dated Jan. 30, 2004.

Office Action from U.S. Appl. No. 09/489,601 dated Apr. 13, 2007.
Office Action from U.S. Appl. No. 09/489,601 dated Apr. 27, 2006.
Office Action from U.S. Appl. No. 09/489,601 dated Jun. 2, 2005.
Office Action from U.S. Appl. No. 09/489,601 dated Jul. 9, 2004.
Office Action from U.S. Appl. No. 09/489,601 dated Oct. 20, 2004.
Office Action from U.S. Appl. No. 09/489,601 dated Nov. 15, 2005.
Advisory Action from U.S. Appl. No. 09/489,597 dated Jan. 17, 2006.
Office Action from U.S. Appl. No. 09/489,597 dated Apr. 5, 2005.
Office Action from U.S. Appl. No. 09/489,597 dated May 1, 2006.
Office Action from U.S. Appl. No. 09/489,597 dated Jul. 27, 2004.
Office Action from U.S. Appl. No. 09/489,597 dated Oct. 18, 2005.
Office Action from U.S. Appl. No. 09/489,597 dated Oct. 18, 2006.
Office Action from U.S. Appl. No. 09/489,597 dated Dec. 5, 2003.
Advisory Action from U.S. Appl. No. 09/489,596 dated Dec. 27, 2006.
Office Action from U.S. Appl. No. 09/489,596 dated Feb. 11, 2004.
Office Action from U.S. Appl. No. 09/489,596 dated Jun. 14, 2006.
Office Action from U.S. Appl. No. 09/489,596 dated Jun. 30, 2005.
Office Action from U.S. Appl. No. 09/489,596 dated Jul. 8, 2003.
Office Action from U.S. Appl. No. 09/489,596 dated Aug. 2, 2004.
Office Action from U.S. Appl. No. 09/489,596 dated Sep. 13, 2006.
Office Action from U.S. Appl. No. 09/489,596 dated Oct. 3, 2002.
Office Action from U.S. Appl. No. 09/489,596 dated Dec. 14, 2004.
Office Action from U.S. Appl. No. 09/489,596 dated Dec. 29, 2005.
Office Action from U.S. Appl. No. 09/499,247 dated Jul. 3, 2001.
Advisory Action from U.S. Appl. No. 09/898,479 dated Jan. 5, 2007.
Office Action from U.S. Appl. No. 09/898,479 dated Apr. 19, 2007.
Office Action from U.S. Appl. No. 09/898,479 dated Apr. 20, 2006.
Office Action from U.S. Appl. No. 09/898,479 dated Oct. 3, 2006.
Office Action from U.S. Appl. No. 09/898,479 dated Nov. 9, 2005.
Notice of Allowance from U.S. Appl. No. 09/935,756 dated Jun. 29, 2006.
Notice of Allowance from U.S. Appl. No. 09/935,756 dated Sep. 18, 2006.
Office Action from U.S. Appl. No. 09/935,756 dated Feb. 14, 2005.
Office Action from U.S. Appl. No. 09/935,756 dated Jul. 25, 2005.
Notice of Allowance from U.S. Appl. No. 10/190,307 dated Jun. 6, 2007.
Office Action from U.S. Appl. No. 10/190,307 dated Jan. 18, 2007.
Office Action from U.S. Appl. No. 10/190,307 dated Mar. 16, 2006.
Office Action from U.S. Appl. No. 10/190,307 dated Jul. 31, 2006.
Office Action from U.S. Appl. No. 10/860,351 dated Feb. 7, 2007.
Notice of Allowance from U.S. Appl. No. 10/346,726 dated Mar. 12, 2007.
Office Action from U.S. Appl. No. 10/860,350 dated Apr. 3, 2007.
Advisory Action from U.S. Appl. No. 10,880,272 dated Jun. 2, 2006.
Office Action from U.S. Appl. No. 10/880,272 dated Jan. 24, 2007.
Office Action from U.S. Appl. No. 10/880,272 dated Apr. 4, 2006.
Office Action from U.S. Appl. No. 10/880,272 dated Jul. 10, 2007.
Office Action from U.S. Appl. No. 10/880,272 dated Dec. 29, 2005.
Office Action from U.S. Appl. No. 10/957,033 dated Jul. 19, 2007.
Office Action from U.S. Appl. No. 11/060,638 dated Jul. 5, 2007.
http://www.sonic.com/, as printed in year 2007.
http://www.interactual.com/, as printed in year 2007.
PCT/US05/45521 International Search Report dated Jun. 5, 2007.
Advisory Action from U.S. Appl. No. 09/476,190 dated Jun. 17, 2002.
Interview Summary from U.S. Appl. No. 09/476,190 dated Dec. 9, 2003.
Office Action from U.S. Appl. No. 09/476,190 dated Feb. 17, 2005.
Office Action from U.S. Appl. No. 09/476,190 dated Mar. 22, 2004.
Notice of Allowance from U.S. Appl. No. 09/488,613 dated Jan. 13, 2004.
Office Action from U.S. Appl. No. 09/488,613 dated Jun. 5, 2003.
Office Action from U.S. Appl. No. 09/488,613 dated Jun. 17, 2004.
Notice of Allowance from U.S. Appl. No. 09/499,247 dated Oct. 1, 2002.
Office Action from U.S. Appl. No. 09/499,247 dated Apr. 26, 2002.
Advisory Action from U.S. Appl. No. 09/649,215 dated Nov. 19, 2003.
Interview Summary from U.S. Appl. No. 09/649,215 dated Feb. 13, 2004.
Interview Summary from U.S. Appl. No. 09/649,215 dated May 25, 2004.
Interview Summary from U.S. Appl. No. 09/649,215 dated Aug. 15, 2005.
Interview Summary from U.S. Appl. No. 09/649,215 dated Sep. 28, 2006.
Interview Summary from U.S. Appl. No. 09/488,337 dated Aug. 5, 2003.
Advisory Action from U.S. Appl. No. 09/489,600 dated Mar. 4, 2004.
Notice of Allowance from U.S. Appl. No. 09/489,600 dated May 31, 2005.
Interview Summary from U.S. Appl. No. 09/489,601 dated Dec. 29, 2004.
Interview Summary from U.S. Appl. No. 09/489,597 dated Sep. 8, 2004.
Interview Summary from U.S. Appl. No. 09/489,597 dated Oct. 18, 2005.
Interview Summary from U.S. Appl. No. 09/489,597 dated Oct. 18, 2006.
Notice of Allowance from U.S. Appl. No. 09/935,756 dated Oct. 2, 2006.
Advisory Action from U.S. Appl. No. 09/489,596 dated Sep. 21, 2005.
Interview Summary from U.S. Appl. No. 09/488,614 dated Jul. 27, 2005.
Office Action from U.S. Appl. No. 10/880,272 dated Jun. 30, 2005.
Office Action from U.S. Appl. No. 09/295,856 dated Mar. 23, 2000.
Office Action from U.S. Appl. No. 09/295,856 dated Apr. 9, 2001.
Office Action from U.S. Appl. No. 09/295,856 dated Nov. 9, 2001.
Office Action from U.S. Appl. No. 09/295,856 dated Dec. 11, 2000.
Office Action from U.S. Appl. No. 09/296,202 dated Nov. 1, 2001.
Office Action from U.S. Appl. No. 09/295,964 dated Dec. 22, 2000.
Office Action from U.S. Appl. No. 09/488,143 dated May 22, 2001.
Office Action from U.S. Appl. No. 09/488,143 dated Dec. 14, 2000.
"http://www.virtualtourguide.net, "Self-Guided Tour of Yellowstone"", *Virtual Tour Guide, LLC, first printed Jul. 3, 2007, 3 pages*, (Jul. 3, 2007), 3 pages.
Office Action from U.S. Appl. No. 09/649,215 dated Feb. 13, 2004.
Office Action from U.S. Appl. No. 09/649,215 dated Mar. 28, 2006.
Office Action from U.S. Appl. No. 09/649,215 dated Apr. 4, 2003.
Office Action from U.S. Appl. No. 09/649,215 dated Apr. 21, 2005.
Office Action from U.S. Appl. No. 09/649,215 dated Aug. 16, 2004.
Office Action from U.S. Appl. No. 09/649,215 dated Aug. 26, 2003.
Office Action from U.S. Appl. No. 09/649,215 dated Sep. 28, 2006.
Office Action from U.S. Appl. No. 09/649,215 dated Oct. 17, 2005.
Notice of Allowance from U.S. Appl. No. 09/476,190 dated Feb. 25, 2004.
Office Action from U.S. Appl. No. 09/476,190 dated Mar. 25, 2003.
Office Action from U.S. Appl. No. 09/476,190 dated Apr. 10, 2002.
Office Action from U.S. Appl. No. 09/476,190 dated Jun. 17, 2002.
Office Action from U.S. Appl. No. 09/476,190 dated Oct. 1, 2002.
Office Action from U.S. Appl. No. 09/488,345 dated Mar. 29, 2004.
Advisory Action from U.S. Appl. No. 09/488,337 dated Jul. 29, 2004.
Advisory Action from U.S. Appl. No. 09/488,337 dated Aug. 21, 2003.
Advisory Action from U.S. Appl. No. 09/488,337 dated Aug. 24, 2006.
Examiner Answer to Appeal Brief from U.S. Appl. No. 09/488,337 dated Apr. 18, 2007.
Office Action from U.S. Appl. No. 09/488,337 dated Jan. 15, 2003.
Office Action from U.S. Appl. No. 09/488,337 dated Feb. 14, 2006.
Office Action from U.S. Appl. No. 09/488,337 dated Mar. 4, 2004.
Office Action from U.S. Appl. No. 09/488,337 dated May 6, 2005.
Office Action from U.S. Appl. No. 09/488,337 dated May 29, 2003.
Office Action from U.S. Appl. No. 09/488,337 dated Jun. 1, 2006.
Office Action from U.S. Appl. No. 09/488,337 dated Oct. 19, 2005.
Office Action from U.S. Appl. No. 09/488,337 dated Oct. 21, 2004.
Office Action from U.S. Appl. No. 09/488,337 dated Oct. 24, 2003.
Notice of Allowance from U.S. Appl. No. 09/489,600 dated Aug. 2, 2006.
Notice of Allowance from U.S. Appl. No. 09/489,600 dated Sep. 7, 2006.

Notice of Allowance from U.S. Appl. No. 09/489,600 dated Oct. 24, 2006.
Office Action from U.S. Appl. No. 09/489,600 dated Mar. 2, 2005.
Office Action from U.S. Appl. No. 09/489,600 dated Jun. 17, 2003.
Office Action from U.S. Appl. No. 09/489,600 dated Jul. 29, 2004.
Office Action from U.S. Appl. No. 09/489,600 dated Nov. 14, 2003.
Office Action from U.S. Appl. No. 09/489,600 dated Dec. 3, 2002.
Advisory Action from U.S. Appl. No. 09/488,155 dated Apr. 15, 2004.

\* cited by examiner

*Primary Examiner*—Viet Vu
(74) *Attorney, Agent, or Firm*—Fitch, Even, Tabin & Flannery

(57) ABSTRACT

A media services interface for use in a readable medium playback device enables synchronization of disparate media playback, network directed playback of media, media playback control via displayed html/javascript file, logging of consumer identifier, media identifier, and playback device identifier in a cookie or log file. The media services comprises a command handler, a properties handler, an event generator, a cookie manager, a navigator state module, an identifier engine, an initialization module, and a bookmark manager. The command handler executes commands received from a connected network, a displayed html/javascript file, etc. The properties handler provides information relating to system states in response to queries including the status of any network connections. The event generator generates events in response to predetermined system occurrences. The cookie manager records information for later reading including the tracking of consumer identifier, playback device identifier, and readable medium identifier triples. The navigator state module maintains information regarding the state of the playback device and the interaction with the readable medium. The identifier engine carries out determination of the identity of the readable medium. The initialization module controls system initialization. The bookmark manager generates bookmarks which preserve positions in the playback of the readable medium for later recall. Network sources can provide media content and issue commands which synchronize the playback of both network and readable medium originated content over multiple playback devices through the use of the synchronization abilities of the media services.

29 Claims, 15 Drawing Sheets

PRESENTATION OF MEDIA CONTENT

The present patent document is a continuation of U.S. patent application Ser. No. 09/935,756, filed Aug. 21, 2001, now U.S. Pat. No. 7,178,106 of Lamkin, et al, entitled PRESENTATION OF MEDIA CONTENT FROM MULTIPLE MEDIA SOURCES, which is a non-provisional of provisional application Ser. No. 60/226,758, filed Aug. 21, 2000; and a non-provisional of provisional application Ser. No. 60/246,652, filed Nov. 7, 2000; and a non-provisional of provisional application Ser. No. 60/251,965, filed Dec. 5, 2000; and a non-provisional of provisional application Ser. No. 60/259,075, filed Dec. 29, 2000; and a non-provisional of provisional application Ser. No. 60/302,778, filed Jul. 2, 2001; and a continuation-in-part of application Ser. No. 09/644,669, filed Aug. 24, 2000; now abandoned and a continuation-in-part of application Ser. No. 09/649,215, filed Aug. 28, 2000, which is a continuation-in-part of application Ser. No. 09/644,669, filed Aug. 24, 2000, now abandoned which is a non-provisional of provisional application Ser. No. 60/220,397, filed Jul. 24, 2000; and a continuation-in-part of application Ser. No. 09/295,856, filed Apr. 21, 1999 now abandoned; and a continuation-in-part of application Ser. No. 09/296,202, filed Apr. 21, 1999; now abandoned and a continuation-in-part of application Ser. No. 09/296,098, filed Apr. 21, 1999; now U.S. Pat. No. 6,453,420 and a continuation-in-part of application Ser. No. 09/295,688, filed Apr. 21, 1999; now abandoned and a continuation-in-part of application Ser. No. 09/295,964, filed Apr. 21, 1999; now U.S. Pat. No. 6,665,489 and a continuation-in-part of application Ser. No. 09/295,689, filed Apr. 21, 1999; now U.S. Pat. No. 6,405,203 and a continuation-in-part of application Ser. No. 09/295,826, filed Apr. 21, 1999; now abandoned and a continuation-in-part of application Ser. No. 09/476,190, filed Jan. 3, 2000; now U.S. Pat. No. 6,944,621 and a continuation-in-part of application Ser. No. 09/488,345, filed Jan. 20, 2000; and a continuation-in-part of application Ser. No. 09/488,337, filed Jan. 20, 2000; and a continuation-in-part of application Ser. No. 09/488,143, filed Jan. 20, 2000; now abandoned and a continuation-in-part of application Ser. No. 09/488,613, filed Jan. 20, 2000; now U.S. Pat. No. 6,679,130 and a continuation-in-part of application Ser. No. 09/488,155, filed Jan. 20, 2000; now U.S. Pat. 6,941,383 and a continuation-in-part of application Ser. No. 09/489,600, filed Jan. 20, 2000; now U.S. Pat. No. 7,188,193 and a continuation-in-part of application Ser. No. 09/488,614, filed Jan. 20, 2000; now abandoned and a continuation-in-part of application Ser. No. 09/489,601, filed Jan. 20, 2000; and a continuation-in-part of application Ser. No. 09/489,597, filed Jan. 20, 2000; and a continuation-in-part of application Ser. No. 09/489,596, filed Jan. 20, 2000; and a continuation-in-part of application Ser. No. 09/499,247, filed Feb. 7, 2000; now U.S. Pat. No. 6,529,949 and a continuation-in-part of application Ser. No. 09/898,479, filed Jul. 2, 2001, now U.S. Pat. No. 7,346,920 which is a non-provisional of provisional patent application Ser. No. 60/216,822, filed Jul. 7, 2000; and a continuation-in-part of application Ser. No. 09/912,079, filed Jul. 24, 2001, now abandoned which is a non-provisional of provisional patent application Ser. No. 60/220,400, filed Jul. 24, 2000.

All of the above-referenced patent documents are hereby expressly incorporated herein by reference as if set forth in their entirety.

FIELD OF THE INVENTION

The present invention relates to the presentation of multimedia content, and more particularly to the presentation of locally stored media content combined with remote interactively-obtained network media content.

BACKGROUND OF THE INVENTION

In marketing, many things have been long recognized as aiding success, such as increasing customer satisfaction through such devices as providing personalized service, fast service, access to related or updated information, etc. Traditional marketing has made use such things as notice of promotional offers for related products such as providing coupons, etc. Additionally, some studies have shown that simple repeated brand exposure, such as by advertisement, increases recognition and sales.

One of the largest marketing industries today is the entertainment industry and related industries. To date, digital versatile disks (DVDs) are poised to encompass consumer sales of home entertainment, business and home computer industry, and business information market with a single digital format, eventually replacing audio CDs, videotapes, laserdiscs, CD-ROMs, and video game cartridges. To this end, DVD has widespread support from all major electronics companies, all major computer hardware companies, and all major movie and music studios.

Currently, the fastest growing marketing and informational access avenue is the Internet. The share of households with Internet access in the U.S. soared by 58% in two years, rising from 26.2% in December 1998 to 41.5% in August 2000 (Source: Falling Through the Net: Toward Digital Inclusion@ by the National Telecommunications and Information Administration, October 2000).

Some initial efforts have been made to integrate the success of optical disks, such as the DVD, with the speed and accessibility of the Internet. Programs such as music players currently are able to access the internet to obtain artist information, order music, etc. for inserted disks. However, in the DVD-video arena, little has been done to utilize the vast power for up-to-date, new, and promotional information accessibility to further the aims of improving marketability and customer satisfaction.

Accordingly, it is evident that improvements are possible in the way that entertainment, computing, and academic disks have been supported.

SUMMARY OF THE INVENTION

The present invention advantageously addresses the needs mentioned previously as well as other needs by providing an application programming interface that facilitates the access and use of related or updated web content to provide augmented or improved content with playback of DVD content.

In one embodiment, the invention can be characterized as an integrated system for combining web content and disk content comprising: a display; a computing device operably coupled to a removable media, a network and the display, the computing device at least once accessing data on the network, the computing device comprising: a storage device, a browser having a presentation engine displaying content on the display, an application programming interface residing in the storage device, a decoder at least occasionally processing content received from the removable media and producing media content substantially suitable for display on the display, and a navigator coupled to the decoder and the application programming interface, the navigator facilitating user or network-originated control of the playback of the removable media, the computing device receiving network content from the network and combining the network content with the media content, the presentation engine displaying the combined network content and media content on the display.

In another embodiment, the invention can be characterized as a method comprising: a) receiving a removable media; b) checking if said removable media supports media source integration; c) checking if said removable media source is a DVD responsive to said removable media supporting source integration; d) checking whether said device is in a movie mode or a system mode responsive to said removable media being a DVD; e) launching standard playback and thereafter returning to said step (a) responsive to said device being in said movie mode; f) checking if said device has a default player mode of source integration when said device is in said system mode; g) launching standard playback and thereafter returning to said step (a) responsive to said device not having a default player mode of source integration; h) checking if said removable media contains a device-specific executable program when said device having a default player mode of source integration; i) executing said device-specific executable program when said device has said device-specific executable program and thereafter returning to said step (a); j) checking whether said device has a connection to a remote media source; k) launching a default file from said removable media when said device does not have a remote media source connection and thereafter returning to said step (a); l) checking whether said remote media source has content relevant to said removable media; m) displaying said relevant content when said relevant content exists and thereafter returning to said step (a); n) otherwise launching a default file from said removable media and thereafter returning to said step (a); o) returning to said step (f).

DETAILED DESCRIPTION OF THE DRAWINGS

Figure 1:
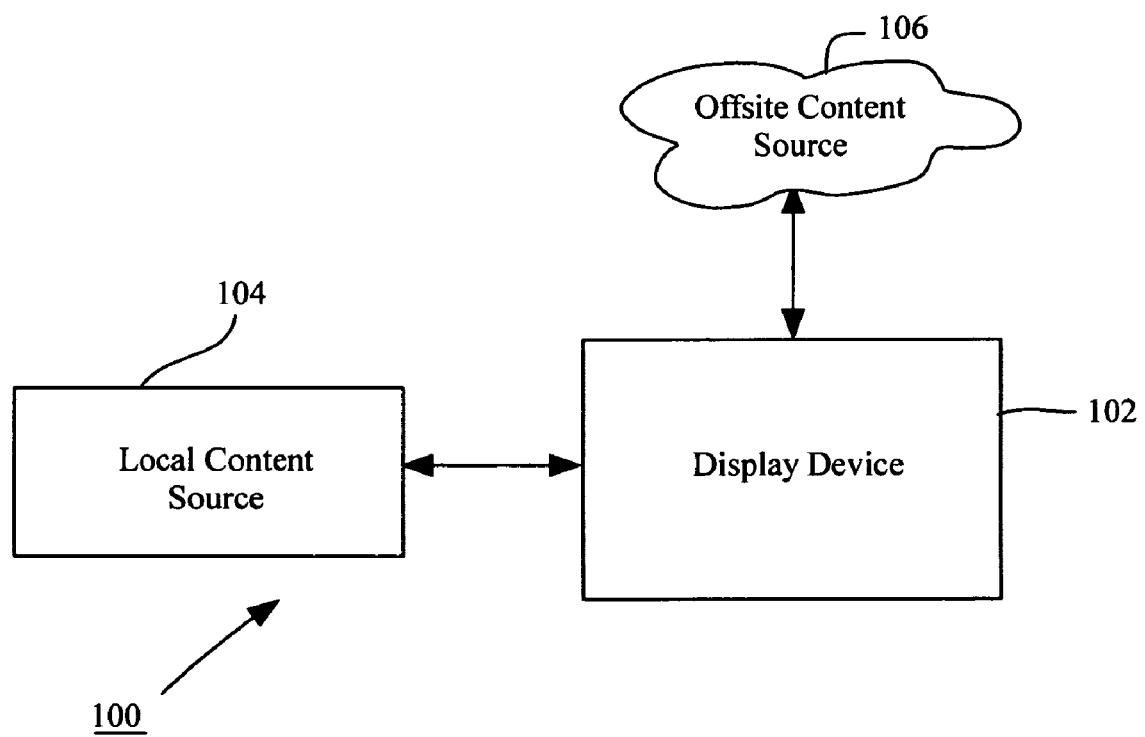
FIG. 1 shows a general example of a display device receiving content from local and offsite sources according to one embodiment.

The following non-patent documents are hereby incorporated by reference as if set forth in their entirety: InterActual API Design Guidelines for Consumer Electronics Manufacturers; InterActual Application programming interface (API) Specification (also called InterActual API Specification).

An application programming interface (API) of the present embodiment is based on a scripting model, leveraging, e.g., industry standard HTML and JavaScript standards for integrating locally stored media content and remote interactively-obtained network media content, e.g., video content on a web page. The application programming interface (API) enables embedding, e.g., video content in web pages and can display the video in full screen or sub window format. Commands can be executed to control the playback, search, and overall navigation through the embedded content.

Additionally, the application programming interface can be queried and/or set by the use of properties. Effects may be applied to playback. Video sequences have an associated time element during playback, and events are triggered to provide notification of various playback conditions, such as time changes, title changes, and user operation (UOP) changes. Events can be used for use in scripting and synchronizing video with HTML or read only memory (ROM)-based content.

A goal of the application programming interface (API) is to enable content developers to create products that seamlessly combine, e.g., the Internet with content from other digital versatile disk-read only memory (DVD-ROM), digital versatile disk-audio (DVD-Audio), and compact disc-audio (CD-Audio). Hereinafter, by the use of DVD-Video, it is to be understood that all three of these disk/disc media are included. The combination of the Internet with DVD-Video creates a richer, more interactive, and personalized entertainment experience for users.

Further, the application programming interface (API) provides a common programming interface allowing playback of this combined content on multiple playback platforms simultaneously. While the application programming interface (API) allows customized content and functions tailored for specific platforms, the primary benefit of the application programming interface (API) is that content developers can create content once for multi-platform playback, without the need of becoming an expert programmer on specific platforms, such as Windows, Macintosh, and other platforms. The document InterActual Usage Guide for Developers (hereby incorporated by reference) describes this in more detail for DVD content developers.

Internet connectivity is not a requirement for the use of the application programming interface (API). Stand-alone systems with web browser functionality are all that is required. In addition, compact disc-digital audio (CD-DA) can also be enhanced by use of the application programming interface (API). This is also described in the document InterActual Usage Guide for Developers (hereby incorporated by reference).

Personal video recorders (PVRs), such as the TiVo, RePlay, and digital versatile disk-recordable (DVD-R) devices, enable the ability to purchase video or audio products by downloading them from a satellite or other high-bandwidth system when implemented with the present invention. When so downloaded, the video or audio can be stored to a local disk system or burned onto a DVD-R.

The application programming interface (API) provides a basic set of guidelines for the production of internet-connected DVDs and for the playback of these enhanced DVDs on a range of computer, set-top platforms, and players. Based on the industry standard publishing format hypertext markup language (HTML) and JavaScript, the application programming interface (API) provides a way to easily combine DVD-Video, DVD-Audio, and CD-Audio with and within HTML pages, whereby HTML pages can control the media's playback. The application programming interface (API) provides a foundation for bringing content developers, consumer electronics manufacturers, browser manufacturers, and semiconductor manufacturers together to provide common development and playback platforms for enhanced DVD content.

Regarding FIG. 1, shown is a general example of a display device receiving content from local and offsite sources according to one embodiment.

Shown are a display device (102), a local content source (104), and an offsite content source (106).

The display device (102) is coupled to the local content source (104) as shown by a bi-directional arrow. The display device (102) is coupled to the offsite content source (106) as shown by a bidirectional arrow.

In operation, the display device (102) displays video and/or hypertext markup language (HTML) documents to a user. In an alternative embodiment, the display device (102) can be audio only. Display device (102) can be any device capable of displaying an external video feed or playing an external audio feed such as, but not limited to, a computer, a set top box, gaming platforms, or a player. The display device (102) receives content for display from either the local content source (104) or the offsite content source (106). The local content source (104), in one embodiment, can be any device capable of playing any media disk including, but not limited to, digital versatile disks (DVDs), digital versatile disk read only memories (DVD-ROMs), compact discs (CDs), compact disc-digital audios (CD-DAs), optical digital versatile disks (optical DVDs), laser disks, DATAPLAY™, streaming media, PVM (Power to Communicate), etc. The offsite content source (106), in one embodiment, can be any device capable of supplying web content or HTML-encoded content such as, but not limited to, a network-connected server or any source on the Internet.

Figure 2:
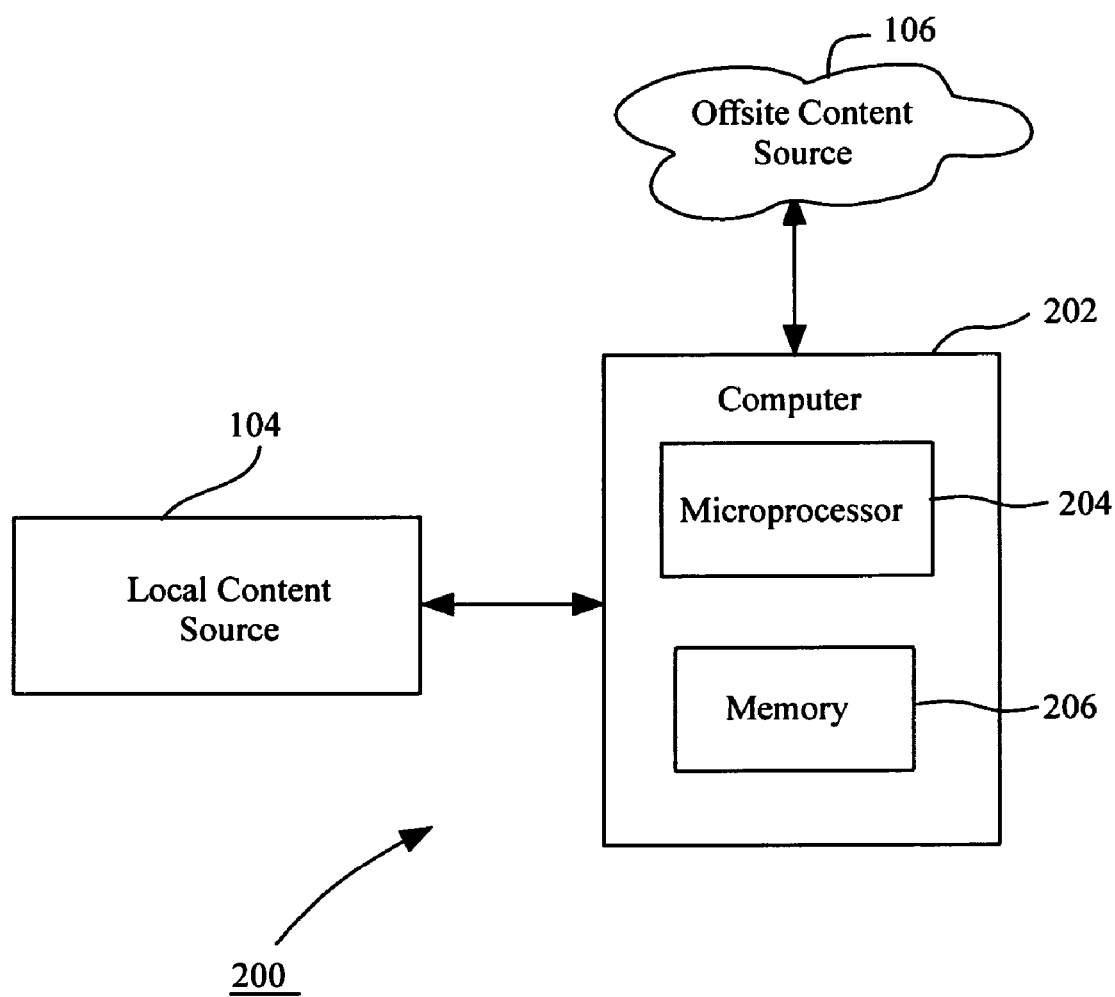
FIG. 2 shows a general example of a computer receiving content from local and offsite sources according to one embodiment.

FIG. 2 shows a general example of a computer receiving content from local and offsite sources according to one embodiment.

Shown are a local content source (104), an offsite content source (106), a computer (202), a microprocessor (204), and a memory (206).

The local content source (104) is coupled to the computer (202). The offsite content source (106) is coupled to the computer (202). The computer (202) includes the microprocessor (204) and the memory (206).

In operation, computer (202) is any computer able to play/display both video or audio provided by the local content source (104) and/or web or HTML content as provided by the offsite content source (106). Additionally, computer (202) can display both video and web/HTML content synchronously according to one embodiment of the present invention. Microprocessor (204) and memory (206) are used by computer (202) in executing software of the present invention.

Figure 3:
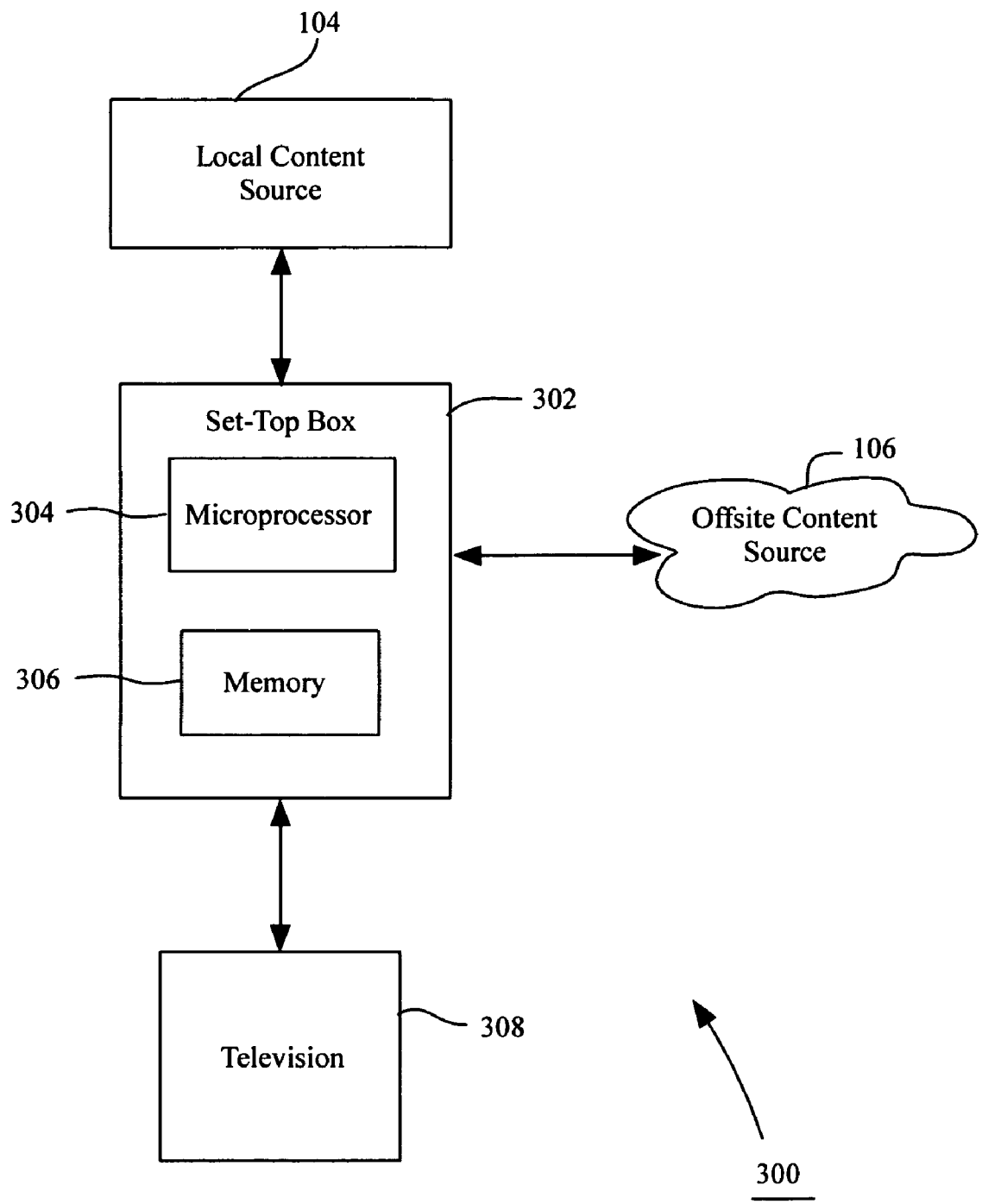
FIG. 3 shows a general example of a television set-top box receiving content from local and offsite sources and according to one embodiment.

FIG. 3 shows an example of a general system 300 comprising a television set-top box receiving content from local and offsite sources and according to one embodiment.

Shown are a local content source (104), an offsite content source (106), a set-top box (302), a microprocessor (304), a memory (306), and a television (308).

In operation, set-top box (302) enables selection between video or audio provided by the local content source (104) and web or HTML content as provided by the offsite content source (106). The set-top box (302) provides selected content to television (308) for display. Additionally, set-top box (302) can combine both video and web/HTML content synchronously according to one embodiment of the present invention and provide the same to television (308) for display. Microprocessor (304) and memory (306) are used by computer (202) in executing software of the present invention.

Figure 4:
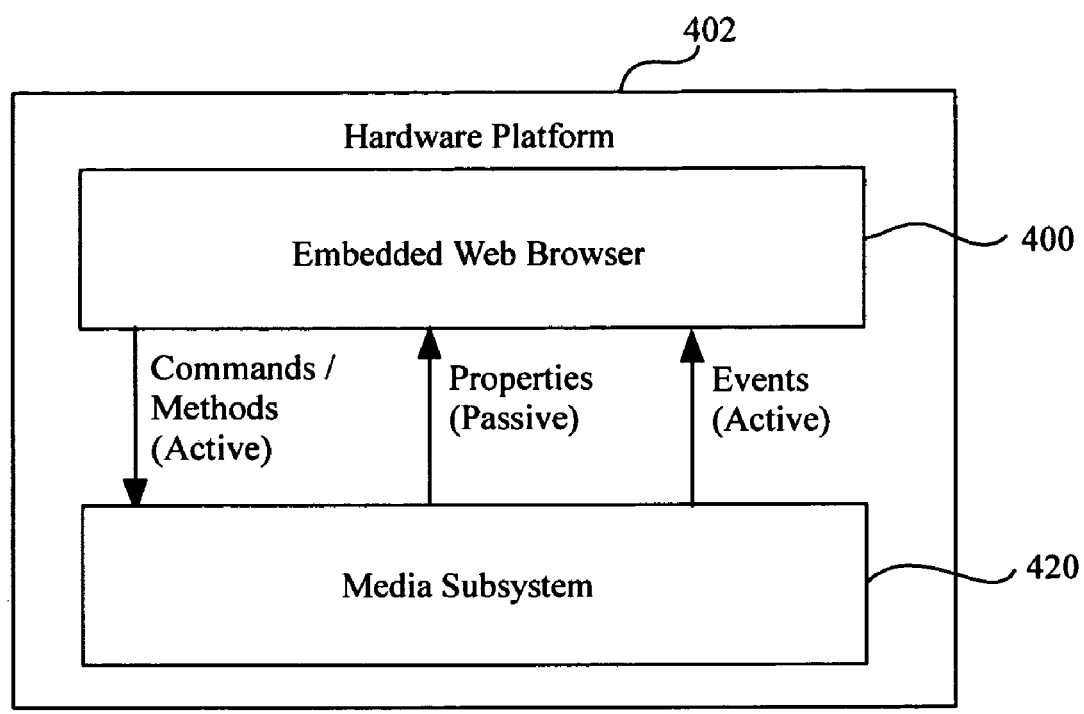
FIG. 4 shows a diagram showing the interaction between an embedded web browser and a media subsystem according to one embodiment.

Referring to FIG. 4, shown is a diagram showing the interaction between an embedded web browser and a media subsystem according to one embodiment.

Shown are a hardware platform (402), an embedded web browser (410), and a media subsystem (420).

The hardware platform (402) executes both the embedded web browser (410) and the media subsystem (420). The embedded web browser (410) is coupled to the media subsystem (424). The media subsystem (420) is a superset of media services including DVD navigator for DVD disc. The media services is discussed in greater detail in relation to FIG. 6 later herein. When the media is not disc oriented, the media navigation is carried out by another component.

In operation, the hardware platform (402) has microprocessor or other processing circuitry (as shown in FIGS. 2-3) executing both the embedded web browser (410) and the media subsystem (420). The hardware platform (402) can be any device suitable for the present invention such as, but not limited to, television set-top boxes, DVD players, computers, etc.

The application programming interface (API) provides a common programming interface for hypertext markup language (HTML) and ECMAScript (a standardized script based on JavaScript and the like) for ensuring playback of enhanced content on multiple playback platforms. Internet connectivity is not required for the use of the application programming interface (API) when content originates from disk ROM.

The application programming interface (API) facilitates the playback of audio and/or video embedded within a web page. The application programming interface (API) can play back full-screen video or video within a web page window (sub window). Audio and/or video is embedded within a HTML-encoded page by use of an appropriate tag such as, but not limited to, the object tag (for the Microsoft Windows operating system) and the embed tag (for the Apple Macintosh Liberate operating system).

TABLE 4

Examples of embedding DVD-Video in HTML

| Operating System | Example |
|---|---|
| Microsoft Windows | `<OBJECT classid=clsid:E358A3BE-6E9A-4BD4-93FB-F95FAA72FC01 height=140 id=InterActual style="HEIGHT: 189px; WIDTH: 320px" width=160> </OBJECT>` |
| Apple Macintosh Liberate | `<embed TYPE='application/x-itx-plugin' HIDDEN='true' name='InterActual' ALIGN=center HEIGHT=100 WIDTH=200 CODEBASE='ITXClasses.jar' TitleSleep=10000 ChapterSleep=10000` |

TABLE 4-continued

Examples of embedding DVD-Video in HTML

| Operating System | Example |
|---|---|
| | TimeSleep=10000 PropertySleep=10000 MAYSCRIPT></embed> |
| Linux | TBD |
| Others | TBD |

Optionally, on players that support the ATVEF standard, the object could be referenced in the following manner:

<object data="tv:" height=x width=x>

After the DVD-Video object is embedded in the web page, it can be accessed using any style sheet, link, or scripting language. Values for the ID string must begin with a letter (A-Z or a-z) and may be followed by any number of letters, digits, hyphens, and periods up to a maximum of 48.

Unlike computers, set-top boxes do not generally have a full-featured operating system and browser. Therefore, the capabilities within the browser are often more restricted. For embedding DVD-Video within these platforms using the application programming interface (API), the "InterActual" indentifier (ID) must be integrated within the embedded browser as any other tag structure. The ID allows the API to be associated with the HTML object. With this approach, any embedded browser that encounters the "InterActual" tag would automatically associate this identifier with the application programming interface (API).

The embedding of the video object assumes a certain level of W window handling:

Toggling between full screen presentation of HTML and full screen video

Displaying DVD-Video within an HTML frame/window

Dynamic resizing of the video window size

Note: The application programming interface (API) will play video full screen down to a 4:1 downscale (180× 120 for NTSC and 180×144 for PAL).

The application programming interface (API) provides interaction with hardware platform (402) by means of commands (or methods), properties, and events. Commands (also called methods) are executed to control the playback of, search of, and navigation through video and/or audio content. The environment can be queried to ascertain the status of various properties. Events are triggered by the occurrence of various operating or playback conditions and serve to provide notification of these playback conditions. Events are essential for scripting and the simultaneous presentation of the media content (audio and/or video) with other web assets (such as text, graphics, etc.). Thus, properties are passive (provided in response to queries) and events are active (provided without queries).

Commands

Commands such as InterActual.PlayTitle, allows the HTML content to control playback of the media. Commands are parsed by the browser presentation engine (described later in greater detail in reference to FIG. 6) and then passed to the DVD navigator (described later in greater detail in reference to FIG. 6) to effect playback.

Properties

Properties allow the HTML content to query for state information of the DVD navigator. An example includes InterActual.TitleNumber. Properties are parsed by the presentation engine and passed thereafter to the DVD navigator. In response, the DVD navigator interprets the query and returns the requested information.

Events

Events allow the HTML content to receive state information from the DVD navigator. An example of an event notification would be InterActual.TitleEvent. Events are propagated from the DVD navigator to the browser presentation engine whenever the requested state changers. The HTML content can subscribe to events using any of the event handlers as described in the application programming interface (API) specification.

Figure 5:
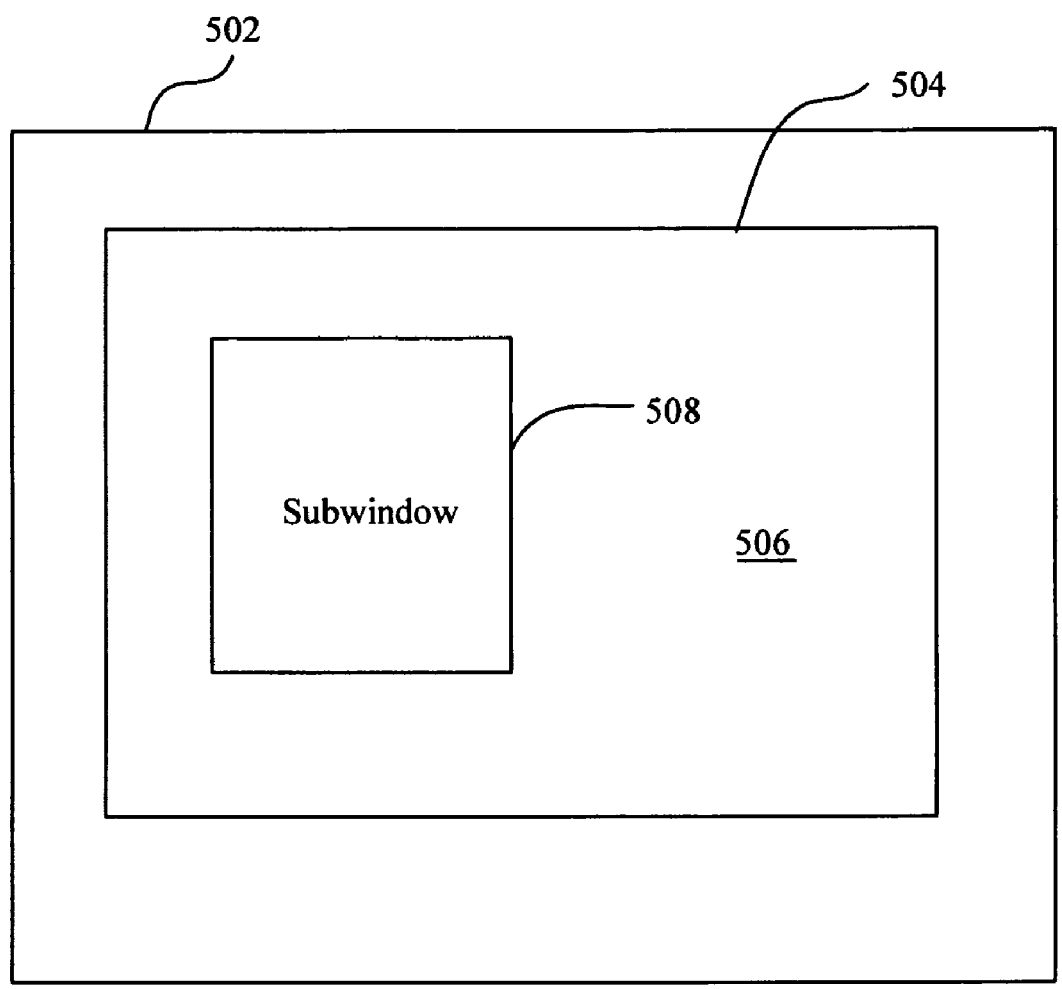
FIG. 5 shows an example of media and other content integration according to one embodiment.

FIG. 5 shows an example of media and other content integration according to one embodiment.

Shown are a display device (502), a screen (504), a content area (505), and a sub window (508).

The display device (502) contains the screen (504) able to display graphics and text. The content area (506) contains the sub window (508) (also referred to as a video window or alternate frame).

An important aspect of this embodiment is that audio and/or video can be integrated with other content such as text and/or graphics described in web compatible format (although the source need not be the Internet, but can be any source such as a disk or server able to deliver this content).

As an example, the sub window (508) displays movie content, such as the movie T2, and the content area (506) displays text and/or graphics (provided by HTML coding) which is topically related to the part of the movie playing in the sub window (508). When the user/viewer interacts with the content in the content area (506), such as by clicking on a displayed button, effects will be reflected in the media sub window (508). As an example, clicking on buttons or hypertext links indicating sections or particular points in the movie results in the video playback jumping to the selected point. Additionally, the media displayed in sub window (508) can result in changes in the content area (506). As an example, progression of the movie to a new scene results in a new text display giving information about the scene.

Concurrent Browsing and Video Playback

A primary feature of the application programming interface (API) is the ability to view HTML pages while playing video and/or audio content. The concurrent playback of browser and video places additional requirements on the processing power and memory of the underlying hardware. Each DVD semiconductor solution should be designed to perform both of these functions simultaneously. A required feature of the application programming interface (API) is the ability to display downscaled video within a frame of a web page. Additionally, video upscale is another feature of an embodiment as HTML content is already being designed with the assumption that this capability will be available in future devices.

Storyboard with Scrolling Display

As example of one embodiment is a movie authored with the entire screenplay provided on the DVD disk in HTML format. When a viewer clicks on any screen visually represented in HTML, the system links the viewer to that scene (by use of the command InterActual.SearchTime to go to the specific location within a title) within the DVD-Video. Besides being capable of a finer granularity than the normal chapter navigation provided on DVD-Video, the HTML-based script can contain other media such as a picture (by use of the command "InterActual.DisplayImage") or special audio (by use of the command "InterActual.SelectAudio") and/or live links for other information. Further, the text of the screenplay in HTML could automatically A scroll@ with the DVD-Video to give the appearance of being synchronized with the DVD-Video. Although many of these types of features can be authored in DVD-Video (except, of course, live web links and synchronized scrolling), HTML authoring is much more efficient, immediate, and widely known.

Figure 6:
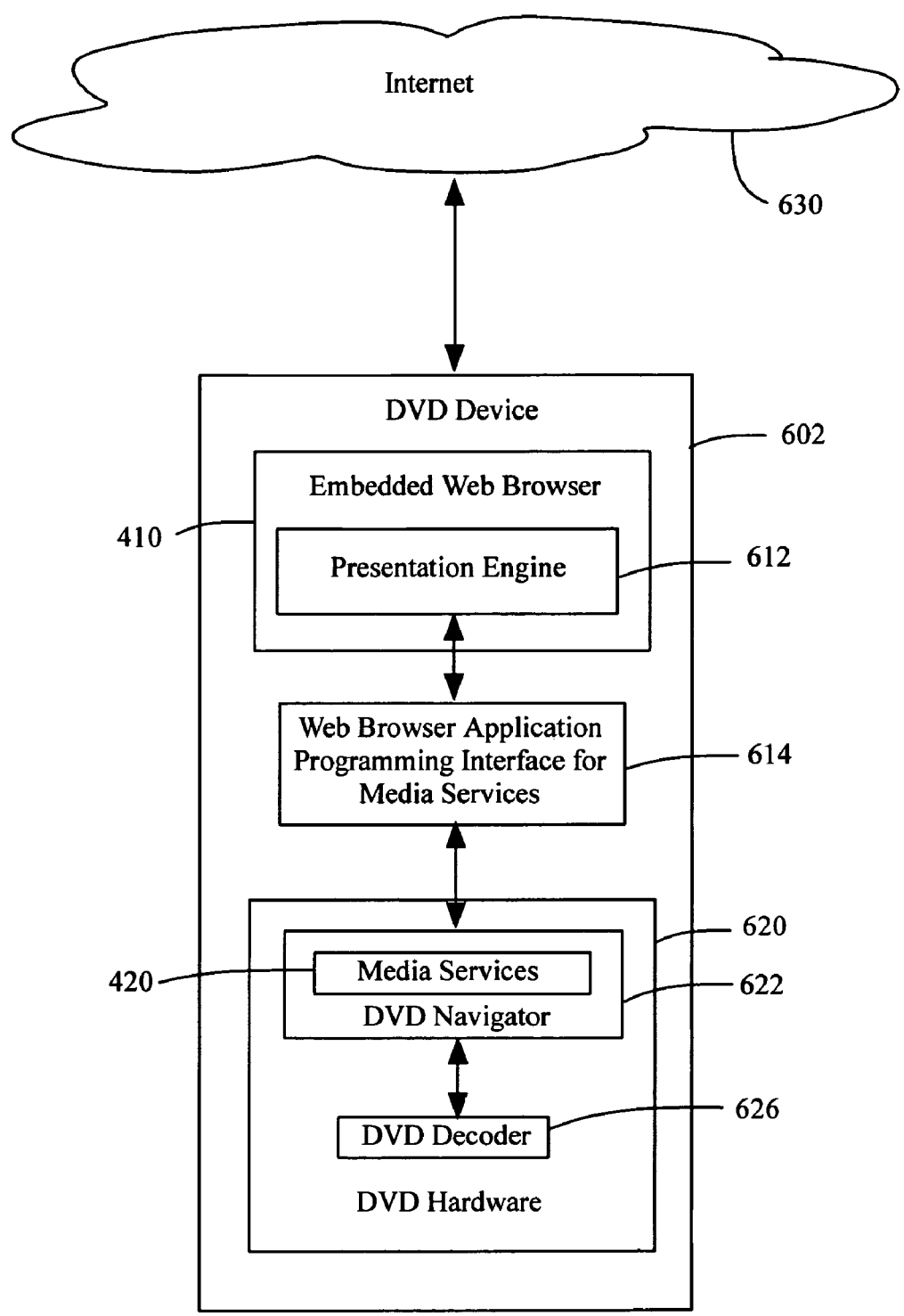
FIG. 6 shows a general overview of the interaction of the components of a DVD device according to one embodiment.

FIG. 6 shows a general overview of the interaction of the components of a DVD device according to one embodiment.

Shown are a DVD device (602), an embedded web browser (410), a presentation engine (612), a web browser application programming interface for media services (614), DVD hardware (620), a DVD navigator (622), a media services (628), a DVD decoder (626), and an internet (630).

The DVD device (602) includes both the embedded web browser (410) and the DVD hardware (620). The embedded web browser (410) includes the presentation engine (612). The embedded web browser (410) is coupled to the web browser application programming interface for media services (614) which, in turn, is coupled to the DVD hardware (620). The DVD hardware (620) includes the DVD navigator (622) and the DVD decoder (626). The DVD navigator (622) includes the media services (628). The media services (628) is coupled to the DVD decoder (626). The DVD device (602) is coupled to the internet (630). The media services (628) corresponds to the media subsystem (628) but has a more specific implementation. The media subsystem (628) is a superset of the media services (628) and includes DVD navigator for DVD disc.

With the DVD device (602), the user is able to interact with an enhanced DVD on a television in the same fashion as can be experienced on a computer. The display area of a television can show video and HTML content concurrently. This is accomplished by the embedded web browser (410) in the DVD player. As discussed herein in reference to FIG. 4, the HTML content can control the playback of the video through embedded application programming interface (API) commands.

The embedded web browser (410) is responsible for displaying the HTML content authored on InterActual-compatible disks, stored locally on device (602), or served from a remote server location. The embedded web browser (410) also supports concurrent playback of video and audio while presenting the HTML page.

Presentation Engine

The presentation engine (612) of the browser must provide for the embedding of video within web pages. Embedding video within web pages defines the location where the video is played. This location information is then parsed by the presentation engine and passed to the underlying video rendering engine.

The presentation engine (612) of the embedded web browser (410) parses the HTML instructions for controlling the media playback, generates any graphic portions of the display, positions a video window when it exists, and also interfaces directly with the underlying DVD Navigator. InterActual-specific instructions are interpreted by the presentation engine (612) and passed to a DVD abstraction layer, which can be part of the embedded browser or developed by the DVD navigator manufacturer. This layer serves as an abstraction that makes it possible to map the browser into a DVD player-specific DVD navigator developed either by the semiconductor manufacturer or the player manufacturer. Of course, the DVD Navigator interfaces with the underlying video and audio decoders.

DVD Navigator Abstraction Layer

The web browser application programming interface for media services (614) (or DVD navigator abstraction layer (614)) is a very thin interface layer between the presentation engine (612) and the media services (628).

The DVD Navigator abstraction layer (614) may be developed by the player manufacturer or the semiconductor manufacturer. To support a flexible and portable solution, the DVD navigator abstraction layer (614) is recommended to reside in between the browser (410) and the DVD navigator (622). Abstracting the communication between the browser (410) and navigator (622) offers a more robust and portable design, so that either the browser or the navigator can be changed in future player designs.

The DVD navigator (622) controls the decoding and playback of media in the drive.

The media services (628) serves as a middleware layer between web browser application programming interface for media services (614) and the DVD navigator (622). The media services (628) facilitates content running in the embedded web browser (410) to control the DVD navigator (622). The media services (628) allows the DVD navigator (622) to work with any web browser compliant with the present embodiment.

The DVD decoder (626) interfaces between the DVD media interface hardware contained in the DVD hardware (620) and the DVD navigator (622).

The Internet (630) is shown as a specific example of the offsite content source (106) shown in FIGS. 1-3.

Figure 7:
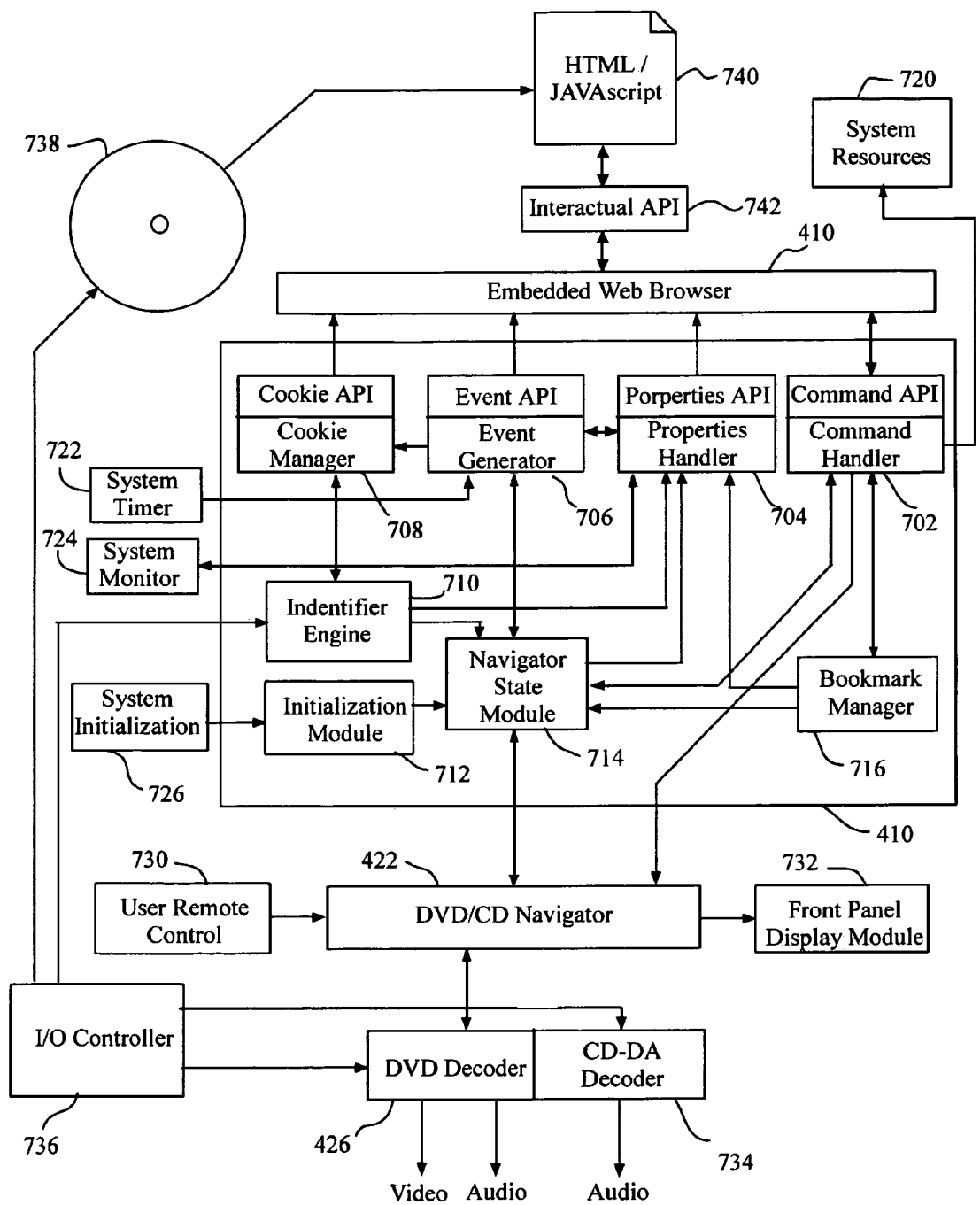
FIG. 7 shows one exemplary method for handling disk insertion according to one embodiment resulting in the launching of various contents or the display of a logo depending on the outcome of multiple determinations.

Referring to FIG. 7, shown are the details for the web browser application programming interface for media services (414) of FIG. 4.

Shown are an embedded web browser (410), a command handler (with command API) (702), a properties handler (with properties API) (704), an event generator (with event API) (706), a cookie manager (with cookie API) (708), an identifier engine (710), an initialization module (712), a navigator state module (714), a bookmark manager (716), a system resources (720), a system timer (722), a system monitor (724), a system initialization (726) a DVD/CD navigator (422), a user remote control (730), a front panel display module (732), a CD decoder (734), a DVD decoder (426), an I/O controller (736), a disk (738), a HTML/JavaScript content (740), and an InterActual API (742).

The embedded web browser (410) is coupled to the command handler (which has an associated command API) (702) as shown by a bidirectional arrow. The embedded web browser (410) is coupled separately to the properties handler (which has an associated properties API) (704), the event generator (which has an associated event API) (706), and the cookie manager (which has an associated cookie API) (708), all three connections shown by an arrow pointing towards the embedded web browser (410).

The command handler (702) is coupled to the bookmark manager (716) shown by a bi-directional arrow. The command handler (702) is coupled to the DVD/CD navigator (422) shown by a bidirectional arrow. The command handler (702) is coupled to the navigator state module (714) shown by a bi-directional arrow. The command handler (702) is coupled to the system resources (720) by an arrow pointing to the system resources (720).

The properties handler (704) is coupled separately to the bookmark manager (716) and the identifier engine (710), both shown by an arrow pointing to the properties handler (704). The properties handler (704) is coupled the event generator (706) by a bi-directional arrow.

The event generator (706) is coupled to the navigator state module (714) shown by a bi-directional arrow. The event generator (706) is coupled to the system timer (722) shown by an arrow pointing to the event generator (706). The event generator (706) is coupled to the cookie manager (708) by an arrow pointing to the cookie manager (708).

The cookie manager (708) is coupled to the identifier engine (710) shown by a bi-directional arrow.

The identifier engine (710) is coupled to the I/O controller (736) by an arrow pointing towards the identifier engine (710) and to the navigator state module (714) by a bi-directional arrow.

The initialization module (712) is coupled to the system initialization (726) by an arrow pointing towards the initialization module (712). The initialization module (712) is coupled to the navigator state module (714) by an arrow pointing to the navigator state module (714).

The navigator state module (714) is also coupled separately to the bookmark manager (716) and the DVD/CD navigator (422) by bi-directional arrows.

The DVD/CD navigator (422) is coupled to the user remote control (730) by an arrow pointing to the DVD/CD navigator (422). The DVD/CD navigator (422) is coupled to the front panel display module (732) by an arrow pointing to the front panel display module (732). The DVD/CD navigator (422) is coupled to the DVD decoder (426) by a bi-directional arrow.

The I/O controller (736) is coupled separately to both the DVD decoder (426) and the CD decoder (734) by arrows pointing away from the I/O controller (736). The I/O controller (736) is coupled to the disk (738) by an arrow pointing to the disk (738).

The disk (738) is coupled to the HTML/JavaScript content (740) by an arrow pointing to the HTML/JavaScript content (740).

The HTML/JavaScript content (740) is coupled to the Application programming interface (API) (742) by an arrow pointing to the Application programming interface (API) (742).

In operation, the embedded web browser (410) receives HTML/JavaScript content from disk (738) which is displayed by presentation engine (612). The embedded web browser (410) originates commands (as a result of user interaction which can be via the remote in set-top systems, the keyboard or mouse in computing systems, the game interface in gaming systems, etc.), which are sent to the command handler (702) by way of the command API. The embedded web browser (410) also receives commands from the command handler (702) by way of the command API. An example of such a command is InterActual.FullScreen(w). The embedded web browser (410) also receives cookies from the cookie manager (708) via the cookie API, generally in response to the accessing of an Internet website. The embedded web browser (410) also receives events (notifications) each of which is a notification that a respective defined event (generally related to media playback) has occurred. These events are generated by the event generator (706) and sent via the event API. The embedded web browser (410) also queries properties from the properties handler (704) via the properties API. Properties are received in response to inquiries generated by the embedded web browser (410).

The command handler (702) controls the DVD/CD navigator (422) including starting and stopping playback, changing audio streams, and displaying sub-pictures from JavaScript, among many things. The command handler (702) provides live web content for non-InterActive disks when an active Internet connection is present through such commands as InterActual.NetConnect( ) and InterActual.NetDisconnect( ). The command handler (702) commands the bookmark manager (716) through such commands as InterActual.GotoBookmark( ) and InterActual.SaveBookmark( ). The command handler (702) also interacts with the navigator state module (714) generally regarding user interaction. The Navigator state module (714) keeps the current state of the system and receives it directly from the decoder (or maps directly into it). When the bookmark manager (716) is going to save a bookmark and needs to know the current title, the bookmark manager (716) receives it from the navigator state module (714) and places it in a bookmark and returns it to the command handler to allow it to provide a return value to the InterActual.SaveBookmark command.

The properties handler (704) provides the embedded web browser (410) with the ability to interrogate the navigator state module (714) for the DVD/CD navigator (422) state which includes the properties (also referred to as attributes) of the elapsed time of the current title, the disk type, and the disk region, among others. The properties handler (704) maintains knowledge of system attributes. The Event Generator monitors these attributes and triggers and event when one is changed.

The event generator (706) provides notification to the DVD/CD navigator (422) of events such as a change of title or chapter with web content (based on DVD time codes and the system time from the system timer (722)). The event generator (706) notifies the properties handler (704) of event triggerings which are of interest to the properties handler (704). The event generator (706) also provides events to the cookie manager (708) such as relate to the accessing of web pages, disk insertion, and disk ejection events.

The cookie manager (708) interacts with the identifier engine (710) to provide the ability to save information regarding the disk, platform, current user, and the application programming interface (API) version in local storage.

The identifier engine (710) provides the ability to generate a unique identifier for the media which enables the DVD ROM content (HTML and JavaScript from the disk) to carry out platform validation to ensure a certified device is present. The identifier engine (710) provides the ability to serialize each disk by reading and processing the information coded in the burst code area (BCA) of the disk. The BCA is read by the identifier engine (710) and stored in the navigator state module (714). Hence commands such as InterActual.GetBCAField( ) can get the BCA information from the navigator state module (714) after insertion of a disc. This BCA information provides the ability to uniquely identify each disk by serial number. Conditional access to content, usage tracking, and other marketing techniques are implemented thereby. The identifier engine (710) gets the BCA information for the serial identifier (SerialID), hashes the video .IFO file to identify the title (called the MediaID), and then reads the ROM information to establish a data identifier (DataID) for the HTML/JavaScript data on the disc. The identifier engine (710) provides this information to the navigator state module (714) which stores this information and provides it to whichever of the command handler (702), properties handler (704), or event generator (706) needs it. The identifier engine (710) interacts with the navigator state module. The identifier engine (710) receives the BCA information (read differently than files) from the I/O controller (736). The identifier engine (710) interacts with the cookie manager (708) to place disc related information read from the BCA as discussed previously herein into the InterActual System cookie.

The initialization module (712) provides the ability to establish the DVD/CD navigator environment. The initialization module (712) allows the internal states and the State Modules (i.e. the navigator state module (714)) to be initialized. This initialization also includes reading the current disc in the drive and initializing a system cookie. It is noted that the embedded web browser (410) interfaces which allow registering a callback for the event handler are established at power-up as well.

The navigator state module (714) provides the ability to coordinate user interaction and DVD behavior with front panel controls and/or a remote control. In one embodiment, arbitration of control happens in the navigator (422) itself between the remote and front panel controls. DVD/CD navigator (722) playback is initiated by the navigator state module (714) in response to input from the initialization module (712). The navigator state module (714) receives locations of book marked points in the video playback from the bookmark manager (716) and controls the DVD/CD navigator (422) accordingly.

The bookmark manager (716) provides the ability for the JavaScript content to mark spots in video playback, and to return later to the same spot along with the saved parameters which include angle, sub-picture, audio language, and so forth. The bookmark manager (716) provides the ability to use video bookmarks in conjunction with web bookmarks. As an example, a video bookmark is set, a web session is launched going to a preset web book marked source to retrieve video-related information, then later a return to the video at the book marked spot occurs.

The system timer (722) provides time stamps to the event generator (706) for use in determining events for synchronization or controlled playback.

The system monitor (724) interacts with the properties handler (704). In one embodiment, the system generates a 900 millisecond timer tick as an event which the HTML/JavaScript uses in updating the appropriate time displays as is needed. For systems that do not have a DVD Navigator that creates events the timer is used to poll the property values every 900 milliseconds and compares the poll results with a previous result. If the result changes then an event is generated to the HTML/JavaScript.

The system initialization (726) provides initialization control whenever the system is turned on or reset.

The DVD decoder (427) generally receives the media stream from the I/O controller (736) and decodes the media stream into video and audio signals for output. The DVD decoder (426) receives control from DVD/CD navigator (422).

The CD-DA decoder (734) receives a media stream from I/O controller (736) and decodes it into audio which it provides as output.

The I/O controller (736) interfaces with disk (738) and controls its physical movement, playback, and provides the raw output to the appropriate decoder. The I/O controller (736) also provides disk state information to identifier engine (710).

The disk (738) can be any media disk such as, but not limited to, DVD-ROM, DVD-Audio, DVD-Video, CD-ROM, CD-Audio.

Figure 8:
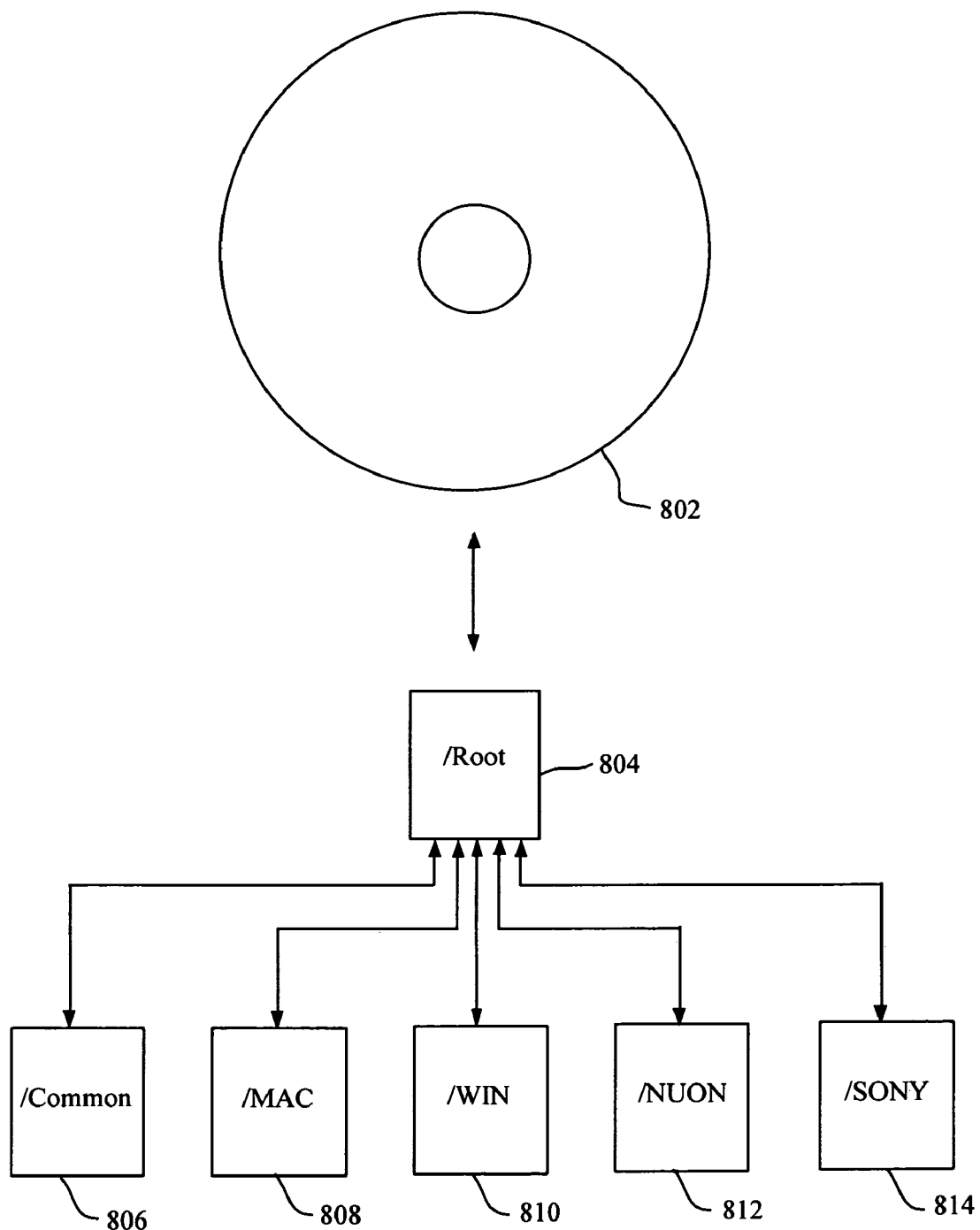
FIG. 8 shows a media disk directory structure according to one embodiment.

Referring to FIG. 8, shown is a media disk directory structure according to one embodiment.

Shown are a disk (802), a /ROOT directory (804), a /COMMON directory (806), a /MAC directory (808), a /WIN directory (810), a /NUON directory (812), and a /SONY directory (814).

The disk (802) includes each of the directories listed: the /ROOT directory (804), the /COMMON directory (806), the /MAC directory (808), the /WIN directory (810), the /NUON directory (812), and the /SONY directory (814).

In one embodiment, the application programming interface (API) uses the file structure depicted in FIG. 8 to access platform-specific binaries. Platforms for which directories are defined include the /MAC (Macintosh operating system), /NUON (VM labs, NUON technology), /SONY (Sony playstation), /WIN (Microsoft Windows operating systems). Other directories are allowed and can be used when desired, such as /LINUX (for the LINUX operating system), /NINTENDO (Nintendo Dolphin), /SEGA (Sega Dreamcast), and /XBOX (Microsoft X-Box).

The directory structure allows for proprietary executable binary files for each platform. The platform-specific directory structure and its associated set of binaries enable any platform to run executables specifically designed for that platform. This capability, in essence, allows the platform-specific binaries to override the general purpose content, or override the standard browser mechanism. While actual ROM content may reside in a platform directory, in one embodiment, all ROM content resides in the /COMMON directory (806) when possible. The /COMMON directory (806) can support any number of subdirectories including platform-specific directories.

The /COMMON directory (806) and platform-specific directories are standardized, however, each platform developer is free to create their own subdirectory structure under their reserved platform-specific directory. As example, Sony may create PS2 and PS3 subdirectories under the /SONY directory (814).

The /COMMON directory (806) stores the actual ROM content (as opposed to platform-specific binaries). It is recommended that all ROM content, including platform-specific ROM content, reside in this directory as this facilitates an intuitive content development approach and provides an easy way for JavaScript to be used to detect platforms and render the appropriate HTML pages tailored to specific platforms when required.

Even if platform-specific binaries are included on the disk, the general purpose content can still be called. In one embodiment, a DVD utilizes the directory structure by placing the Windows version of software in the /WIN directory, the Macintosh version of PCFriendly in the /MAC directory (808), and so forth. Upon insertion of the disk, whichever platform the disk has been inserted into will execute the appropriate binaries (found in that platform's directory and autorun), and these binaries thereafter load the INDEX.HTM file located in the /COMMON directory (806), which is the starting point for any general-purpose InterActual-compatible disk. The meta-data tag in the head section of the INDEX.HTM file, in one embodiment, contains the Application programming interface (API) version information. The INDEX.HTM file serves as a background container web page during standard playback that allows JavaScript event handlers to be loaded and activated to handle button events during playback. JavaScript can be used to detect platforms and render the appropriate HTML pages customized for those platforms.

The specifications for DVD-video and DVD-audio require that each disk contain specific directories and files. As example, DVD-video files are contained in a directory named VIDEO_TS and DVD-audio files are contained in a directory named AUDIO_TS. There is no such requirement for DVD-ROM, so developers can arrange files in any desired manner.

Files stored for use with InterActual-compatible disks can be in any DVD disc directory. In the case where no platform-specific executable file exists, there must be a method which allows the browser and/or playback engine to identify the initial HTML file.

During disk creation, DVD-video zone files must be placed physically at the beginning of the disk, contiguously, in the order specified by the DVD-video specification. Likewise, DVD-audio zone files must follow the DVD-video files in contiguous order.

In one embodiment, the VIDEO_TS and AUDIO_TS directories are the first entries in the directory descriptor. In one embodiment, the ROM zone files are placed in subdirectories rather than the /ROOT directory.

The placement of files on a dual-layer disk (DVD-9, DVD-14, or DVD-18) is generally independent of the layer details. DVD-video and DVD-audio files must begin on layer 0. ROM zone files are placed at the end, beginning on whichever layer the DVD-video (or DVD-audio) files end on, and can cross the layer boundary if needed.

DVD authoring systems and tools support different naming capabilities such as UDF, ISO-9660, ISO-9660 with Joliet extensions, Macintosh file names, Macintosh resources, hybrid disks, etc. Some authoring systems force a certain character capitalization (such as all capitals).

The disk insertion flow of FIG. 8 is commonly described in terms of phases.

The first phase is InterActual disk detection where the disk is checked to determine if it has InterActual content. This is done by seeking the INDEX.HTM file in the /COMMON directory on the disk. If the INDEX.HTM file exists, then the DVD is compatible with the present embodiment, otherwise, it is not.

The second phase is disk type detection where the disk is checked to determine if it is a DVD-Video, DVD-Audio, or CD-DA disk.

The third phase is player mode detection where the device is checked to determine the default playback mode for the system. This is done by reading the player mode by the properties query InterActual.PlayerMode. When the device is configured for play mode, content in accordance with the present embodiment, in one embodiment, is bypassed.

If the default playback mode for the device is "InterActual" mode, then content in accordance with the present embodiment is launched beginning with /COMMON/INDEX.HTM. The content itself can be updated dynamically if there is an active Internet connection. When there is no active Internet connection, the device will render the content from the disk ROM.

For disks not in accordance with the present embodiment in players with a default playback mode of "InterActual," the default content homepage (CONNECT.HTM) is rendered and an Internet connection is attempted to potentially provide web content.

The fourth phase is platform-specific file detection where directories on the disk are checked to determine if any platform-specific files are located. This is done by searching for the appropriate file structures for the device.

The fifth phase is internet connection determination where the device is checked to see whether an Internet connection is active or possible. The system can access and updated content files for the current title of disks in accordance with the present embodiment. For non-enhanced titles, the system will look online to see if there is any content available for the current title. If there is such content, the system can offer the same interactive experience as a title in accordance with the present embodiment affords.

When the device is in player mode play, a disk in accordance with the present embodiment can display a logo to signify that there is content in accordance with the prtesent embodiment available from the disk ROM.

Figure 9:
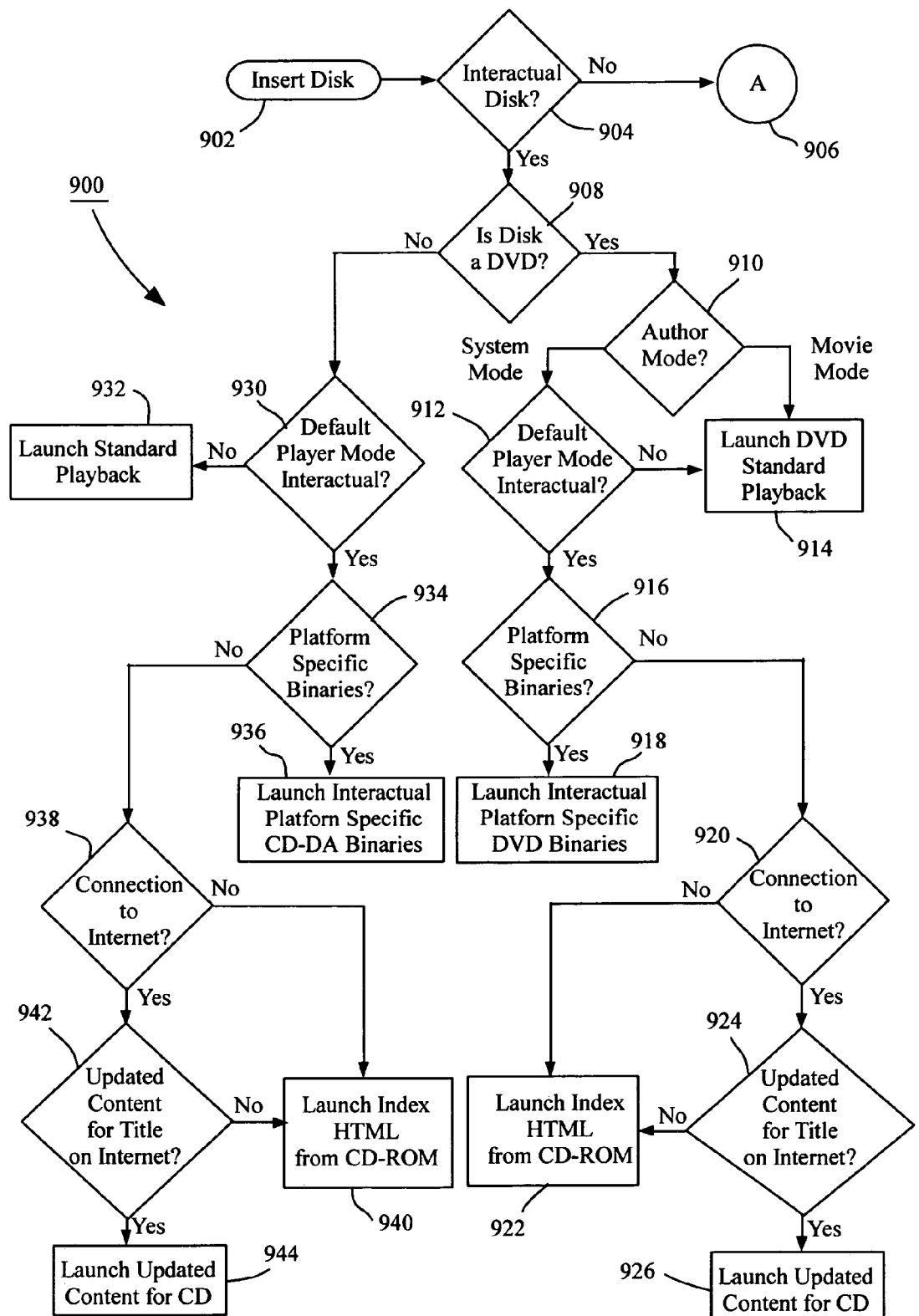
FIGS. 9-10 show 2 parts of one exemplary algorithm 900 for handling disk insertion according to one embodiment resulting in the launching of different contents depending on disk determinations.

Referring to FIG. 9, shown is part ½ of one exemplary algorithm 900 for handling disk insertion according to one embodiment resulting in the launching of different contents depending on disk determinations.

Algorithm 900 begins when a user inserts a media disk into a device at "insert disk" block (902) and determines if the inserted disk is a DVD or music CD in accordance with the present embodiment block (904).

Figure 10:
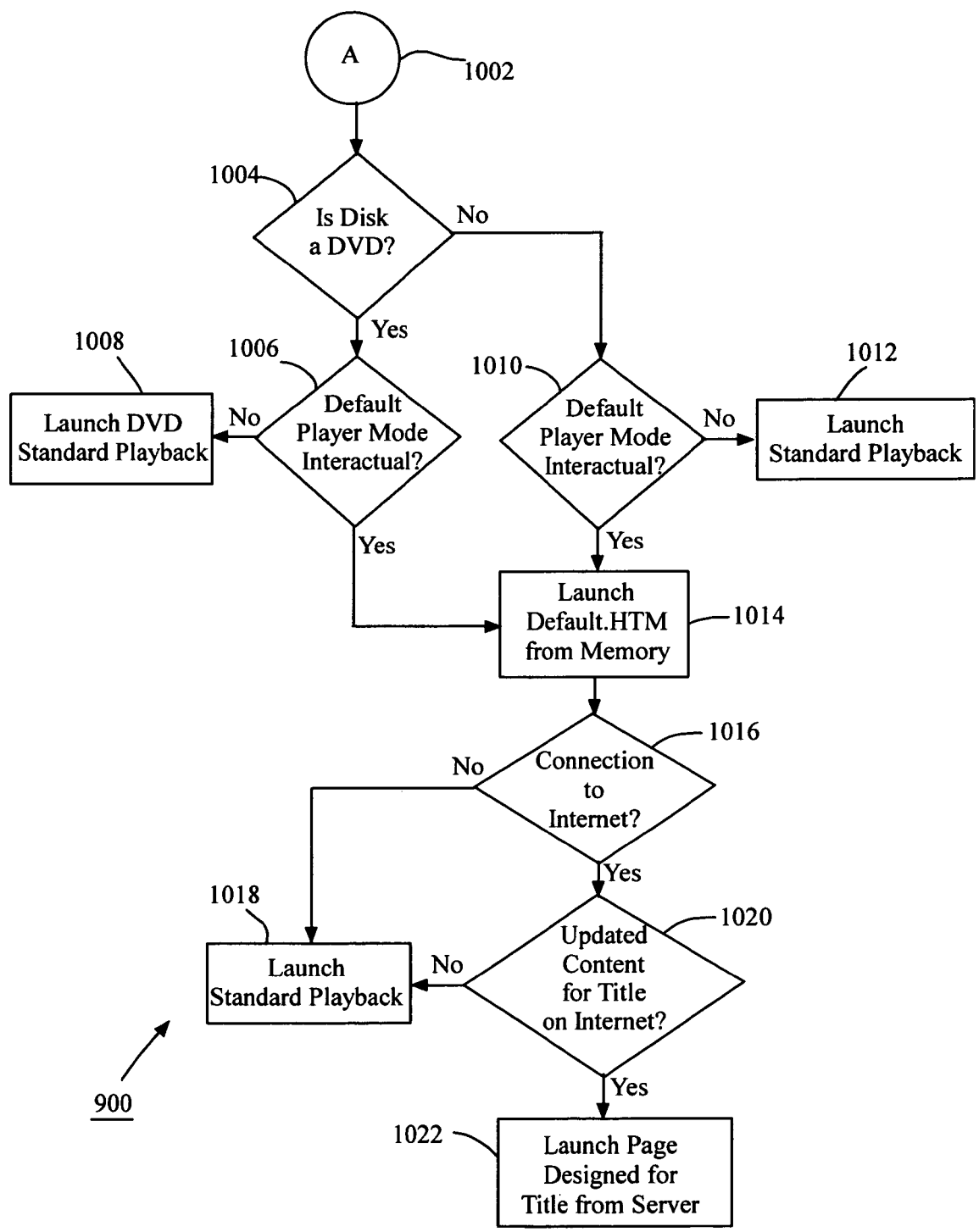

When the determination (block 904) is that the inserted disk is not a disk in accordance with the present embodiment, the algorithm (900) continues through connector A (906) to the corresponding connector A in FIG. 10.

When the determination (block 904) is that the inserted disk is a disk in accordance with the present embodiment, the determination is next made whether the disk is a DVD (block 908).

If the result of the determination of block 908 is that the disk is a DVD, a check is made whether the author mode is movie mode or system mode (block 910). If the author mode is movie mode, standard DVD playback is initiated (block 914). If the author mode is system mode, the determination is made whether the default player mode is "InterActual" (block 912). If it is not, the algorithm (900) launches standard DVD playback (block 914). If it is, the determination is made whether platform specific binaries exist for the current platform (block 916), and if so, platform specific binaries are launched (block 918). If no platform-specific binaries are found, the determination is made whether there is an active Internet connection (block 920), and if not, the file INDEX.HTM is launched from the DVD (block 922). If there is an active Internet connection, a check is made for web content for the current title (block 924), and if there is content for the current title it is displayed (block 926).

If the result of the decision at block 908 is that the disk is not a DVD, the determination is next made whether the default player mode is "InterActual" (block 930) and if not, CD standard playback is launched (block 932). If the default player mode is "InterActual," a check is made for any platform-specific binaries (block 934) and if any are present, the platform-specific binaries are launched (block 936). If there are no platform-specific binaries, a check is made whether there is an active Internet connection (block 938) and if not, INDEX.HTML is launched from the CD-ROM (block 940). If there is an active Internet connection, a check is made for web content for the current title, and if there is any, it is displayed (block 944). If there is no web content for the current title, INDEX.HTML is launched from the CD-ROM (block 940).

Identifying InterActual-Compatible Discs

A disc in accordance with the present embodiment is detected by checking for the existence of the /COMMON/INDEX.HTM file. The application programming interface (API) version information can be found in the meta-data area of the HTML file.

Referring to FIG. 10, shown is part ⅔ of the exemplary algorithm 900 for handling disk insertion according to one embodiment resulting in the launching of different contents depending on disk determinations.

Algorithm 900 continues from connector A (connector 906) in FIG. 9 and begins at connector A (connector 1002) in FIG. 10. A determination is made whether the disk is a DVD (block 1004) and if the disk is a DVD, a check is made whether the default player mode is InterActual (block 1006). If the default mode is not "InterActual," standard DVD playback is launched (block 1008). If the default playback mode is "InterActual," then DEFAULT.HTM is launched from memory (block 1014).

If the disk is determined to not be a DVD (block 1004), a check is made whether the default player mode is "InterActual" (block 1010) and if it is not, standard playback is launched (block 1012). If the default player mode is "InterActual" (block 1010), DEFAULT.HTM is launched from memory (block 1014). After launching DEFAULT.HTM, a check is made whether an active Internet connection exists (block 1016) and if not, standard playback is launched (block 1018). If an active Internet connection exists, a check is made for online content for the current title (block 1020). If no online content is found for the current title, standard playback is initiated (block 1018). If online content for the current title is found, the online content found is displayed (block 1022).

Figure 11:
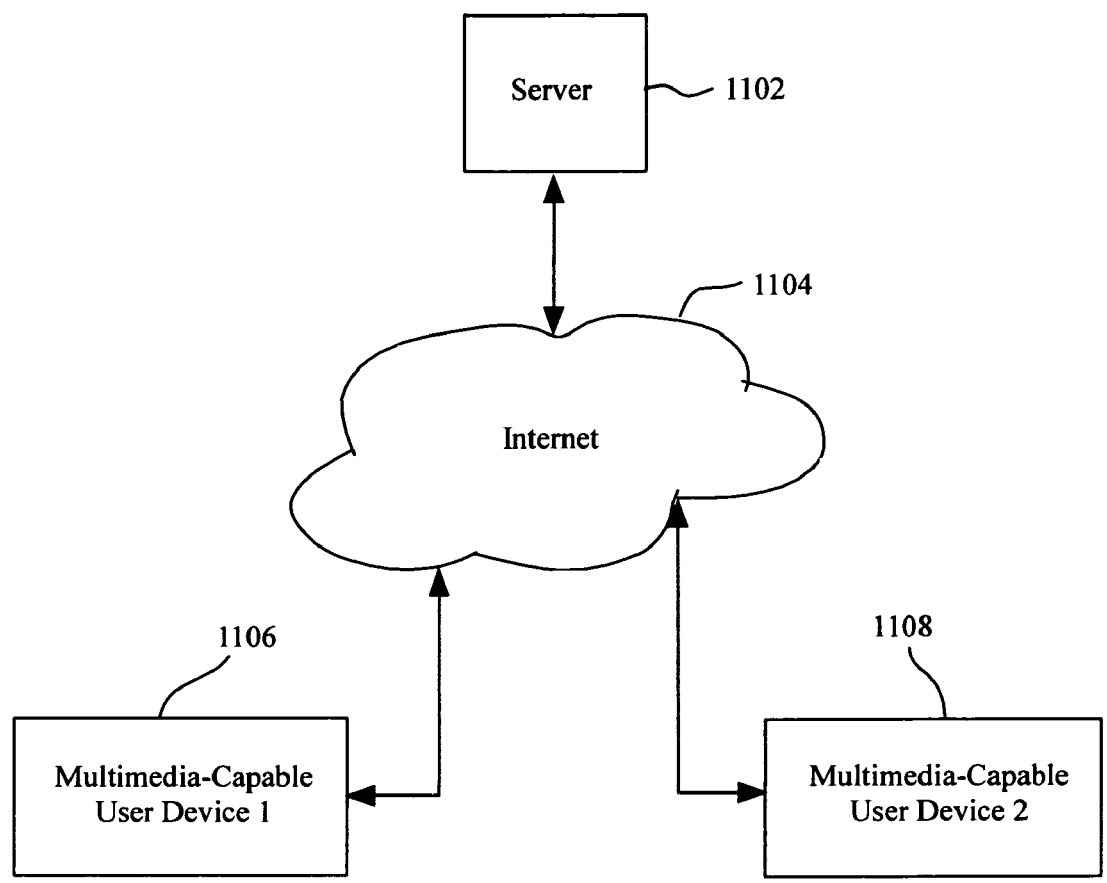
FIG. 11 shows a general exemplary diagram of synchronous viewing of content according to one embodiment.

FIG. 11 shows a general exemplary diagram of synchronous viewing of content according to one embodiment.

Shown are a server (1102), an Internet (1104), an InterActive device (1106), and an InterActive device 2 (1108).

The server (1102) is coupled to the Internet (1104) shown by a bidirectional arrow. The Internet (1104) is coupled separately to both the interactive device (1106) and the interactive device 2 (1108) shown by bi-directional arrows.

DVDs can be used for multiple user synchronous use. Generally, this is done by having a prearranged time for an event (such information could be programmed on the disk or provided to users from online content accessed via the disk) at which time interested users connect to a prearranged website by use of the appropriate disk. The network site can control all connected devices by sending commands such as play, pause, fast forward, etc. By this manner, content resident on the disks as well as live web-originated content can be synchronously interwoven for any number of connected users simultaneously. With the server being coupled to the interactive devices the server can send commands to these devices for remotely controlling content stored on local interactive devices connected to a network system, such as the Internet. First, the interactive devices begin with the same interactive content, such as a DVD-Video disk. The interactive devices and a server are adapted to be connected to a network. In operation, information is transmitted from the server to the interactive devices that begin playback of the interactive content utilizing the network. Each interactive device receives the command at the same time and thus the commands and therefore the content are synchronized at start of playback. If the interactive devices support different commands such as a playing at a given time or only playing at a given chapter the server must utilize the supported features for the interactive device and send out only the supported commands to the interactive devices. This allows for the simultaneous playback of the event on each of the client apparatuses. Late synchronization can be achieved by a similar method by sending a command from the server to the interactive devices of the current time position the DVD-Video is playing. For those interactive devices that only support chapter commands the server must wait until the next chapter change to send the command to the interactive device to synchronize with the other interactive devices currently viewing the DVD-Video. Furthermore, This allows content such as DVD Video content to be locked so that play can only be accomplished through verification of interactive devices identity and also allows augmentation and supplementation of the content provided by the video from a remote server. Upon verification of a interactive device's credentials, the locally stored content can be supplemented with additional content delivered over the network system. This is achieved by using precise command sequences from the server to the interactive devices that unlock the local DVD-Video for example.

Network Controlled Synchronization

DVDs can be used for multiple user synchronous use. Generally, this is done by having a prearranged time for an event (such information could be programmed on the disk or provided to users from online content accessed via the disk) at which time interested users connect to a prearranged website by use of the appropriate disk. The network site can control all connected devices by sending commands such as play, pause, fast forward, etc. By this manner, content resident on the disks as well as live web-originated content can be synchronously interwoven for any number of connected users simultaneously.

Figure 12:
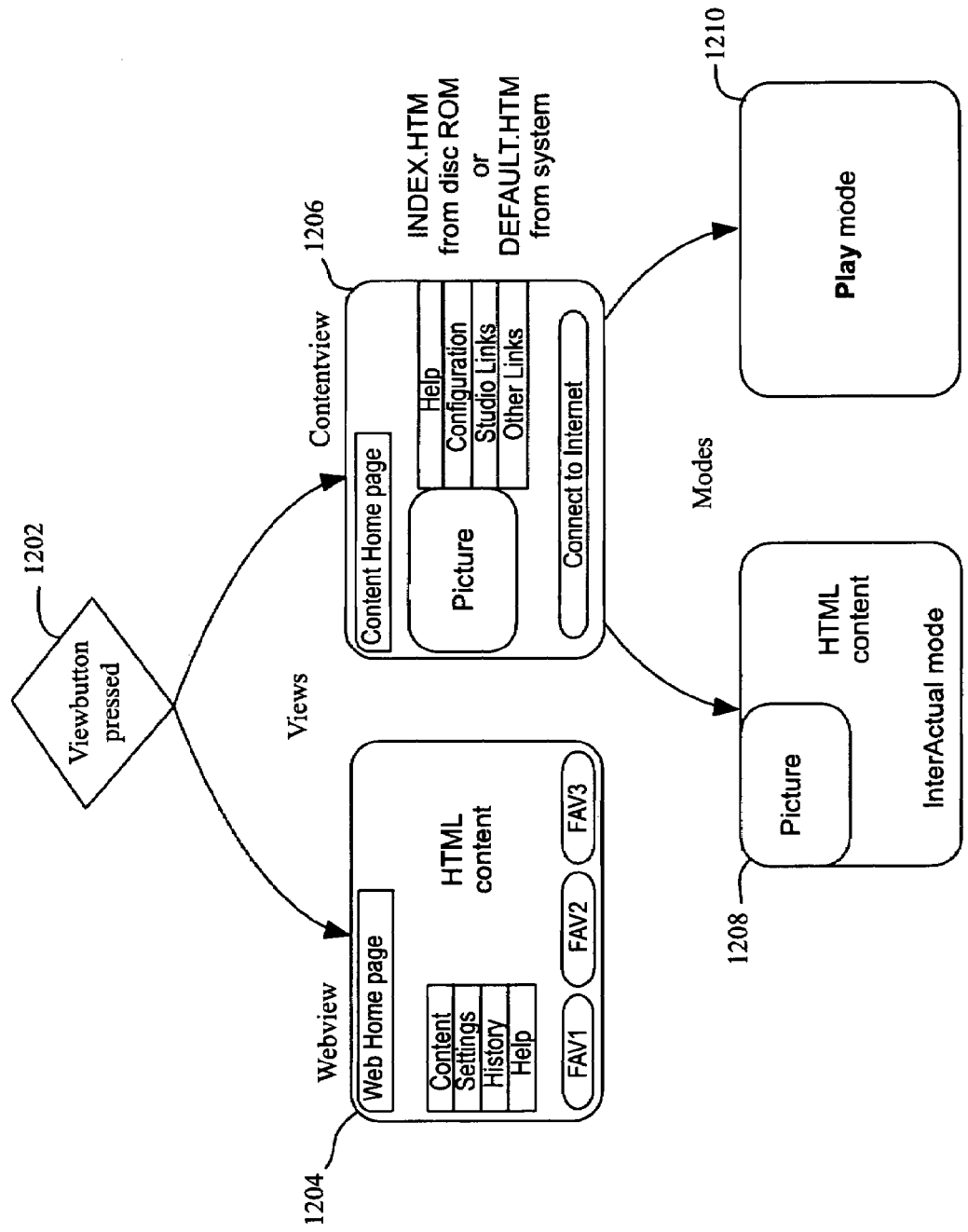
FIG. 12 shows a depiction of user interaction using a remote control.

Referring to FIG. 12, shown is a depiction of user interaction using a remote control.

Shown are a "view button pressed" block (1202), a web view (1204), a content view (1206), an InterActual mode (1208), and a full-screen mode (1210).

A user has two views between which he or she can switch, one being from the world wide web (WWW) and the other being from the disk content. Users accessing a display device (102) by remote control has, in one embodiment, access to both views (or "worlds") at any time through the "view" button. Additionally, in one embodiment, a graphics subsystem can support this by having two graphic "planes," one for each view. By having a separate disk content view, the content owner can control the presentation of information (scripts, pictures, videos, etc.). This aids in merchandising of the content.

In the example of FIG. 12, by use of a remote control view button at "view button pressed" block (1202), the user can select either the web view (1204) or the content view (1206). The content view (1206) is the INDEX.HTM file (residing in the /COMMON directory on a disk) which is a cross-platform (or multi-platform) file designed to be viewable on substantially all of the supported platforms. Alternatively, the content view (1206) is the CONNECT.HTM file from the storage of the device (used in lieu of the INDEX.HTM, for example, when no disk is inserted, or when a disk not in accordance with the present embodiment is inserted).

The web view (1204) is the InterActual-compatible device's "home page." This page is under the control of the device manufacturer. As an example, this page may contain the manufacturer's logo and/or system (device) specific information. Alternatively, this page may be determined by user-controlled settings of the device.

The content view (1206) is the content "home page" and resides at /COMMON/INDEX.HTM (on a disk) or as CONNECT.HTM in the device's memory (e.g. flash ROM). Depending on the player mode of the device, the content view (1206) can default to either "InterActual" mode (1208) or full-screen mode (1210).

When a disk contains "InterActual" content, the content authors can create it such that the user experience begins with the "InterActual" content. This is an option available to the disk authors at the time of authoring.

Figure 13:
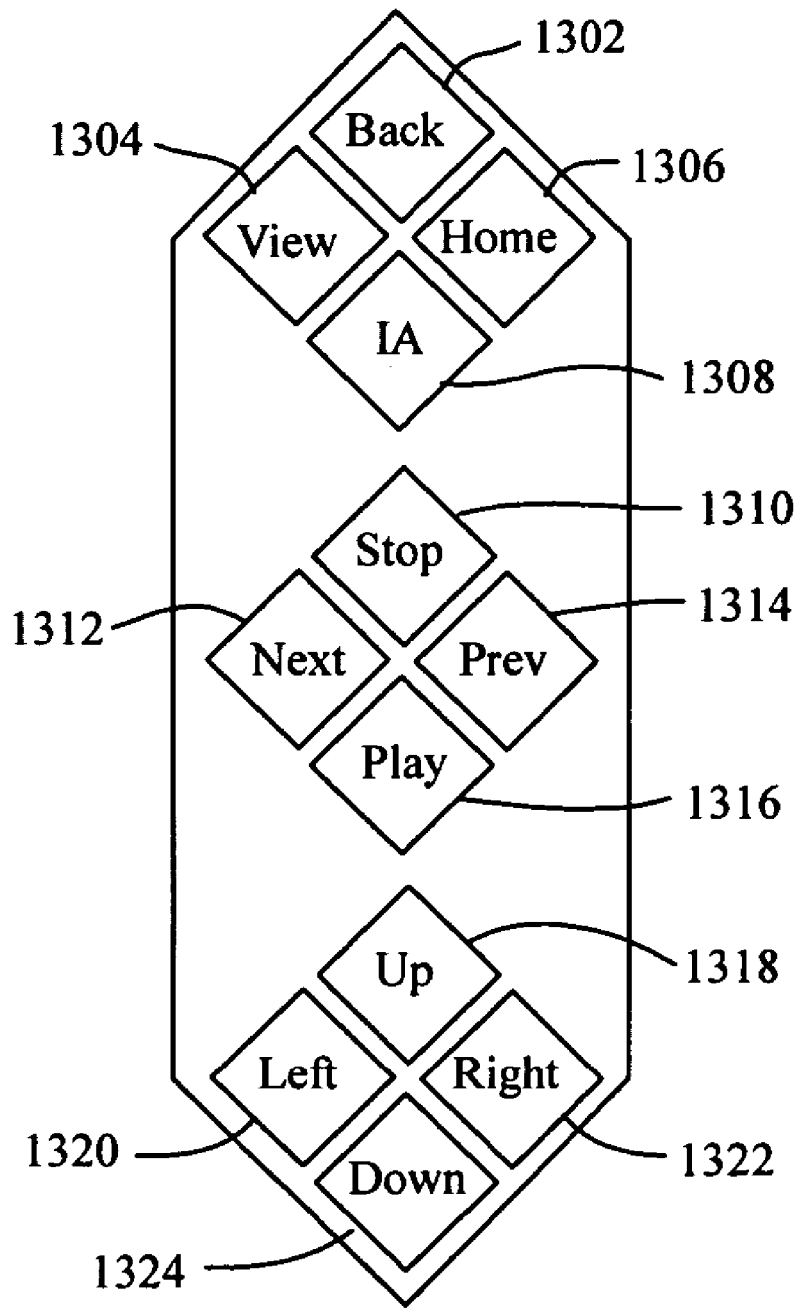
FIG. 13 shows a remote control according to an embodiment of the present invention.

Referring to FIG. 13, shown is a remote control according to an embodiment of the present invention.

Shown is a remote control (1300), having a back button (1302), a view button (1304), a home button (1306), an IA (InterActual) button (1308), a stop button (1310), a next button (1312), a prev button (1314), a play button (1316), an up button (1318), a left button (1320), a right button (1322), and a down button (1324).

The back button (1302) has different uses. In an Internet view, the back button (1302) goes back to the previously-visited web page. In a content (from disk) view, the back button (1302) goes back to the last web page or video/web page combination which was viewed.

The view button (1304) switches between a full-screen Internet (or web) view to a full-screen content (from disk) view.

The home button (1306) has different uses. In an Internet view, the home button (1306) goes to the device=s home page which, as example, could be the manufacturers page or a user-specified page if changed by the user. In a content (from disk) view, the home button (1306) goes to the content home page which, as example, could be INDEX.HTM from the disk ROM or CONNECT.HTM from the flash system memory.

The IA button (1308), or "InterActual" button, is a dedicated button which is discussed in greater detail under the subheading "context sensitive application" later herein in reference to FIG. 13.

The playback buttons, stop (1310), next (1312), prev (previous) (1314), and play (1316), control the video whenever there is video being displayed (either in full-screen mode or in a window). If no video is being displayed, pressing of the play button (1316), in one embodiment, loads a special page VIDPLAY.HTM if it is present in the /COMMON directory of an inserted disk ROM. If the VIDPLAY.HTM file is not found, pressing of the play button (1316), in one embodiment, plays the DVD in full-screen video mode.

The navigation buttons, up (1318), left (1320), right (1322), and down (1324), in one embodiment, do not work for DVD navigation unless video is playing in full-screen mode. If video is playing in a window within a web page, these buttons enable navigation of the web page, especially useful for navigating to and selecting HTML hyperlinks. In this embodiment, the windowed video will be a selectable hyperlink as well. Selecting the video window (by an enter button not shown) causes it to change to full-screen video. In another embodiment, a mouse or other pointing device such as a trackball, hand glove, pen, or the like can be integrated with the system.

Context Sensitive Application

In one embodiment, use of a unique event and a special button on the remote control (1300), a specific section in the media can trigger a context-sensitive action. Events that are used for this purpose are context sensitive to the media content. As example, an event can trigger during a certain scene, upon which, in response to a user's selection of an object within the scene can display information relating to the selected object.

In one embodiment, when media content subscribes to a particular event for context sensitive interaction, which can be done on a chapter or time basis, the DVD navigator can optionally overlay transparently some place on the display alerting the user that context-sensitive interaction is available. Similar to when a network logo is transparently displayed at the bottom of a television screen, in one embodiment, an InterActual logo is displayed to signify there is more info available for the displayed scene, and so forth. This ability is implemented through the media services (420) and the graphical subsystem of the DVD navigator (622).

Figure 14:
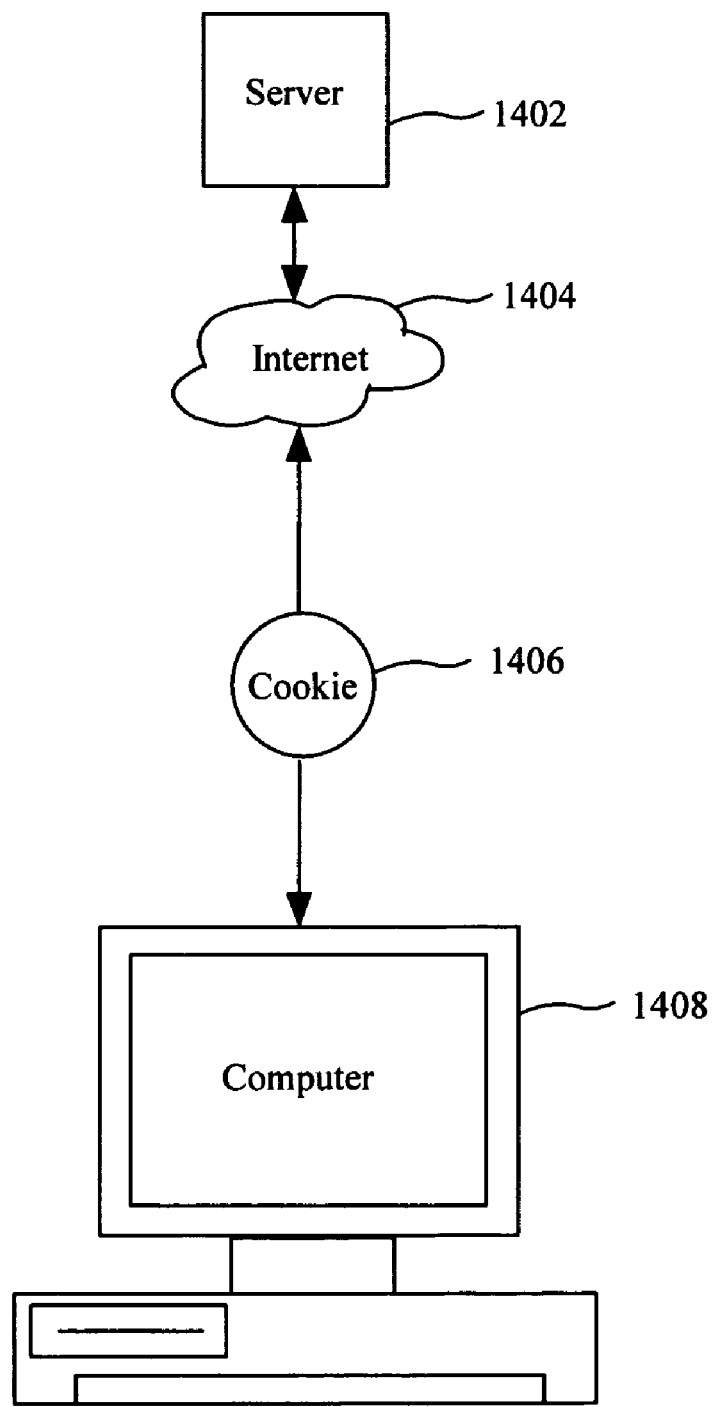
FIG. 14 shows an example of a computer to Internet connection according to one embodiment.

Regarding FIG. 14, shown is an example of a computer to Internet connection according to one embodiment.

Shown are a server 1402, an Internet 1404, a cookie 1406, and a computer 1408.

The server 1402 is coupled to the Internet 1404. The Internet (1404) is coupled to the computer (1408) with the cookie (1406) shown being communicated along the connection between the computer (1408) and the Internet (1404).

In operation, a user causes computer (1408) to access a web page resident on the server (1402) via the connections through the Internet. In so doing, the website containing the accessed web page causes the cookie (1406) to be sent to the computer (1408) and stored on a local storage drive for later reference by the storing website.

A cookie is information that a web site (server side program) puts on a client's computer or permanent storage so that information is retained from browsing session to browsing session (or later use in the same session). Typically, a cookie records user-specific information such as past user choices during interaction with the web site. Cookies are useful because the nature of the hypertext transfer protocol (HTTP) used by the World Wide Web (WWW) is that each web page request is completely independent of all other requests. Thus a cookie is a mechanism which allows a web site to retain access to past interaction history with particular clients.

The embedded browser supports two types of cookies, system cookies and general-purpose cookies. System cookies are predefined in both name and size as part of the Application programming interface (API). System cookies are automatically created and modified by the player hardware and embedded browser. General-purpose cookies are cookies that can be placed by web pages. Both system cookies and general-purpose cookies may be volatile or non-volatile (maintained even if storing system is powered off) depending on their specific function.

The following cookies are supported by the application programming interface (API):

Platform cookie, a non-volatile cookie of 32 bytes length that contains unique hardware information, including a hardware identifier for the device.

UserID cookie, a non-volatile cookie of 32 bytes length that contains unique user login information (useful for multi-user households).

An application programming language version cookie, a non-volatile cookie of 32 byte in length which maintains version information for the supported levels of the application programming interface (API).

Player Mode cookie, a non-volatile cookie of 32 bytes length which maintains the default player mode for the Application programming interface (API) playback, movie mode, or InterActual mode.

Disk cookie, a volatile cookie of 214 bytes length which contains currently inserted disk information including a unique ID generated by local hardware based on hashing algorithm provided by InterActual and (2) the id field from PCFreindly titles (based on the file DISC.ID) provided the disk is a PCFreindly (PCF) disk. This cookie is generated with null content when no disk is currently in the drive.

The application programming interface (API) also provides for a minimum of 100 general-purpose cookies that can be used by general web sites. Each of these cookies can be up to 200 bytes in size, therefore the minimum storage requirement for cookies is determined as follows:

4 reserved 32 byte system cookies=128 bytes
1 reserved 214 byte system cookie=214 bytes
100 general-purpose cookies of 200 bytes=20,000 bytes
Thus total cookie storage is a minimum of 20,342 bytes.

Figure 15:
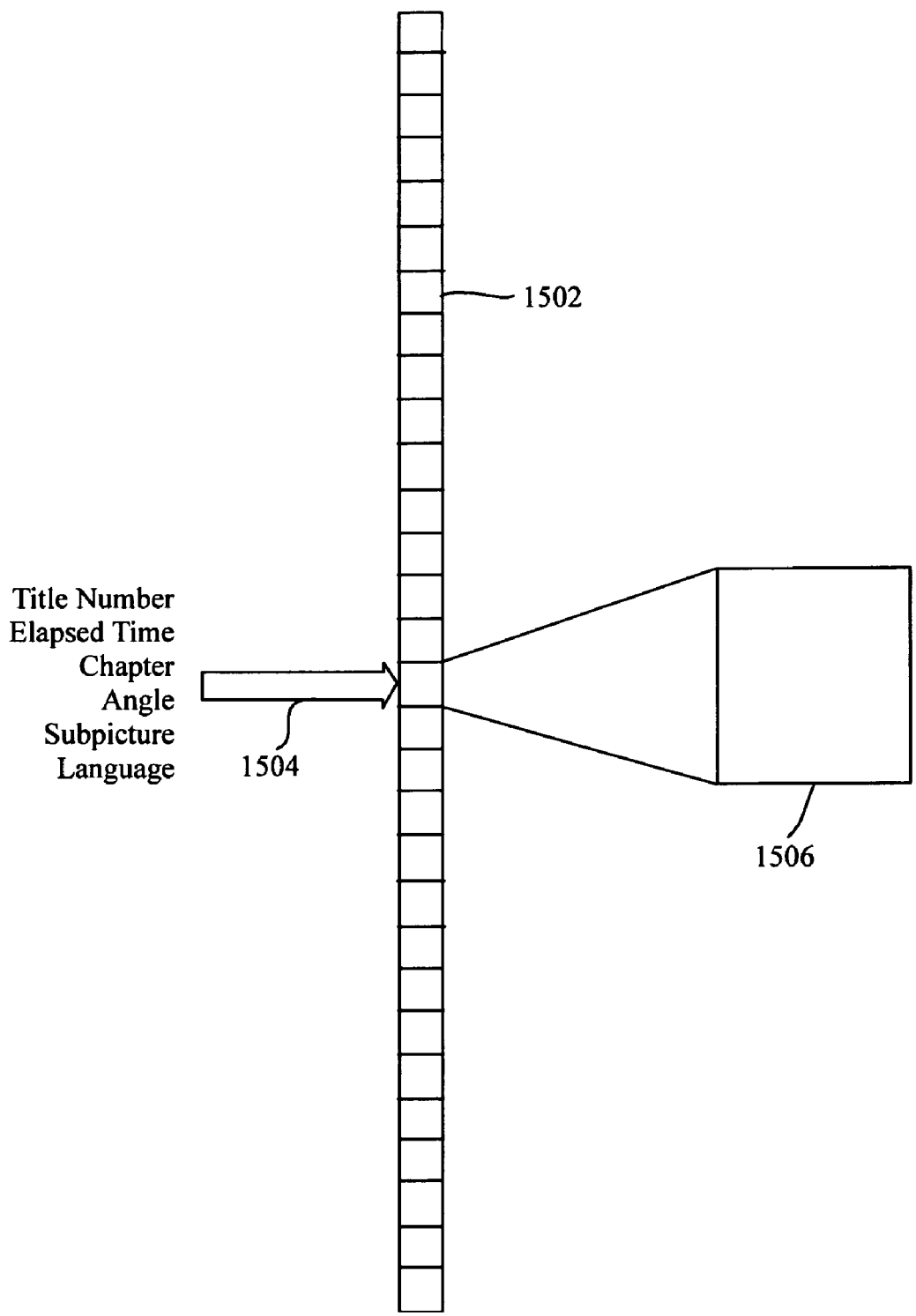
FIG. 15 shows an example of a bookmark according to one embodiment.

Referring to FIG. 15, shown is an example of a bookmark according to one embodiment.

Shown are a video (1504), a bookmark (1504), and a screen image (1506).

In operation, bookmark (1504) records the necessary information to return to the same point in the video playback of video (1502) by recording the title number, time position, chapter, angle, sub picture, and language.

Bookmarks maintain the state of player by storing general parameter registers (GPRMs) for a specific title. Video bookmarks mark where the video player state was last. For the application programming interface (API), one bookmark per title is required. In one embodiment, 32 bookmarks are recommended.

A bookmark has a minimum size of 10 bytes. There is at least one bookmark per disk. These bookmarks are managed in a queue such that creating a new bookmark for a specific disk (using the disk cookie) will overwrite the last bookmark in the queue for that disk provided the queue is full. If a new disk is encountered, the oldest bookmark of the set is overwritten. In one embodiment, a capacity of 32 bookmarks is required, which requires a minimum of 320 bytes of persistent storage.

A more detailed treatment of bookmarks and the bookmark queue is presented in Application programming interface (API) Specification@ (hereby incorporated by reference).

Bookmark structure is described in table 1.

TABLE 1

| byte offset | field name | description | data type |
|---|---|---|---|
| 0 | TitleNumber | number of title (1-99) | signed byte |
| 1-5 | ElapsedTime | time in elapsed milliseconds from start (0 to 2^31 − 1) | signed 4 byte |
| 6 | Chapter | Chapter (1-99) | signed byte |
| 7 | Angle | Angle (1-9) | signed byte |
| 8 | sub picture | Sub picture (0-31) | signed byte |
| 9 | AudioLang | Audio Language (1-99) | signed byte |

Content Caching

In an embodiment, one megabyte (1 MB) of cached simultaneous content is recommended. In an embodiment, the cache size should be specified in the hypertext transfer protocol (HTTP) header sent between the player and attached servers. Larger local storage for caching web pages and the like can be used with the present invention.

Content Support

In one embodiment, the Application programming interface (API) content support for fully compatible InterActual-compliant devices is defined in the two areas of content format support and content type support as follows:

Content Format Support

Content format support, according to one embodiment of the present invention, includes hypertext transfer protocol (HTTP) version 1.0, hypertext markup language (HTML) version 4.0 (frames, tables, event handler extensions), (CSS) version 1, (DOM) version 0, ECMAScript version 1.1 (note ECMAScript and DOM 0 is equivalent to JavaScript version 1.1. Requires platform and language detection), (SSL) version 2.0, Application programming interface (API) version 1.0 (embedding, commands, properties, and events), cookies (used to store hardware platform information and essential disk identification information).

Content Type Support

Mandatory content type support includes MPEG1 and MPEG2 video files, WAV, AU, AIFF, and MP3 audio files, GIF, JPEG, and PNG graphics files Advanced Format Support The advanced format support is not required for a standard implementation. Advanced formats include, but are not limited to, Macromedia Flash (this is encouraged as Flash is very popular for studio DVDs), extensible markup language (XML), Chat, and streaming media such as MPEG4, Real Player, and Quicktime. With the advent of modem and other advanced Internet connectivity solutions, more additions to the advance format capabilities will be made.

More Complex Menu Structures

A DVD-Video is shipped with a simple HTML page that does little except start a movie. However, it also checks to see if that movie has any web site updates. If it does, then it launches a new movie menu that is downloaded from the web. Obviously, the downloaded menu can be designed much later than the DVD. The menu may have e-commerce opportunities, such as promoting gifts for purchase, tickets for the sequel to the movie on the DVD, etc. The window of time of these opportunities is decided by the content owner and is completely independent of the DVD. The menu can have links to actors/actresses featured in the DVD. Additionally, the menu can provide options to navigate the DVD with finer granularity than the original chapters on the DVD provide.

Special Coupon from Retailer

DVDs authored with different logos at the head (such as logos for Best Buy, Circuit City, or the like) can be used for advertising purposes. For example, the disk start-up can be specified to display the logo of the original retailer and the consumer can be directed to access the retailer's website for promotional advertisements. This can be accomplished by checking the burst cutting area (BCA) on the disk which would indicate the identity of the retailer.

InterActual Application Programming Interface

Following is presented an exemplary list of the commands, properties, and events for several embodiments of the InterActual Programming Interface. This list is presented as follows:

A The DVD-Video and CD-Digital Programming Interface

| A.1 | Commands |
| A.2 | Properties |
| A.3 | Events |
| A.4 | Interface Applicability |

B The DVD-Audio Specific Interface

| B.1 | Commands |
| B.2 | Properties |
| B.3 | Events |

C Advanced InterActual API

| C.1 | Commands |
| C.2 | Properties |
| C.3 | Events |

A The DVD-Video and CD-Digital Programming Interface

A.1 Commands

Commands will control the playback and navigation mechanisms of a DVD-Video/Audio or CD-DA disc. Commands can be used by the calling application (HTMUJavaScript) to initiate these functions. This section provides a detailed description of each InterActual command with its associated parameters.

1) All commands support return values. These will all be JavaScript numbers, however the underlying API implementation should set a signed 4-byte (32-bit) value for each of these.

2) Each command lists applicable return values.

3) A "−3" will be returned for commands not supported by a specific system or navigator.

A.1.1 InterActual.Play( )

Summary
  Starts playback of the DVD.
Parameters:
  None required
Example
  This command controls playback of the video.
  InterActual.Play( )
Notes:
  For DVD Video this command starts playing from the First Play PGC. See also: InterActual.PlayTitle(t); InterActual.PlayChapter(t,c); InterActual.PlayTime(t,h,m,s,x)
Media Supported:

| DVD Video | DVD Audio | CD Audio |
|---|---|---|
| x | x | x |

Return Values:

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.2 InterActual.PlayTitle(t)

Summary
  Start playback at the specified title number.
Parameters:

| t | Title number ranging from 1-99; signed 1 byte integer |
|---|---|

Example
  Play title number 3.
  InterActual.PlayTitle(3)
Notes:
  This command requires that the UOP2 operation is permitted.
See also:
  InterActual.Play( ); InterActual.PlayTime(t,h,m,s,x); InterActual.PlayChapter(t,c)
Media Supported:

| DVD Video | DVD Audio | CD Audio |
|---|---|---|
| x | | |

Return Values:

| Number | Name | Description |
|---|---|---|
| 0 | OK | Successful |
| −1 | GeneralError | Unknown error condition |
| −2 | UOPNotAllowed | Operation not allowed by current UOP fields |
| −5 | NoDisc | Attempt to play with no disc |
| −6 | ParmRangeErr | Parameter out of range or invalid |

A.1.3 InterActual.PlayChapter(t,c)

Summary
  Start playback at the specified title number and chapter value. Parameters:

| t | Title number ranging from 1-99; signed 1 byte integer |
|---|---|
| c | Chapter number ranging from 1-99 for One_Sequential_PGC_Title Chapter number ranging from 1-999 for Multi_PGC_Title Signed 2 byte integer |

Example
  Play the $2^{nd}$ chapter of title number 6.
  InterActual.PlayChapter(6,2)
Notes:
  If in TT_DOM and already within specified title, InterActual.SearchChapter is issued to maintain GPRM values. Otherwise, InterActual.PlayChapter is issued.
Requires:
  This command requires that the UOP1 operation be permitted.
See also:
  InterActual.PlayTitle(t); InterActual.SearchChapter(c)
Media Supported

| DVD Video | DVD Audio | CD Audio |
|---|---|---|
| x | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −5 | NoDisc | Attempt to play with no disc |
| −6 | ParmRangeErr | Parameter out of range or invalid |

A.1.4 InterActual.PlayChapterAutoStop(t,c,n)

Summary:
  Start playback of the specified title t at chapter c for n chapters.
Parameters:

| t | Title number ranging from 1-99; signed 1 byte integer |
|---|---|
| c | Chapter number ranging from 1-99 for One_Sequential_PGC_Title Signed 2 byte integer |
| n | Number of chapters to play ranging from 1-998; a value of "1" signifies that the chapter "c" will be played and play will stop after that chapter; Signed 2 byte integer |

Example
    Play the 2$^{nd}$, 3$^{rd}$ and 4$^{th}$ chapters of title number 6.
        InterActual.PlayChapterAutoStop(6,2,3)
Requires:
    This command requires that the UOP1 operation be permitted.
See also:
    InterActual.PlayChapter(t,c)
Media Supported

| DVD Video | DVD Audio | CD Audio |
|---|---|---|
| X | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −5 | NoDisc | Attempt to play with no disc |
| −6 | ParmRangeErr | Parameter out of range or invalid |

A.1.5 InterActual.PlayTime(t,h,m,s,x)
Summary:
    This command starts playback in the specified title number (t) at the specified time in hours (h), minutes (m), seconds (s) and milliseconds (x). For DVD-Audio, the first parameter represents the title group number (t).
Parameters

| | |
|---|---|
| t | DVD-Video: Title number ranging from 1-99
DVD-Audio: Title group number ranging from 1-9
CD-Audio: Track number ranging from 0-99 where
    if t = 0 then h, m, s are relative to the
    start of the CD-Audio,
    else t is the track number and
    the h, m, s are relative to that track
Signed 1 byte integer |
| h | Hours where h can range from 00-23; signed 1 byte integer |
| m | Minutes where m can range from 00-59; signed 1 byte integer |
| s | Seconds where s can range from 00-59; signed 1 byte integer |
| x | Milliseconds where x can range from 0-999
(e.g. 1 would be interpreted as 0.001 second;
for video, this will be rounded to the nearest frame)
Signed 2 byte integer |

Examples:
    Start playing from the specified time position of the current title. For example to play title 2 from 1 hour, 10 minutes, 30 seconds, millisecond 79 in the title
    InterActual.PlayTime(2,1,10,30,79)
Notes:
    If in TT_DOM or TT_GR_DOM and already within a specific title, InterActual.SearchTime is issued to maintain GPRM values. Otherwise, InterActual.PlayTime is issued and the GPRM registers are initialized.
Requires:
    DVD-Video: This command requires that the UOP0 operation be permitted.
See also:
    InterActual.SearchTime(h,m,s,x)
Media Supported:

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.6    InterActual.PlayTimeAutoStop(t,sh,sm,ss,sx,eh,em,es,ex)
Summary
    This command starts playback in the specified title number (t) at the specified start time in hours (sh), minutes (sm), seconds (ss) and milliseconds (sx) and ends at the specified end time (using the same variables for hours, minutes, seconds and milliseconds: eh, em, es, ex). For DVD-Audio, the first parameter represents the title group number (t).
Parameters

| | |
|---|---|
| t | DVD-Video: Title number ranging from 1-99
DVD-Audio: Title group number ranging from 1-9
CD-Audio: Track number ranging from 0-99 where
    if t = 0 then h, m, s are relative to the
    start of the CD-Audio,
    else t is the track number and
    the h, m, s are relative to that track
Signed 1 byte integer |
| sh | Start hour where h can range from 00-23;
Signed 1 byte integer |
| sm | Start minutes where m can range from 00-59;
Signed 1 byte integer |
| ss | Start seconds where s can range from 00-59;
Signed 1 byte integer |
| sx | Start milliseconds where x can range from 0-999
(e.g. 1 would be interpreted as 0.001 second;
for video, this will be rounded to the nearest frame);
Signed 2 byte integer |
| eh | End hour where h can range from 00-23;
Signed 1 byte integer |
| em | End minutes where m can range from 00-59;
Signed 1 byte integer |
| es | End seconds where s can range from 00-59;
Signed 1 byte integer |
| ex | End milliseconds where x can range from 0-999
(e.g. 1 would be interpreted as 0.001 second;
for video, this will be rounded to the nearest frame)
Signed 2 byte integer |

Examples
    Start playing from the specified time position of the current title to the end position. For example to play title 2 from 1 hour, 10 minutes, 30 seconds, millisecond 79 in the title to 1 hour, 11 minutes, 30 seconds and 0 milliseconds:
    InterActual.PlayTimeAutoStop(2,1,10,30,79,1,11,30,0)

Requires
    DVD-Video: This command requires that the UOP0 operation be permitted.

See also
    InterActual.PlayTime(t,h,m,s,x)

Media Supported

| DVD Video | DVD Audio | CD Audio |
|---|---|---|
| X | X | X |

Return Values

| No. | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.7 InterActual.PlayTrack(g,t)

Summary
    Start playback at the beginning of the specified track number with the selected title group number.

Parameters

| | |
|---|---|
| g | DVD-Audio: Title group number ranging from 1-9 (within a Volume); signed 1 byte integer<br>CD-Audio: Ignored |
| t | Track number ranging from 1-99; signed 1 byte integer |

Example
    Start playing the $2^{nd}$ track of title group 1.
    InterActual.PlayTrack(1,2)

Notes
    If in TT_GR_DOM and already within specified title group, InterActual.SearchTrack is issued to maintain GPRM values. Otherwise, InterActual.PlayTrack is issued. In case of CD-DA, group number should be 1 by default.
    This method shall not be used for the playing a Hidden Track. The method InterActual.HiddenPlayTrack( ) shall be used instead.

See also:
    InterActual.SearchTrack(t); InterActual.PlayTitleGroup(g)

Media Supported:

| DVD Video | DVD Audio | CD Audio |
|---|---|---|
| | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.8 InterActual.SearchChapter(c)

Summary
    Jump to the beginning of the specified chapter within the current title.

Parameters

| | |
|---|---|
| c | Chapter number ranging from 1-99 for One_Sequential_PGC_Title<br>Chapter number ranging from 1-999 for Multi_PGC_Title; Signed 2 byte integer |

Example
    Play the $2^{nd}$ chapter of currently playing title.
    InterActual.SearchChapter(2)

Notes:
    Maintains current GPRM values.

Requires:
    This command requires that the UOP1 and UOP5 operations are permitted.

See also:
    InterActual.PlayTitle(t); InterActual.PlayChapter(t,c)

Media Supported

| DVD Video | DVD Audio | CD Audio |
|---|---|---|
| x | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −5 | NoDisc | Attempt to play with no disc |
| −6 | ParmRangeErr | Parameter out of range or invalid |

A.1.9 InterActual.SearchTime(h,m,s,x)

Summary
    This command starts playback at the specified time in hours (h), minutes (m), seconds (s) and milliseconds (x).

Parameters

| | |
|---|---|
| h | Hours where h can range from 00-23; signed 1 byte integer |
| m | Minutes where m can range from 00-59; signed 1 byte integer |
| s | Seconds where s can range from 00-59; signed 1 byte integer |
| x | Milliseconds where x can range from 0-999 (e.g. 1 would be interpreted as 0.001 second; for video, this will be rounded to the nearest frame)<br>Signed 2 byte integer |

Examples
   Start playing from the specified time position of the current title. For example to play from 1 hour, 10 minutes, 30 seconds, millisecond 200 in the title
   InterActual.SearchTime(1, 10, 30, 200)
Notes
   Maintains current GPRM values. For CD-Audio, h, m, s are relative to the start of the CD-Audio.
Requires
   DVD-Video: This command requires that the UOP0 and UOP5 operations are permitted.
See also:
   InterActual.PlayTime(th,m,s,x)
Media Supported

| DVD Video | DVD Audio | CD Audio |
|---|---|---|
| X | X | X |

Return Values

| Number | Name | Description |
|---|---|---|
| 0 | OK | Successful |
| −1 | General Error | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.10 InterActual.SearchTrack(t)
Summary:
   Start playback at the beginning of the specified track number with the current title group number.
Parameters

| t | Track number ranging from 1-99; signed 1 byte integer |
|---|---|

Example
   Start playing the 3$^{rd}$ track of the current title group.
   InterActual.SearchTrack(3)
Notes
   GPRM values are maintained. Should also work for CD-DA.
See also:
   InterActual.PlayTrack(g,t);
   InterActual.PlayTitleGroup(g)
Media Supported

| DVD Video | DVD Audio | CD Audio |
|---|---|---|
|  | x | x |

Return Values

| No. | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.11 InterActual.TotalNumChapters(t)
Summary
   Returns the total number of chapters (Part of Titles—PTT) available for current title/title group.
Parameters

| t | Title Number ranging from 1-99; signed 1 byte integer |
|---|---|

Return Value

| JavaScript Number | Signed 2 byte integer; Number of chapters (or PTTs) ranging from 1-999 |
|---|---|

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

Example
   Query the total number of chapters in the title/title group.
   TotalChapters=InterActual.TotalNumChapters(1)
Notes
   The Title Group range is only from 1-9.
Media Supported

| DVD Video | DVD Audio | CD Audio |
|---|---|---|
| X | X |  |

A.1.12 InterActual.NextPG( )
Summary
   Halts playback of the current presentation and starts the presentation from the beginning of the next Program within the same Program Chain (PGC).
Parameters
   None required
Example
   DVD-Video Example: Proceed to the next program, skipping the remainder of the current program of the current title.
   InterActual.NextPG( )
Notes
   DVD-Video: Valid in both the title and menu domains. For a One Sequential PGC Title, this method halts playback of the current program and starts playback from the next program within the title.

DVD-Audio: Valid in only video-capable DVD-Audio player, and only in the Audio Manager domain.

Media Supported

| DVD Video | DVD Audio | CD Audio |
|---|---|---|
| x | x | |

Return Values

| No. | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.13 InterActual.PrevPG( )

Summary

Halts playback of the current presentation and starts the presentation from the beginning of the previous Program with the same Program Chain (PGC).

Parameters

None required

Example

DVD-Video example: Proceed to the previous program of the current title.

InterActual.PrevPG( )

Notes

DVD-Video: Valid in both the title and menu domains. For a One Sequential PGC Title, this method halts playback of the current program and starts playback from the start of the current program within the title (same as TopPG_Search). If playback is within 10 seconds of the start of a program, however, this method will force the presentation to go to the start of the previous program. If already in first program, then playback starts at beginning of the program upon InterActual.PrevPG( ).

DVD-Audio: Valid in only video-capable DVD-Audio player, and only in the Audio Manager domain.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.14 InterActual.GoUp( )

Summary

Halts playback of the current Program Chain (PGC) and starts the playback of the new PGC which is specified as GoUp_PGCN.

Parameters

None required

Example

Proceed to the PGC specified as the GoUp_PGCN in the PGCI.

InterActual.GoUp( )

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.15 InterActual.NextTrack( )

Summary

Halts playback of the current track and starts playback from the next track in the same Title Group.

Parameters

None required

Example

Skip to the next track

InterActual.NextTrack( )

Media Supported

| DVD Video | DVD Audio | CD Audio |
|---|---|---|
| | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.16 InterActual.PrevTrack( )

Summary

Halts playback of the current track and starts playback from the start of the current track. If it is at the start of a track, it will go to the start of the previous track.

Parameters

None required

Example

Skip back to the previous track.

InterActual.PrevTrack( )

Notes

This method halts playback of the current track and starts playback from the start of the current track within the title group (same as TopTK_Search). If playback is within 10 seconds of the start of a track, however, this method will force the presentation to go to the start of the previous track (same as PrevTK_Search). If already in first track, then playback starts at beginning of the track upon InterActual.PrevTrack( ).

Media Supported

| DVD Video | DVD Audio | CD Audio |
|---|---|---|
|  | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.17 InterActual.TotalTrackTime(t)
Summary
 Returns the total time of track t in milliseconds (for CD-DA).
Parameters

| t | CD-DA track number ranging from 1-99; signed 1 byte integer |
|---|---|

Return Value

| Number | Name | Description |
|---|---|---|
| −1 | GeneralError | Unknown error condition |
| −5 | NoDisc | Attempt to play with no disc |
| −6 | ParmRangeErr | Parameter out of range or invalid |

Example
 Query the length of track 5.
 Track5Length=InterActual.TotalTrackTime(5)
Media Supported

| DVD Video | DVD Audio | CD Audio |
|---|---|---|
|  |  | X |

A.1.18 InterActual.Pause( )
Summary
 Pause playback of the DVD (pause is on). Subsequent use of this command resumes playback (e.g. pause is off). In other words, this method operates in a "toggle" fashion.
Parameters
 None required
Example
 Pause the playback.
 InterActual.Pause( )
Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.19 InterActual.Stop( )
Summary
 Stops the playback of the current media Stops execution of the current PGC and transfers to the "Stop State".
Parameters
 None required
Example
 Stop playback of the current DVD.
 InterActual.Stop( )
Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.20 InterActual.FastForward(x)
Summary
 This command fast-forwards the current DVD at speed x.
Parameters

| x | x can range from 2-99; signed 1 byte integer For CD-DA, the number 2-99 correlates to the number of seconds to advance and resume playback. |
|---|---|

Example
 Fast-forwards the current DVD at 8× speed.
 InterActual.FastForward(8)
Notes
 Some players may only allow values of 2, 4, 8, 16, and 32. If this command is used with a value not in the list, then the underlying software will approximate to the nearest available value (for instance 3 is specified and 4 is chosen) rather than return with an error code.
Media Supported

| DVD Video | DVD Audio | CD Audio |
|---|---|---|
| X | X | X |

Return Values

| No. | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.21 InterActual.Rewind(x)
Summary
  Rewind or reverse play the current DVD at speed x.
Parameters

| x | x can range from 2-99; signed 1 byte integer For CD-DA, the number 2-99 correlates to the number of seconds to rewind and resume playback. |
|---|---|

Example
  Rewind the current DVD at 8× speed.
  InterActual.Rewind(8)
Notes
  Some players may only allow values of 1, 2, 4, 8, 16, and 32. If this command is used with a value not in the list, then the underlying software will approximate to the nearest available value (for instance 3 is specified and 4 is chosen) rather than return with an error code.
Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.22 InterActual.Menu(menuID)
Summary
  This command jumps to the selected menuID.
Parameters

| menuID | Menu choices for DVD-Video:<br>0: reserved<br>1: Title Menu<br>2: Root Menu<br>3: Chapter Menu<br>4: Audio Languages Menu<br>5: Sub-picture Languages Menu<br>6: Angle Menu<br>Signed 1 byte integer |
|---|---|
| "" | DVD-Audio does not support a menu ID. For DVD-Audio, the Menu method calls the Entry PGC in the Audio Manager Menu. |

Example
  DVD-Video: To call the Root Menu of the current VTS
  InterActual.Menu(2)
Notes
  All menus are optional and not necessarily present on each DVD disc.
Requires
  DVD-Video: The associated menu UOP must permit the operation: Title Menu (UOP10), Root Menu (UOP11), Sub-picture Menu (UOP12), Audio Menu (UOP13), Angle Menu (UOP14), Chapter Menu (UOP15).
See also:
  InterActual.Resume( )
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

A.1.23 InterActual.Resume( )
Summary
  Resume the playback interrupted by a menu call.
Parameters
  None required
Example
  We will resume video or audio playback after a menu call.
  InterActual.Resume( )
Notes
  This is called after a Menu command and it is only valid from a Menu.
See also:
  InterActual.Menu(menuID)
Media Supported

| DVD Video | DVD Audio | CD Audio |
|---|---|---|
| x | x | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

A.1.24 InterActual.StillOff( )
Summary
  This command is the operation to release a Still (VOBU Still, Cell Still, PGC Still).
Parameters
  None required
Example
  The following releases the current still:
  InterActual.StillOff( )
Notes
  The Still is enforced by the Navigation system, versus a Pause that is enforced by User Operation. During a Still condition, the count of the Navigation Timer and General Parameters in Counter mode are continued as usual. However, this is not the case for Pause. Additionally, button functions are valid during a Still condition—not so for Pause.
Media Supported

| DVD Video | DVD Audio | CD Audio |
|---|---|---|
| X | X | |

Return Values

| No. | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

A.1.25 InterActual.SelectUpButton( )
Summary
  Selects the up direction button.
Parameters
  None required
Example
  Select the "up" direction button on the current menu.
  InterActual.SelectUpButton( )
See also:
  InterActual.SelectDownButton( );
  InterActual.SelectLeftButton( );
  InterActual.SelectRightButton( )
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

A.1.26 InterActual.SelectDownButton( )
Summary
  Selects the down direction button.
Parameters
  None required
Example
  Select the "down" direction button on the current menu.
  InterActual.SelectDownButton( )
See also
  InterActual.SelectUpButton( )
  InterActual.SelectLeftButton( )
  InterActual.SelectRightButton( )
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

A.1.27 InterActual.SelectLeftButton( )
Summary
  Selects the left direction button.
Parameters
  None required
Example
  Select the "left" direction button on the current menu.
  InterActual.SelectLeftButton( )
See also
  InterActual.SelectUpButton( )
  InterActual.SelectDownButton( )
  InterActual.SelectRightButton( )
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

A.1.28 InterActual.SelectRightButton( )
Summary
  Selects the right direction button.
Parameters
  None required
Example
  Select the "right" direction button on the current menu.
  InterActual.SelectRightButton( )

See also:
  InterActual.SelectUpButton( );
  InterActual.SelectDownButton( );
  InterActual.SelectLeftButton( )

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

A.1.29 InterActual.SelectButtonAndActivate(n)
Summary
  Activate the specified highlighted button, where n is the button number.
Parameters
  n Number of the button where n may range from 1-36; signed 1 byte integer
Example
  Select button number 2 on the current menu.
  InterActual.SelectButtonAndActivate(2)
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.130 InterActual.ActivateButton( )
Summary
  Activate the current highlighted button.
Parameters
  None required
Example
  Activate the currently highlighted button.
  InterActual.ActivateButton( )
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |

A.1.31 InterActual.SelectAudio(n)
Summary
  Sets the stream number of the Audio to play.
Parameters
  n DVD-Video:
    Number of the Audio streams in the Title Domain may range from 0 to 7
  DVD-Audio:
    The Audio selection may be changed to 0 or 1
  Signed 1 byte integer
Example
  Select audio stream number 1.
  InterActual.SelectAudio(1)
Notes
  The number of audio streams in Menu Domain is, at most, 1; the author either includes audio in a menu or not.
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.1.32 InterActual.SelectSubpicture(n)
Summary
  Sets the stream number of the Sub-picture to display.
Parameters

| n | DVD-Video: |
|---|---|
| | Number of the Sub-picture streams in the Title Domain may range from 0 to 31 |
| | DVD-Audio: |
| | The Sub-picture selection may range from 0 to 31 |
| | Signed 1 byte integer |

Example
  Select sub-picture number 23.
  InterActual.SelectSubpicture(23)
Notes
  This command is only applicable for the Title Domain.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.1.33 InterActual.SelectAngle(n)
Summary
   Sets the angle number of the Angle to play.
Parameters

| n | Angle number n ranging from 1-9; signed 1 byte integer |
|---|---|

Example
   Set the angle number to 3.
   InterActual.SelectAngle(3)
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.1.34 InterActual.SelectParentalLevel(n)
Summary
   Selects parental level of the player.
Parameters

| n | Parental level ranging from 1-8 where<br>1 = G<br>2 = Reserved<br>3 = PG<br>4 = PG13<br>5 = Reserved<br>6 = R<br>7 = NC-17<br>8 = Reserved<br>Signed 1 byte integer |
|---|---|

Example
   Set the Parental Level to 3 for PG.
   PG=3;
   InterActual.SelectParentalLevel(PG)

Notes
   At the start of playback of a DVD, this command can be used to select the level and the ParentalEvent will be raised. Thus, parents can use this to prevent playback of objectionable material.
   This command is only available in Stop State.
Media Supported

| DVD Video | DVD Audio | CD Audio |
|---|---|---|
| X | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −6 | ParmRangeErr | Parameter out of range or invalid |

A.1.35 InterActual.AudioLanguage(x, rc)
Summary
   Returns the audio language for specified audio stream number x.
Parameters

| x | Audio stream number ranging from 0-7<br>Signed 1 byte integer |
|---|---|
| rc | Character value; unsigned 2 bytes char represented by the coded "Language Symbols" defined in ISO-639.<br>See the language codes section in the appendix. |

Return Value

| Number | Name | Description |
|---|---|---|
| 0 | OK | Successful execution but code not specified |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
   Query the language for audio stream 3.
   AudioLang3=InterActual.AudioLanguage(3)
Media Supported

| DVD Video | DVD Audio | CD Audio |
|---|---|---|
| X | X | |

A.1.36 InterActual.AudioLanguageExtension(x)
Summary
   Returns the audio language extension for specified audio stream number x.
Parameters

| x | Audio stream number ranging from 0-7 |
|---|---|

Signed 1 byte integer

Return Value

| JavaScript Number | Unsigned 1 byte integer<br>See the language codes extensions section in the appendix. |
|---|---|

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  Query the language extension for audio stream 3.
   AudioLangExt3=InterActual.AudioLanguageExtension(3)
Media Supported

| DVD Video | DVD Audio | CD Audio |
|---|---|---|
| X | X | |

A.1.37 InterActual.SubpictureLanguage(x, rc)
Summary
  Returns the sub-picture language for specified sub-picture number x (sub-picture language is the 2-digit locale).
Parameters

| x | Sub-picture number ranging from 0-31<br>Signed 1 byte integer |
|---|---|
| rc | Character return value; unsigned 2 bytes char represented by the coded "Language Symbols" defined in ISO-639. See the language codes section in the appendix. |

Return Value

| Number | Name | Description |
|---|---|---|
| 0 | OK | Successful execution but code not specified |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  Query the locale for sub-picture 3.
   LocaleSubP23=InterActual.SubpictureLanguage(3)
Media Supported

| DVD Video | DVD Audio | CD Audio |
|---|---|---|
| X | X | |

A.1.38 InterActual.SubpictureLanguageExtension(x)
Summary
  Returns the sub-picture language extension for the specified sub-picture number x.
Parameters

| x | Sub-picture number ranging from 0-31<br>Signed 1 byte integer |
|---|---|

Return Value

| JavaScript Number | Unsigned 1 byte integer<br>See the language codes extensions section in the appendix. |
|---|---|

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  Query the language for sub-picture language extension 3.
   Lang3Ext=InterActual.SubpictureLanguageExtension(3)
Media Supported

| DVD Video | DVD Audio | CD Audio |
|---|---|---|
| X | X | |

A.1.39 InterActual.GetGPRM(r)
Summary
  Gets the specified General Parameter Register value.
Parameters

| r | General Parameter Register Number from 0 to 15; signed 1 byte integer |
|---|---|

Return Value

| JavaScript Number | Signed 4 byte (32-bit) value in the GPRM;<br>If the return value is zero (0) or any positive number, it can be assumed that the 2 low-order bytes are the register contents. If this value is negative, it is an error condition, which are listed below. |
|---|---|

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  Get the contents of GPPM(1)
   X=InterActual.GetGPRM(1)
Media Supported

| DVD Video | DVD Audio | CD Audio |
|---|---|---|
| X | X | |

A.1.40 InterActual.GetSPRM(r)
Summary
  Get the specified System Parameter Register value.

Parameters

| | |
|---|---|
| r | SPRM Register Number from 0 to 25; signed 1 byte integer<br>0: Menu Description Language Code (M_LCD or AMGM_LCD)<br>1: Audio Stream number (ASTN for TT_DOM, or ASLN for TT_GR_DOM)<br>2: Sub-picture stream number (SPSTN) and On/Off flag for TT_DOM<br>3: Angle Number (AGLN for TT_DOM)<br>4: Title Number (TTN for TT_DOM)<br>5: VTS Title Number (VTS_TTN for TT_DOM)<br>6: Title PGC number (TT_PGC for TT_DOM)<br>7: Part_of_Title number (PTTN) for One_Sequential_PGC_Title, or PG Number for TT_GR_DOM<br>8: Highlighted Button number (HL_BTNN) for Selection State<br>9: Navigation Timer (NV_TMR)<br>10: TT_PGCN for NV_TMR<br>11: Player Audio Mixing Mode (P_AMXMD) for Karaoke<br>12: Country Code (CTY_CD) for Parental Management<br>13: Parental Level (PTL_LVL)<br>14: Player Configuration (P_CFG) for Video<br>15: Player Configuration (P_CFG) for Audio<br>16: Initial Language Code (INI_LCD) for AST<br>17: Initial Language Code Extension (INI_LCD_EXT) for AST<br>18: INI_LCD for SPST<br>19: INI_LCD_EXT for SPST<br>20: Player Region<br>21: ATT Group Number (ATT_GRN)<br>22: ATT number (ATTN for TT_GR_DOM)<br>23: Track number (TKN for TT_GR_DOM)<br>24: ASV number (ASVN)<br>25: reserved |

Return Value

| | |
|---|---|
| JavaScript Number | Signed 4 byte (32-bit) value stored in the SPRM<br>If the return value is zero (0) or any positive number, it can be assumed that the 2 low-order bytes are the register contents. If this value is negative, it is an error condition, which are listed below. |

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  Get System Parameter Register 1
    X=InterActual.GetSPRM(1)
Media Supported

| DVD Video | DVD Audio | CD Audio |
|---|---|---|
| X | X | |

A.1.41 InterActual.ValidUOP(x)
Summary
  Check if a User Operation is valid. The disabled operations are defined on the disc itself. The main purpose of this command is to retrieve the current UOP status.
Note:
  The specific operation (UOP bit) is disabled when the corresponding bit is set to a "1".

Parameters

| | |
|---|---|
| Signed 4 byte (32-bit) | Bit Assignments:<br>0 = Time Play, Time Search<br>1 = PTT Play, PTT Search<br>2 = Title Play<br>3 = Stop<br>4 = Go Up<br>5 = Time Search, PTT Search<br>6 = Previous PG Search<br>7 = Next PG Search<br>8 = Forward Scan<br>9 = Backward Scan<br>10 = Title Menu Call<br>11 = Root Menu Call<br>12 = Sub-picture Menu Call<br>13 = Audio Menu Call<br>14 = Angle Menu Call<br>15 = Chapter Menu Call<br>16 = Resume<br>17 = Button Select/Activate<br>18 = Still Off<br>19 = Pause Off; Pause On<br>20 = Audio Stream Change<br>21 = Sub-picture Stream Change<br>22 = Angle Change; Parental level select<br>23 = Karaoke Presentation Mode Change<br>24 = Video Presentation Mode Change |

Return Value

| | |
|---|---|
| JavaScript Number | 0 = Permitted<br>1 = Prohibited<br>Signed 1 byte integer |

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  To retrieve and test the UOP bit for InterActual.PlayTime.
  if (InterActual.ValidUOP(0x01))
    f.write("Time Play is prohibited");
  else
    f.write("Time Play is permitted");
Media Supported

| DVD Video | DVD Audio | CD Audio |
|---|---|---|
| X | X | |

A.1.42 InterActual.GetBCAField( )
Summary
  Gets the 2-byte field from within the BCA for the current disc side.
Parameters
  None required
Return Value

| | |
|---|---|
| JavaScript Number | Signed 4 byte (32-bit) value from the BCA;<br>If the return value is zero (0) or any positive number, it can be assumed that the 2 low-order bytes are the BCA field contents |

-continued (unencrypted). These individual bits can be used to determine actions (like the start-up title) based on the specific disc (versus title).
If this value is negative, it is an error condition, which are listed below.

| Number | Name | Description |
|---|---|---|
| −1 | GeneralError | Unknown error condition |
| −2 | UOPNotAllowed | Operation not allowed by current UOP fields |
| −3 | NotSupported | File type or feature not supported at this time, in this case, the BCA is not accessible |

Example
Query for the BCA field:
BCA_Test bits=InterActual.GetBCAField( )
Media Supported

| DVD Video | DVD Audio | CD Audio |
|---|---|---|
| X | X | |

A.1.43 InterActual.SupportedFeatures(x)

Summary

Use this command to check if features are supported. A number is passed in to test a specific feature of the API corresponding to the capabilities of the current system. A "0" or "1" value is returned specifying if the feature is supported or not: If a "1" is returned, the corresponding feature is supported and a "0" means it is not supported.

Parameters

| Signed 1 byte | Index number corresponding to the command, property or events to be tested. See the table following for the list of number; ranging from 1-255 with "0" being a reserved value. |
|---|---|

Return Value

| JavaScript Number | 0 = Feature is not available |
|---|---|
| | 1 = Feature is available |
| | Signed 1 byte integer |

| Number | Name | Description |
|---|---|---|
| −1 | GeneralError | Unknown error condition |
| −2 | UOPNotAllowed | Operation not allowed by current UOP fields |
| −6 | ParmRangeErr | Parameter out of range or invalid |

Example

To retrieve the supported features for this InterActual device:

```
ZOOMPAN = InterActual.SupportedFeatures(IA_CMD_ZOOM)
if (ZOOMPAN)
{
    // can use Zoom . . .
}
```

Media Supported

| DVD Video | DVD Audio | CD Audio |
|---|---|---|
| X | X | X |

Index List

The interfaces are listed below in a form that will be used for authoring templates (defined using a "var" statement in JavaScript) to avoid having to specify the numerical value directly.

TABLE 5

(part 1) Supported Features Indices

| Interface | Index value |
|---|---|
| DVD-Video & CD-DA Basic | |
| Reserved | 0 |
| IA_CMD_PLAY | 1 |
| IA_CMD_PLAYTITLE | 2 |
| IA_CMD_PLAYCHAPTER | 3 |
| IA_CMD_PLAYTIME | 4 |
| IA_CMD_PLAYTRACK | 5 |
| IA_CMD_SEARCHCHAPTER | 6 |
| IA_CMD_SEARCHTIME | 7 |
| IA_CMD_SEARCHTRACK | 8 |
| IA_CMD_TOTALNUMCHAPTERS | 9 |
| IA_CMD_NEXTPG | 10 |
| IA_CMD_PREVPG | 11 |
| IA_CMD_GOUP | 12 |
| IA_CMD_NEXTTRACK | 13 |
| IA_CMD_PREVTRACK | 14 |
| IA_CMD_TOTALTRACKTIME | 15 |
| IA_CMD_PAUSE | 16 |
| IA_CMD_STOP | 17 |
| IA_CMD_FASTFORWARD | 18 |
| IA_CMD_REWIND | 19 |
| IA_CMD_MENU | 20 |
| IA_CMD_RESUME | 21 |
| IA_CMD_STILLOFF | 22 |
| IA_CMD_SELECTUPBUTTON | 23 |
| IA_CMD_SELECTDOWNBUTTON | 24 |
| IA_CMD_SELECTLEFTBUTTON | 25 |
| IA_CMD_SELECTRIGHTBUTTON | 26 |
| IA_CMD_SELECTBUTTONANDACTIVATE | 27 |
| IA_CMD_ACTIVATEBUTTON | 28 |
| IA_CMD_SELECTAUDIO | 29 |
| IA_CMD_SELECTSUBPICTURE | 30 |
| IA_CMD_SELECTANGLE | 31 |
| IA_CMD_SELECTPARENTALLEVEL | 32 |
| IA_CMD_AUDIOLANGUAGE | 33 |
| IA_CMD_AUDIOLANGUAGEEXTENSION | 34 |
| IA_CMD_SUBPICTURELANGUAGE | 35 |
| IA_CMD_SUBPICTURELANGUAGEEXTENSION | 36 |
| IA_CMD_GETGPRM | 37 |
| IA_CMD_GETSPRM | 38 |
| IA_CMD_VALIDUOP | 39 |
| IA_CMD_GETBCAFIELD | 40 |
| IA_CMD_SUPPORTEDFEATURES | 41 |
| IA_CMD_ENABLESUBPICTURE | 42 |
| IA_CMD_SETGPRM | 43 |
| IA_CMD_MUTE | 44 |
| IA_CMD_FULLSCREEN | 45 |
| IA_CMD_GOTOBOOKMARK | 46 |
| IA_CMD_SAVEBOOKMARK | 47 |
| IA_CMD_NETCONNECT | 48 |
| IA_CMD_SUBSCRIBETOEVENT | 49 |
| IA_CMD_PLAYCHAPTERAUTOSTOP | 50 |
| IA_CMD_PLAYTIMEAUTOSTOP | 51 |
| IA_CMD_NETDISCONNECT | 52 |
| Reserved | 53-59 |
| IA_PR_ELAPSEDTIME | 60 |
| IA_PR_TOTALELAPSEDTIME | 61 |
| IA_PR_TOTALTIME | 62 |

TABLE 5-continued (part 1) Supported Features Indices

| Interface | Index value |
|---|---|
| IA_PR_TITLENUMBER | 63 |
| IA_PR_PGCNUMBER | 64 |
| IA_PR_CHAPTERNUMBER | 65 |
| IA_PR_TRACKNUMBER | 66 |
| IA_PR_PLAYSTATE | 67 |
| IA_PR_DOMAIN | 68 |
| IA_PR_AUDIONUMBER | 69 |
| IA_PR_SUBPICTURENUMBER | 70 |
| IA_PR_ANGLENUMBER | 71 |
| IA_PR_PARENTALLEVEL | 72 |
| IA_PR_BUTTONNUMBER | 73 |
| IA_PR_TOTALNUMAUDIO | 74 |
| IA_PR_TOTALTRACKS | 75 |
| IA_PR_TOTALTITLES | 76 |
| IA_PR_TOTALNUMSUBPICTURE | 77 |
| IA_PR_TOTALNUMANGLE | 78 |
| IA_PR_TOTALNUMBUTTON | 79 |
| IA_PR_MAJORVERSION | 80 |
| IA_PR_MINORVERSION | 81 |
| IA_PR_PLAYERMODE | 82 |
| IA_PR_MAXFAST | 83 |
| IA_PR_MAXFASTREVERSE | 84 |
| IA_PR_MEDIAID | 85 |
| IA_PR_DISCTYPE | 86 |
| IA_PR_BOOKMARK | 87 |
| IA_PR_ROMTYPE | 88 |
| IA_PR_INTERNETSTATUS | 89 |
| IA_PR_FULLSCREENMODE | 90 |
| Reserved | 91-99 |
| IA_EV_TITLE | 100 |
| IA_EV_CHAPTER | 101 |
| IA_EV_PGC | 102 |
| IA_EV_TIME | 103 |
| IA_EV_TRACK_TIME | 104 |
| IA_EV_TRACK | 105 |
| IA_EV_ANGLE | 106 |
| IA_EV_STATE | 107 |
| IA_EV_SPEED | 108 |
| IA_EV_UOP | 109 |
| IA_EV_DOMAIN | 110 |
| IA_EV_AUDIO | 111 |
| IA_EV_SUBPICTURE | 112 |
| IA_EV_PARENTAL | 113 |
| IA_EV_REGION | 114 |
| IA_EV_EJECT | 115 |
| IA_EV_INSERT | 116 |
| IA_EV_GPRM | 117 |
| IA_EV_INFO | 118 |
| IA_EV_RC_BUTTON | 119 |
| IA_EV_NUMBER_OF_ANGLES | 120 |
| Reserved | 121-129 |

TABLE 5

(part 2) Supported Features Indices

DVD-Audio Basic

| | |
|---|---|
| IA_CMD_PLAYTITLEGROUP | 130 |
| IA_CMD_NEXTSLIDE | 131 |
| IA_CMD_PREVSLIDE | 132 |
| Reserved | 133-139 |
| IA_PR_TITLEGROUPNUMBER | 140 |
| IA_PR_SLIDENUMBER | 141 |
| Reserved | 142-144 |
| IA_EV_TITLE GROUP EVENT | 145 |
| IA_EV_SLIDE EVENT | 146 |
| Reserved | 147-149 |

TABLE 5

(part 3) Supported Features Indices

DVD-Video & CD-DA Advanced

| | |
|---|---|
| IA_CMD_OPEN | 150 |
| IA_CMD_SLOW | 151 |
| IA_CMD_STEP | 152 |
| IA_CMD_SLOWREVERSE | 153 |
| IA_CMD_ZOOM | 154 |
| IA_CMD_PAN | 155 |
| IA_CMD_ENABLECCTEXT | 156 |
| IA_CMD_MENULANGUAGE | 157 |
| IA_CMD_SELECTMENULANGUAGE | 158 |
| IA_CMD_SELECTPARENTALCOUNTRY | 159 |
| IA_CMD_SELECTKARAOKE | 160 |
| IA_CMD_SETMIXVOLUME | 161 |
| IA_CMD_CLOSE | 162 |
| IA_CMD_SHOWCONTROLS | 163 |
| IA_CMD_HIDECONTROLS | 164 |
| IA_CMD_SHOWCONTEXTMENU | 165 |
| IA_CMD_POPUPMENU | 166 |
| IA_CMD_SUPPRESSERRORS | 167 |
| IA_CMD_AUTOMOUSEHIDE | 168 |
| IA_CMD_OPENDRIVE | 169 |
| IA_CMD_LAUNCH | 170 |
| IA_CMD_PRESENTATIONMODE | 171 |
| IA_CMD_PRINT | 172 |
| IA_CMD_PLAYPERIODINTITLEAUTOSTOP | 173 |
| Reserved | 174-189 |
| IA_PR_CURRENTMENULANGUAGE | 190 |
| IA_PR_TOTALNUMMENULANGUAGE | 191 |
| IA_PR_PARENTALCOUNTRY | 192 |
| IA_PR_CCTEXTSTATUS | 193 |
| IA_PR_CCTEXT | 194 |
| IA_PR_MAXSLOW | 195 |
| IA_PR_MAXSLOWREVERSE | 196 |
| IA_PR_DISCREGION | 197 |
| IA_PR_DISCDIRECTORY | 198 |
| IA_PR_LOCALDIRECTORY | 199 |
| IA_PR_CURRENTZOOMX | 200 |
| IA_PR_CURRENTZOOMY | 201 |
| IA_PR_CURRENTPANX | 202 |
| IA_PR_CURRENTPANY | 203 |
| IA_PR_MIXVOLUME | 204 |
| IA_PR_FRAMESPERSECOND | 205 |
| Reserved | 206-220 |
| IA_EV_MOUSE EVENT | 221 |
| IA_EV_MENU BUTTON EVENT | 222 |
| IA_EV_KARAOKE EVENT | 223 |
| IA_EV_STILL EVENT | 224 |
| IA_EV_CC TEXT EVENT | 225 |
| IA_EV_FULLSCREEN | 226 |
| Reserved | 227-239 |

TABLE 5

(part 4) Supported Features Indices

DVD-Audio Advanced

| | |
|---|---|
| IA_CMD_HIDDENPLAYGROUP | 240 |
| IA_CMD_HIDDENPLAYTRACK | 241 |
| IA_CMD_HIDDENPLAYTIME | 242 |
| IA_CMD_SELECTTEXTLANGUAGE | 243 |
| Reserved | 244-255 |

A.1.44 InterActual.EnableSubpicture(n)

Summary

Enables or disables sub-pictures.

Parameters

| | |
|---|---|
| n | If n is 0, then disable Sub-pictures (off) |
| | If n is 1, then enable Sub-pictures (on) |
| | Signed 1 byte integer |

Example
    Disable sub-pictures.
    InterActual.EnableSubpicture(0)
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.1.45 InterActual.SetGPRM(r,x)
Summary
    Manually set the General Parameter Registers.
Parameters

| | |
|---|---|
| r | GPRM Register Number from 0 to 15; signed 1 byte integer |
| x | Unsigned 2 byte (16-bit) value to store in the GPRM |

Example
    Set GPRM 1 to 0x0045
    InterActual.SetGPRM(1,0x0045)
Notes
    This command should be used with caution.
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.1.46 InterActual.Mute( )
Summary
    Mutes the DVD or CD audio output.
Parameters
    None required Example
    With a DVD-video in the drive, mute the DVD-Video audio stream.
    InterActual.Mute( )
Notes
    This method acts as a toggle. To un-mute, issue InterActual.Mute( ) again.
Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

A.1.47 InterActual.FullScreen(w)
Summary
    Sets the video playback to full screen or in a window.
Parameters

| | |
|---|---|
| w | When w = 0, set windowed mode when w = 1, set full screen mode |
| | Signed 1 byte integer |

Example
    Set to full screen.
    InterActual.FullScreen(1)
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

A.1.48 InterActual.GotoBookmark(b)
Summary
    Continues playback at the bookmark saved for this disc.
Parameters

| | |
|---|---|
| b | Signed 1 byte integer ranging from 0-32 |
| | Number of the bookmark that is being used for resuming the playback, or if 0 is passed, resume playback using whatever bookmark exists for this disc |

Example
   Play from the bookmark (saved in MyBkMk) saved for this disc.
   InterActual.GotoBookmark(MyBkMk)
Notes
   The bookmarks are assigned a number internally when set. A GotoBookmark returns to the same position on the disc as when the bookmark was set (saved). When a bookmark is saved, it will overwrite any existing bookmark for this disc, should one exist. If all of the bookmarks in memory are used, it will overwrite the oldest bookmark. Because navigating to other HTML pages with embedded video can interrupt playback such that other bookmarks can be saved, care should be taken to resume playback using the desired bookmark. See Bookmarks in the appendix for a detailed layout of bookmarks. If the bookmark number is not known by the JavaScript, passing a parameter of 0 will use the last bookmark that was saved for this disc.
See also
   InterActual.SaveBookmark( )
Media Supported

| DVD Video | DVD Audio | CD Audio |
|-----------|-----------|----------|
| X | X | X |

Return Values

| Number | Name | Description |
|--------|------|-------------|
| 0 | OK | Successful |
| −1 | GeneralError | Unknown error condition |
| −2 | UOPNotAllowed | Operation not allowed by current UOP fields |
| −5 | NoDisc | Attempt to play with no disc |
| −6 | ParmRangeErr | Parameter out of range or invalid |
| −8 | IncorrectDisc | The bookmark specified is not for this disc |

A.1.49 InterActual.SaveBookmark( )
Summary
   Saves a bookmark for the current play location for this disc.
Parameters
   Return Value

| JavaScript Number | Signed 1 byte integer ranging from 1-32 number of the bookmark that is being saved |
|-------------------|----|

| Number | Name | Description |
|--------|------|-------------|
| −1 | GeneralError | Unknown error condition |
| −2 | UOPNotAllowed | Operation not allowed by current UOP fields |
| −5 | NoDisc | Attempt to play with no disc |

Example
   Save a bookmark for this disc and call it MyBkMk.
   MyBkMk=InterActual.SaveBookmark( )
Notes
   When a bookmark is saved, it will overwrite any existing bookmark for this disc, should one exist. If all of the bookmarks in memory are used, it will overwrite the oldest bookmark. See Bookmarks in the appendix for a detailed layout of bookmarks.

See also
   GotoBookmark(b)
Media Supported

| DVD Video | DVD Audio | CD Audio |
|-----------|-----------|----------|
| X | X | X |

A.1.50 InterActual.NetConnect( )
Summary
   Establish an Internet connection.
Parameters
   None required
Example
   Open connection.
   InterActual.NetConnect( )
Media Supported

| DVD Video | DVD Audio | CD Audio |
|-----------|-----------|----------|
| X | X | X |

Notes
   This command does not block, but when it is used in conjunction with the Net Event, the code can see the progress of establishing a connection and respond accordingly.
Return Values

| Number | Name | Description |
|--------|------|-------------|
| 0 | OK | Successful |
| −1 | GeneralError | Unknown error condition |
| −3 | NotSupported | File type or feature not supported at this time or not possible at this time |
| −7 | MemoryErr | Not enough memory for operation |

A.1.51 InterActual.NetDisconnect( )
Summary
   Inform the underlying system that an Internet connection is no longer required. The system setup parameters will determine whether to actually disconnect a session or not based on the system configuration.
Parameters
   None required
Example
   Open connection.
   InterActual.NetDisconnect( )
Media Supported

| DVD Video | DVD Audio | CD Audio |
|-----------|-----------|----------|
| X | X | X |

Notes
   This command does not block.

Return Values

| Number | Name | Description |
|---|---|---|
| 0 | OK | Successful |
| -1 | GeneralError | Unknown error condition |
| -3 | NotSupported | File type or feature not supported at this time or not possible at this time |
| -7 | MemoryErr | Not enough memory for operation |

A.1.52 InterActual.SubscribeToEvent(e, s)

Summary

All events listed in the base API are subscribed to, by default with the exception of "Info" event, index "21". Additionally, all advanced and platform-specific events are not subscribed to and must be explicitly subscribed to. A program can choose to subscribe or unsubscribe to an event using this command.

Parameters

| | |
|---|---|
| e | Event id, which is the index number as listed in the Event section of this document; it can range from 0-999; Signed 2-byte integer. |
| s | Subscription flag where s = 0 means unsubscribe and s = 1 means to subscribe to the event id contained in e; Signed 1 byte integer. |

Example

To subscribe to the Karaoke event:
InterActual.SubscribeToEvent(52,1)

Notes

If an attempt is made to subscribe to an event that is already subscribed to (for whatever reason), no error will be returned; rather the state of subscription will not change Media Supported

| DVD Video | DVD Audio | CD Audio |
|---|---|---|
| X | X | X |

Return Values

| Number | Name | Description |
|---|---|---|
| 0 | OK | Successful |
| -1 | GeneralError | Unknown error condition |
| -3 | NotSupported | File type or feature not supported at this time, in this case the event type is not supported on this platform. |
| -6 | ParmRangeErr | Parameter out of range or invalid |
| -7 | MemoryErr | Not enough memory for operation |

A.2 Properties

Properties can be used to find information about commonly used variables, such as time, title and chapter. They are read-only, by definition. Where it makes sense to set a specific property, there will be an associated command to do so.

All properties must be supported and contain a value within the range specified. If a property doesn't exist or is not supportable at the time, then the property should return the value "not implemented" or "ni" for character or "-1" numeric values.

InterActual playback devices shall support the following properties.

A.2.1 InterActual.ElapsedTime

Summary

Returns the elapsed time of the current title, or the current track for CD-DA, in milliseconds.

Return Value

| JavaScript Number | Signed 4 byte (32-bit) integer ranging from 0 to $2^{31} - 1$ |
|---|---|

Example

Query the elapsed time so far.
TimeSoFar=InterActual.ElapsedTime

Media Supported

| DVD Video | DVD Audio | CD Audio |
|---|---|---|
| X | X | X |

A.2.2 InterActual.TotalElapsedTime

Summary

Returns the total elapsed time, in milliseconds, of the CD-DA (disc) playing.

Return Value

| JavaScript Number | Signed 4 byte (32-bit) integer ranging from 0 to $2^{31} - 1$ |
|---|---|

Example

Query the elapsed time of the CD playing.
DiscLength=InterActual.TotalElapsedTime Media Supported

| DVD Video | DVD Audio | CD Audio |
|---|---|---|
| | | X |

A.2.3 InterActual.TotalTime

Summary

Returns the total time of current title (in milliseconds). For CD-DA, it returns the total time for the current disc.

Return Value

| JavaScript Number | Signed 4 byte (32-bit) integer ranging from 0 to $2^{31} - 1$ |
|---|---|

Example

Query the length of the current title.
TitleLength=InterActual.TotalTime

Media Supported

| DVD Video | DVD Audio | CD Audio |
|---|---|---|
| X | X | X |

A.2.4 InterActual.TitleNumber
Summary
  Returns the currently playing title number.
Return Value

| JavaScript Number | Signed 1 byte integer ranging from 1-99 |

Example
  Query the current title number.
  TitleNum=InterActual.TitleNumber
Media Supported

| DVD Video | DVD Audio | CD Audio |
|---|---|---|
| X | | |

A.2.5 InterActual.PGCNumber
Summary
  Returns the currently playing PGC number.
Return Value

| JavaScript Number | Signed 2 byte integer ranging from "1" to "$2^{15} - 1$" |

Example
  Query the current PGC number for the current menu or title space.
  CurrPGCNum=InterActual.PGCNumber
Media Supported

| DVD Video | DVD Audio | CD Audio |
|---|---|---|
| X | X | |

A.2.6 InterActual.ChapterNumber
Summary
  Returns the currently playing chapter number.
Return Value

| JavaScript Number | Signed 2 byte integer ranging from 1-999 |

Example
  Query the current chapter number.
  CurrChapterNum=InterActual.ChapterNumber
Media Supported

| DVD Video | DVD Audio | CD Audio |
|---|---|---|
| X | | |

A.2.7 InterActual.TrackNumber
Summary
  Returns the currently playing track number.
Return Value

| JavaScript Number | Signed 1 byte integer ranging from 1-99 |

Example
  Query the current track number.
  FavoriteTrackNum=InterActual.TrackNumber
Media Supported

| DVD Video | DVD Audio | CD Audio |
|---|---|---|
| | X | X |

A.2.8 InterActual.PlayState
Summary
  Returns the current play state.
Return Value

| JavaScript Number | Signed 1 byte integer ranging from 0-7 where:<br>0: Uninitialized<br>1: Play<br>2: Pause<br>3: Stop<br>4: Scanning Forward<br>5: Scanning Backward<br>6: Slow Forward Play<br>7: Slow Backward Play<br>the values 6 & 7 don't apply to CD-DA |

Example
  Query the current play state.
  State=InterActual.PlayState
Media Supported

| DVD Video | DVD Audio | CD Audio |
|---|---|---|
| X | X | X |

A.2.9 InterActual.Domain
Summary
  Returns the current domain.
Return Value

| JavaScript Number | Signed 1 byte integer ranging from 1-8 where:<br>1: First Play Domain<br>2: Video Manager Menu Domain<br>3: Audio Manager Menu Domain<br>4: Video Title Set Menu Domain<br>5: Title Domain<br>6: Title Group Domain<br>7: Stop State<br>8: Decoder Shutdown (computer only) |

Example
  Query the current domain.
  currentDom=InterActual.Domain

Media Supported

| DVD Video | DVD Audio | CD Audio |
|---|---|---|
| X | X | |

A.2.10 InterActual.AudioNumber
Summary
   Returns the current audio stream/selection number.
Return Value

| JavaScript Number | Signed 1 byte integer |
|---|---|
| | DVD-Video: |
| | Number of the Audio streams in the Title Domain may range from 0 to 7 |
| | DVD-Audio: |
| | The Audio selection may be changed to 0 or 1 |

Example
   Query the current audio stream/selection number.
   audioStreamNumber=InterActual.AudioNumber
Notes
   For DVD-Audio, only 1 audio stream is available in the DVD-Audio zone. On a hybrid disc, the DVD-Video zone can have a max of 2 audio streams.
Media Supported

| DVD Video | DVD Audio | CD Audio |
|---|---|---|
| X | X | |

A.2.11 InterActual.SubpictureNumber
Summary
   Returns the current sub-picture stream number.
Return Value

| JavaScript Number | Signed 1 byte integer ranging from 0-31 |
|---|---|

Example
   Query the current sub-picture stream number.
   SubP=InterActual.SubpictureNumber
Notes
   If this property returns a ninety-nine (99), then sub-pictures are off.
Media Supported

| DVD Video | DVD Audio | CD Audio |
|---|---|---|
| X | X | |

A.2.12 InterActual.AngleNumber
Summary
   Returns the current video angle.
Return Value

| JavaScript Number | Signed 1 byte integer ranging from 1-9 |
|---|---|

Example
   Query the current video angle.
   CurrAngle=InterActual.AngleNumber
Media Supported

| DVD Video | DVD Audio | CD Audio |
|---|---|---|
| X | | |

A.2.13 InterActual.ParentalLevel
Summary
   Returns the current parental level.
Return Value

| JavaScript Number | Signed 1 byte integer |
|---|---|
| | Parental level ranging from 1-8 where |
| | 1 = G |
| | 2 = Reserved |
| | 3 = PG |
| | 4 = PG13 |
| | 5 = Reserved |
| | 6 = R |
| | 7 = NC-17 |
| | 8 = Reserved |

Example
   Query the parental level.
   CurrPlvl=InterActual.ParentalLevel
Notes
   Upon the start of playback, this property can be tested to avoid playback of material at a higher level than parents may allow.
Media Supported

| DVD Video | DVD Audio | CD Audio |
|---|---|---|
| X | | |

A.2.14 InterActual.ButtonNumber
Summary
   Returns the number of the currently highlighted button.
Return Value

| JavaScript Number | Signed 1 byte integer ranging from 1-36 |
|---|---|

Example
   Query the number of the currently highlighted button on the menu.
   SelectedButton=InterActual.ButtonNumber
Notes
   Up to 36 rectangular buttons can be on the screen (which are capable of being highlighted). In the case of wide screen content (with anamorphic, auto-letterbox, or auto pan & scan modes), only 18 buttons are allowed per screen (when two modes are used). Only 12 buttons are allowed per screen when all three modes are used.

Media Supported

| DVD Video | DVD Audio | CD Audio |
|---|---|---|
| X | X | |

A.2.15 InterActual.TotalNumAudio

Summary
  Returns the total number of audio streams available for current title/title group.

Return Value

| JavaScript Number | Signed 1 byte integer<br>DVD-Video: ranging from 0-8; 0 means no audio<br>DVD-Audio: ranging from 0-1 |
|---|---|

Example
  Query the total number of audio streams in the title/title group.
  TotalTracksAudio=InterActual.TotalNumAudio Notes
  For DVD-Audio, only 1 audio stream is available in the DVD-Audio zone. On a hybrid disc, the DVD-Video zone can have a max of 2 audio streams.

Media Supported

| DVD Video | DVD Audio | CD Audio |
|---|---|---|
| X | X | |

A.2.16 InterActual.TotalTracks

Summary
  Returns the total number of audio tracks available for current CD-DA disc.

Return Value.

| JavaScript Number | Signed 1 byte integer ranging from 1-99 |
|---|---|

Example
  Query the total number of audio tracks on this CD-DA disc.
  TotalTracksOnDisc=InterActual.TotalTracks Media Supported

| DVD Video | DVD Audio | CD Audio |
|---|---|---|
| | | X |

A.2.17 InterActual.TotalTitles

Summary
  Returns the total number of titles available for current disc.

Return Value

| JavaScript Number | Signed 1 byte integer ranging from 1-99 |
|---|---|

Example
  Query the total number of titles on this disc.
  TotalTitlesOnDisc=InterActual.TotalTitles Media Supported

| DVD Video | DVD Audio | CD Audio |
|---|---|---|
| X | X | |

A.2.18 InterActual.TotalNumSubpicture

Summary
  Returns the number of sub-picture streams currently available.

Return Value

| JavaScript Number | Signed 1 byte integer ranging from 0-31;<br>0 means none are available |
|---|---|

Example
  Query the number of sub-picture streams available.
  TotalAvailSubP=InterActual.TotalNumSubpicture Media Supported

| DVD Video | DVD Audio | CD Audio |
|---|---|---|
| X | X | |

A.2.19 InterActual.TotalNumAngle

Summary
  Returns the total number of available angles.

Return Value

| JavaScript Number | Signed 1 byte integer ranging from 1-9 |
|---|---|

Example
  Query the total number of available angles.
  TotalAvailAngles=InterActual.TotalNumAngle Media Supported

| DVD Video | DVD Audio | CD Audio |
|---|---|---|
| X | | |

A.2.20 InterActual.TotalNumButton

Summary
  Returns the total number of buttons on the current menu.

Return Value

| JavaScript Number | Signed 1 byte integer ranging from 0-36; 0 means none (no buttons on this menu; the user must use "next" to advance) |
|---|---|

Example
    Query the number of buttons on the current menu.
    TotalAvailButtons=InterActual.TotalNumButton
Notes
    Up to 36 rectangular buttons can be on the screen (which are capable of being highlighted). In the case of wide screen content (with anamorphic, auto-letterbox, or auto pan & scan modes), only 18 buttons are allowed per screen (when two modes are used). Only 12 buttons are allowed per screen when all three modes are used.
Media Supported

| DVD Video | DVD Audio | CD Audio |
|---|---|---|
| X | X | |

A.2.21 InterActual.MajorVersion
Summary
    This property returns the platform major version (e.g. if the API version is 1.03, it will return MajorVersion as "1"). This field can also be used to determine the parsing of certain bits in InterActual.SupportedFeatures.
Return Value

| JavaScript Number | Returns major version unique to each playback system; signed 2 byte integer |
|---|---|

Example
    Query the major version of InterActual API for the current device.
    API_MajorVers=InterActual.MajorVersion
    If API_MajorVers>1 . . .
Media Supported

| DVD Video | DVD Audio | CD Audio |
|---|---|---|
| X | X | X |

A.2.22 InterActual.MinorVersion
Summary
    This property returns the platform minor version (e.g. if the version is 1.03, it will return "03" for MinorVersion). This field can also be used to determine the parsing of certain bits in InterActual.SupportedFeatures.
Return Value

| JavaScript Number | Returns minor version unique to each playback system; signed 2 byte integer. There are 2 digits to the minor version and they are both important. Since the property returns a number, this is how the number must be interpreted by any JavaScript programmer: |
|---|---|

| Return Value | Version |
|---|---|
| 0 | x.00 |
| 1 | x.01 |
| 2 | x.02 |
| 3 | x.03 |
| 4 | x.04 |
| 5 | x.05 |
| 6 | x.06 |
| 7 | x.07 |
| 8 | x.08 |
| 9 | x.09 |
| 10 | x.10 |
| 11 | X.11 |
| . . . | . . . |
| 30 | x.30 |
| . . . and so forth. | |

Example
    Query the minor version of InterActual API for the current device.
    API_MinorVers=InterActual.MinorVersion
    If API_MinorVers>5 . . .
Media Supported

| DVD Video | DVD Audio | CD Audio |
|---|---|---|
| X | X | X |

A.2.23 InterActual.PlayerMode
Summary
    This property returns the default mode for playback of discs as configured by the system's configuration application.
    If this is InterActual mode, then the system will play it as authored launching INDEX.HTM (see the API Directory Structure appendix for details). If the user specifies that the system should play discs in Play mode, then this will override how the disc was authored and always start in linear movie playback.
Return Value

| Char string | Returns a signed 32 byte value of the player mode in characters, either "Play" or "InterActual" |
|---|---|

Example
    Query the player mode of InterActual API for the current device.
    mode=InterActual.PlayerMode
Media Supported

| DVD Video | DVD Audio | CD Audio |
|---|---|---|
| X | X | X |

A.2.24 InterActual.MaxFast
Summary
    Returns the maximum number of fast speeds.
Return Value

| JavaScript Number | Signed 1 byte integer Number of fast speeds ranging from 0-99 |
|---|---|

Example
    Get the total number of fast speeds supported.
    x=InterActual.MaxFast
Media Supported

| DVD Video | DVD Audio | CD Audio |
|---|---|---|
| X | X | |

A.2.25 InterActual.MaxFastReverse
Summary
    Returns the maximum number of reverse fast speeds.
Return Value

| JavaScript Number | Signed 1 byte integer Number of reverse fast speeds ranging from 0-99 |
|---|---|

Example
    Get the total number of reverse fast speeds supported.
    x=InterActual.MaxFastReverse
Media Supported

| DVD Video | DVD Audio | CD Audio |
|---|---|---|
| X | X | |

A.2.26 InterActual.MediaID
Summary
    Returns a unique identifier for the current disc side.
Return Value

| Char string | A 128-bit unique media (title) identifier that is translated into a hex character string in the same fashion as a Windows GUID, e.g. "A0739DE5571F11D2A0310060977F760C". This pattern is 32 hexadecimal characters. |
|---|---|

Example
    Query for the unique disc identifier:
    discID=InterActual.MediaID
Media Supported

| DVD Video | DVD Audio | CD Audio |
|---|---|---|
| X | X | X |

A.2.27 InterActual.DiscType
Summary
    The DiscType property returns the disc format to the application.
Return Value

| JavaScript Number | Signed 1 byte integer 0-255. A disc may be only one of the following types:<br>0: drive is empty or in an unknown state<br>1: CD-Audio<br>2: DVD-Video only<br>3: DVD-Video and CD-DA |
|---|---|

-continued

| | 4: DVD-Audio only<br>5: DVD-Audio and CD-DA<br>6: DVD-Audio and DVD-Video<br>7: DVD-Audio and DVD-Video & CD-DA<br>8-255: reserved |
|---|---|

Note:
some of these hybrid combinations may not exist in the market at this time.

Example
    Query the disc media type:
    discInfo=InterActual.DiscType
Media Supported

| DVD Video | DVD Audio | CD Audio |
|---|---|---|
| X | X | X |

A.2.28 InterActual.Bookmark
Summary
    Returns the number of the bookmark for the current disc if it has been saved.
Return Value

| JavaScript Number | Signed 1 byte integer ranging from 1-32 will return 0 if there is no bookmark saved. |
|---|---|

Example
    Query the bookmark for the current disc if there is one.
    CurBkMk=InterActual.Bookmark
    If(CurBkMk=MyBkMk) //test to see if its mine
    InterActual.GotoBookmark
Media Supported

| DVD Video | DVD Audio | CD Audio |
|---|---|---|
| X | X | X |

A.2.29 InterActual.ROMType
Summary
    The ROMType property queries the type of ROM data that is contained on the DVD (e.g. the format of the HTML tags and JavaScript calls).
Return Value

| JavaScript Number | Signed 1 byte integer 0-255. The ROM type may be only one of the following types:<br>0 = No DVD-ROM data present<br>1 = Unknown DVD-ROM material present<br>2 = PCFriendly<br>3 = InterActual API<br>4 = InterActual Player Only (computer only)<br>5-255 = reserved |
|---|---|

Example
    Query the ROM type:
    ROMInfo=InterActual.ROMType
Notes
    The mechanism for setting these bits is to be as follows:

For DVD-ROM material, test to see if there is any file in the main directory other than those in the VIDEO_TS and AUDIO_TS and JACKET_P directories.

For PCFriendly, test to see if the DISC.ID file is present in the root directory, and the section heading [PCFriendly] exists.

For InterActual compatibility, test to see if the COMMON\INDEX.HTM file is present (or INDEXI.HTM—see the API Directory Structure appendix) and read the HTML meta-data to determine the minimum required API version for the ROM content (see the Appendix describing Meta data information).

For InterActual Player Only, test to see if the DISC.ID file is present in the root directory, and the section heading [InterActual] exists, then be sure there are no files named INDEX*.HTM in the COMMON directory.

Other data and programs may be on the discs as well, for instance, a Macintosh PCFriendly disc may contain platform specific code. It will be classified as PCFriendly if it meets the requirements above.

Media Supported

| DVD Video | DVD Audio | CD Audio |
|---|---|---|
| X | X | X |

A.2.30 InterActual.InternetStatus
Summary
Returns the current Internet connection status.

The list of return values is exhaustive to allow for a fine granularity of possibilities across the various platforms supported (computers, game machines and set top players). Hence, a device could be built with no connectivity option whatsoever, only rendering HTML and JavaScript from local sources, e.g. the disc ROM. Additionally, a device may offer an after-sale option to add connectivity through a network module or MODEM. Return value "1" would cover this situation where the system is capable of connecting, but the option is not installed. Return value "2" would cover the situation where a network session (PSTN or LAN, etc) is not currently established. A "3" would be returned while a connection is being established or if a connection has dropped is being re-established by the system.

Additionally, some platforms may have no reliable method to establish the connection speed and return only a "4".

Return Value

| JavaScript Number | Signed 1 byte integer Connection status as follows:<br>0 = no connectivity option available, ever<br>1 = connectivity option not currently installed<br>2 = connectivity option installed, not online (offline)<br>3 = connectivity option installed, status unknown<br>4 = online, speed unknown<br>10 = up to 28K<br>11 = up to 56K<br>12 = up to 128K<br>13 = up to 1.5 M<br>14 = up to 10 M<br>15 = up to 100 M<br>16 = greater than 100 M<br>others reserved |
|---|---|

Example
Query the Internet status.
ConnectStatus=InterActual.InternetStatus
Media Supported

| DVD Video | DVD Audio | CD Audio |
|---|---|---|
| X | X | X |

A.2.31 InterActual.FullScreenMode
Summary
Returns the current state of full screen mode.
Return Value

| JavaScript Number | Signed 1 byte integer Status as follows:<br>0 = not in full screen mode<br>1 = in full screen mode |
|---|---|

Example
Query the full screen mode status.
FullScreenModeStatus=InterActual.FullScreenMode
Media Supported

| DVD Video | DVD Audio | CD Audio |
|---|---|---|
| X | X | X |

A.3 Events
Events are integral to synchronizing DVD-Video with other media. With these events, web pages can be synchronized with the audio or video. For example, each ChapterEvent (start of new chapter) can trigger an HTML storyboard that corresponds to the movie. Time based events can be used to coordinate advertising messages in HTML while the video is playing: when James Bond is driving his BMW, an appropriate web page (BMW or auto sales site) can automatically be displayed at the same time.

The value of events is that these external media do NOT have to be embedded or even be known at the time the DVD-Video is authored. This flexibility keeps DVD-Video authoring on schedule and greatly minimizes the authoring costs while adding valuable and unique features to each disc.

Events can be used by the calling application (HTML/JavaScript, C++, or other) to receive notification of DVD playback status. There is an EventHandler function required which will switch on the event type index (see below) and call the appropriate function. If a platform does not support an event, then an error code must be returned when its use is attempted. Here is an example of an event handler in JavaScript:

<OBJECT ID="InterActual"
    CLASSID="clsid:A0739DE5-571F-11D2-A0310060977F760C"
    BORDER="1" WIDTH=50% HEIGHT=60% >

-continued

```
</OBJECT>
<SCRIPT LANGUAGE="JavaScript">
function EventHandler(index,parm1,parm2,parm3)
{
    switch(index)
    {
        case 0://reserved
            break;
        case 1://title event
            TitleEvent(parm1);
            break;
        case 2://chapter event
            ChapterEvent(parm1);
            break;
        case 3://PGC event
            PGCEvent(parm1);
            break;
        case 4://Time event
            TimeEvent(parm1,parm2);
            break;
    // etc . . . - see index list below
        default:
            UnknownEvent(parm1, parm2, parm3);
            break;
    }
}
// The following is the private function that will take
// parameters 1 and 2 which are elapsed and total time.
// The name is up to the author, but must match the case
// statement in the Event Handler routine.
function TimeEvent(elapsedTime, totalTime)
{ //Synchronize my graphic at 15 seconds
    if (elapsedTime == 15000)   document.images[0].src = "bmw.gif"
}
</SCRIPT>
```

The following table lists the event indices that will be generated by the browser. There is a skip in the enumeration for advanced events and platform-specific events. We have reserved unique events for specific platforms like the PC or Macintosh.

There is a command enabling subscribing to events or unsubscribing to events (see Interactual.SubscribeToEvent listed in the command section).

Note: By default, all events listed in the base API are subscribed to with the exception of
The Info event (index 21)
The RC Button event (index 22) and
The Net event (index 24).
In addition to these events, all advanced and platform-specific events are not subscribed to and must be explicitly subscribed to.

The table lists event the index and which parameter is returned. The details for each event type and associated parameters follow, however TitleGroup and Slide are described in the DVD-Audio section of this document, as they are specific to DVD-Audio only.

TABLE 6

Event Indices

| Event Type | Index value | Parm1 | Parm2 | Parm3 |
|---|---|---|---|---|
| Reserved | 0 | | | |
| Title | 1 | titleNum | | |
| Chapter | 2 | chapterNum | | |
| PGC | 3 | pgcNum | | |
| Time | 4 | elapsedTime | totalTime | |
| TrackTime | 5 | trackNum | elapsedTime | totalTime |
| TitleGroup | 6 | groupNum | | |

TABLE 6-continued

Event Indices

| Event Type | Index value | Parm1 | Parm2 | Parm3 |
|---|---|---|---|---|
| Track | 7 | trackNum | | |
| Slide | 8 | slideNum | | |
| Angle | 9 | angleNum | | |
| State | 10 | stateNum | | |
| Speed | 11 | speedNum | | |
| UOPs | 12 | uopFields | | |
| Domain | 13 | domainNum | | |
| Audio | 14 | audioNum | | |
| Subpicture | 15 | subpictureNum | | |
| Parental | 16 | parentalNum | | |
| Region | 17 | regionNum | | |
| Eject | 18 | | | |
| Insert | 19 | | | |
| GPRM | 20 | regNum | regVal | |
| Info | 21 | | | |
| RCButton | 22 | rcButton | | |
| NumAngles | 23 | totalNum | | |
| Net | 24 | NetStateNum | | |
| Reserved | 25 | | | |
| Advanced Events | | | | |
| Mouse | 50 | MouseButton | x | y |
| Menu Button | 51 | MenuButton | | |
| Karaoke | 52 | KaraokeNum | | |
| Still | 53 | State | | |
| CC Text | 54 | CcText | | |
| Platform Specific | | | | |
| PC | 100-110 | | | |
| FullScreen | 100 | Transition | | |
| Macintosh | 111-120 | | | |
| Linux | 121-130 | | | |
| Nuon | 131-140 | | | |
| Nintendo | 141-150 | | | |
| Sega | 151-160 | | | |
| Sony | 161-170 | | | |
| X Box | 171-180 | | | |
| Reserved | 181-190 | | | |
| Reserved | 191-200 | | | |

The following list of InterActual API events must be supported and the number and meaning of the parameters they will receive is detailed. For example, the title event is index number 1 and a private function (such as TitleEvent) will receive one parameter (the others will be null) and it will be the new title number (see below for an explanation).
Sample private event functions:
A.3.1 Title Event
Summary
Called when the title changes. Returns the new title number in titleNum.
Return Parameters

| titleNum | Signed 1 byte integer ranging from 1-99 |
|---|---|

Example
Trigger an event when playback reaches Title 3:

```
<SCRIPT LANGUAGE="JavaScript">
function TitleEvent(titleNum)
If (titleNum == 3)
{
    // Perform function once Title 3 has been trapped
}
</SCRIPT>
```

Media Supported

| DVD Video | DVD Audio | CD Audio |
|---|---|---|
| X | X | |

A.3.2 Chapter Event

Summary

Called when the chapter changes. Returns the new chapter number in chapterNum.

Return Parameters

| | |
|---|---|
| chapterNum | Signed 2 byte integer<br>Chapter index ranging from 1-99 for One_Sequential_PGC_Title<br>Chapter index ranging from 1-999 for Multi_PGC_Title |

Example

Trigger an event when playback reaches chapter 2 of Title 1:

```
<SCRIPT LANGUAGE="JavaScript">
function ChapterEvent(chapterNum)
If (chapterNum == 2) {
    // Trigger event once in Chapter 2
}
</SCRIPT>
```

Media Supported

| DVD Video | DVD Audio | CD Audio |
|---|---|---|
| X | | |

A.3.3 PGC Event

Summary

Called when the PGC changes. Returns the new PGC number in PGCNum.

Return Parameters

| | |
|---|---|
| PGCNum | Signed 2 byte integer ranging from 1 to $2^{15} - 1$ |

Example

Trigger an event when playback reaches PGC 2 of Title 1:

```
<SCRIPT LANGUAGE="JavaScript">
function PGCEvent(PGCNum)
If (PGCNum == 2) {
    // Trigger event once in PGC 2
}
</SCRIPT>
```

Media Supported

| DVD Video | DVD Audio | CD Audio |
|---|---|---|
| X | | |

A.3.4 Time Event

Summary

Called on a time change. Returns the elapsed time and total time, both in milliseconds.

Return Parameters

| | |
|---|---|
| elapsedTime | Elapsed time, signed 4 byte (32-bit) integer ranging from 1 to $2^{31} - 1$ |
| totalTime | Total time, signed 4 byte (32-bit) integer ranging from 1 to $2^{31} - 1$<br>($\sim 2^{24}$ is the practical limit) |

Example

Trigger the display of a graphic when playback reaches 15 seconds of Title 1:

```
<SCRIPT LANGUAGE="JavaScript">
function TimeEvent(elapsedTime, totalTime)
if (elapsedTime == 15000)
{
    document.images[0].src = "bmw.gif"
        //Display my graphic at 15 seconds
}
</SCRIPT>
```

Notes

This event should trigger approximately every 900 milliseconds while in play mode.

Media Supported

| DVD Video | DVD Audio | CD Audio |
|---|---|---|
| X | X | X |

A.3.5 Track Time Event

Summary

Called on a time change within the context of a CD track. Returns the elapsed time and total time (both in milliseconds).

Return Parameters

| | |
|---|---|
| trackNum | Track number associated with this time event signed 1 byte integer ranging 1-99 |
| elapsedTime | Elapsed time into track, signed 4 byte (32-bit) integer ranging from 1 to $2^{31} - 1$ |
| totalTime | Total time into track, signed 4 byte (32-bit) integer ranging from 1 to $2^{31} - 1$<br>($\sim 2^{24}$ is the practical limit) |

Example
Trigger the display of a graphic when playback reaches 15 seconds into CD track 4:

```
<SCRIPT LANGUAGE="JavaScript">
function TrackTimeEvent(trackNum, elapsedTime, totalTime)
if (trackNum == 4) && (elapsedTime == 15000)
{
        document.images[0].src = "PhilKeaggy.gif"
            //Display graphic at 15 seconds
}
</SCRIPT>
```

Notes
This event should trigger approximately every 900 milliseconds while in play mode.

Media Supported

| DVD Video | DVD Audio | CD Audio |
|---|---|---|
| | | X |

A.3.6 Track Event
Summary
Called when the track changes. Returns the new track number in trackNum.
Return Parameters

| trackNum | Signed 1 byte integer ranging from 1-99 |
|---|---|

Example
Trigger an event when playback reaches track 5:

```
<SCRIPT LANGUAGE="JavaScript">
function TrackEvent(trackNum)
If (trackNum == 5) {
    // Trigger event once in Track 5
}
</SCRIPT>
```

Media Supported

| DVD Video | DVD Audio | CD Audio |
|---|---|---|
| | X | X |

A.3.7 Angle Event
Summary
Called on angle change. Returns the new angle number in angleNum.
Return Parameters

| angleNum | New angle number, signed 1 byte integer ranging from 1-9 |
|---|---|

Example
Trigger an event when angle number 3 is selected:

```
<SCRIPT LANGUAGE="JavaScript">
function AngleEvent(angleNum)
    if (angleNum == 3)
{
        // Trigger event once angle 3 is reached
}
</SCRIPT>
```

Media Supported

| DVD Video | DVD Audio | CD Audio |
|---|---|---|
| X | | |

A.3.8 State Event
Summary
Called on state change, e.g. when the play state changes from play to pause.
Return Parameters

| stateNum | State number, signed 1 byte integer ranging from 0-7<br>0: None<br>1: Play<br>2: Pause<br>3: Stop<br>4: Scanning Forward<br>5: Scanning Backward<br>6: Slow Forward Play<br>7: Slow Backward Play |
|---|---|

Example
Trigger an event when playback is paused:

```
<SCRIPT LANGUAGE="JavaScript">
function StateEvent(stateNum)
    if (stateNum == 2)
{
        // Trigger event base on pause
}
</SCRIPT>
```

Media Supported

| DVD Video | DVD Audio | CD Audio |
|---|---|---|
| X | X | |

A.3.9 Speed Event
Summary
Called on speed change, e.g. when changed from play to scanning. Returns the new speed information.
Return Parameters

| speedNum | Speed number, signed 1 byte integer ranging from 1-99 |
|---|---|

Example
Trigger an event when speed is changed:

```
<SCRIPT LANGUAGE="JavaScript">
function SpeedEvent(speedNum)
    if (speedNum == 8)
{
        // Trigger event upon speed transition to 8x
}
</SCRIPT>
```

Media Supported

| DVD Video | DVD Audio | CD Audio |
|---|---|---|
| X | X | |

A.3.10 UOP Event
Summary
  Called when any UOP changes. Returns the new UOP fields.
Return Parameters

| | |
|---|---|
| uopFields | UOP fields; signed 4 byte (32-bit) number (see the command InterActual.ValidUOP for the list) |

Example

```
<SCRIPT LANGUAGE="JavaScript">
function UOPEvent(uopFields)
if (uopFields & 0x00000001) {
        // Display disabled state of
        // PlayTime graphic since playback is prohibited
}
</SCRIPT>
```

Media Supported

| DVD Video | DVD Audio | CD Audio |
|---|---|---|
| X | | |

A.3.11 Domain Event
Summary
  Called when the domain changes. Returns the new domain number.
Return Parameters

| | |
|---|---|
| domainNum | Signed 1 byte integer Domain number ranging from 1-8:<br>1: First Play Domain<br>2: Video Manager Menu Domain<br>3: Audio Manager Menu Domain<br>4: Video Title Set Menu Domain<br>5: Title Domain<br>6: Title Group Domain<br>7: Stop State<br>8: Decoder Shutdown (computer only) |

Example
Trigger an event when domain changes to Title domain:

```
<SCRIPT LANGUAGE="JavaScript">
function DomainEvent(domainNum)
    if (domainNum == 5)
{
        // Trigger event on title domain change
}
</SCRIPT>
```

Media Supported

| DVD Video | DVD Audio | CD Audio |
|---|---|---|
| X | X | |

A.3.12 Audio Event
Summary
  Called when there is a change in the audio stream number. Returns the new audio number in audioNum.
Return Parameters

| | |
|---|---|
| audioNum | Audio stream number, signed 1 byte integer ranging from 0-7 |

Example
Trigger an event when audio stream changes:

```
<SCRIPT LANGUAGE="JavaScript">
function AudioEvent(audioNum)
    if (audioNum == 4)
    {
        // Trigger event based on audio stream change to stream 4
    }
</SCRIPT>
```

Media Supported

| DVD Video | DVD Audio | CD Audio |
|---|---|---|
| X | X | |

A.3.13 Subpicture Event
Summary
  Called when there is a change in sub-pictures. Returns the new sub-picture number in subpictureNum.
Return Parameters

| | |
|---|---|
| subpictureNum | Sub-picture number, signed 1 byte integer ranging from 0-31<br>If the value returned is 99, then this means sub-pictures were turned off. |

Example
Trigger an event when sub-picture stream changes:

```
<SCRIPT LANGUAGE="JavaScript">
function SubpictureEvent(subpictureNum)
    if (subpictureNum == 2)
    {
        // Trigger event based on sub-picture change to stream 2
    }
</SCRIPT>
```

Media Supported

| DVD Video | DVD Audio | CD Audio |
|---|---|---|
| X | X | |

A.3.14 Parental Event
Summary
　　Called when parental control changes.
Return Parameters

| | |
|---|---|
| parentalNum | Parental level number, signed 1 byte integer ranging from 1-8 |

Example
　　Set the ParentalEvent and test when it triggers:

```
<SCRIPT LANGUAGE="JavaScript">
function ParentalEvent(parentalNum)
    if (parentalNum > 3)
    {
        // do stuff here ...
    }
</SCRIPT>
```

Media Supported

| DVD Video | DVD Audio | CD Audio |
|---|---|---|
| X | X | |

A.3.15 Region Event
Summary
　　Called when there is a mismatch in the region of the device and disc.
Return Parameters

| | |
|---|---|
| regionNum | Region code of the disc; signed 1 byte integer
0x00 = unknown disc region
0x01 = Region 1
0x02 = Region 2
0x04 = Region 3
0x08 = Region 4
0x10 = Region 5
0x20 = Region 6
0x40 = Reserved
0x80 = Reserved for sign |

Example
Trigger an event when a region mismatch occurs:

```
<SCRIPT LANGUAGE="JavaScript">
function RegionEvent(regionNum)
    if (regionNum == 01)
    {
        // Trigger event when disc is NA; SPRM20 has system region
    }
</SCRIPT>
```

Media Supported

| DVD Video | DVD Audio | CD Audio |
|---|---|---|
| X | X | X |

A.3.16 Eject Event
Summary
　　Called when the disc is ejected from the device.
Return Parameters
　　None
Example

```
<SCRIPT LANGUAGE="JavaScript">
function EjectEvent( )
    // Trigger event based on disc ejection
</SCRIPT>
```

Media Supported

| DVD Video | DVD Audio | CD Audio |
|---|---|---|
| X | X | X |

A.3.17 Insert Event
Summary
　　Called when a disc is inserted.
Return Parameters
　　None
Example
　　Trigger an event when the disc is inserted:

```
<SCRIPT LANGUAGE="JavaScript">
function InsertEvent( )
    // Trigger event based on disc insertion
</SCRIPT>
```

Media Supported

| DVD Video | DVD Audio | CD Audio |
|---|---|---|
| X | X | X |

A.3.18 GPRM Event
Summary
　　Called when a GPRM changes. Returns register number and register contents.

Return Parameters

| regNum | GPRM Register Number signed 1 byte value ranging from 0 to 15 |
|---|---|
| regVal | New value of GPRM; Unsigned 2 byte (16-bit) value |

Example
Trigger an event when GPRM(15) changes:

```
<SCRIPT LANGUAGE="JavaScript">
function GPRMEvent(regnum, regVal)
if ( (regNum == 15) && (regVal == 10) )
{
    // Trigger event based on GPRM(15) = 10
}
</SCRIPT>
```

Media Supported

| DVD Video | DVD Audio | CD Audio |
|---|---|---|
| X | X | |

A.3.19 Info Event
Summary
    Called when the user requests information. This event will be triggered by a button on a computer window or a button on the remote control (for a set top player) being pressed. The content (namely, the JavaScript private function for the title) will determine the course of action.
Return Parameters
    none
Example
    Trigger an information request event because the RC button was pressed. In this case, if the title is 23, we will load a web page.

```
<SCRIPT LANGUAGE="JavaScript">
function InfoLinkEvent( )
If InterActual.TitleNum == 23
{
    //...load page associated with title 23
}
</SCRIPT>
```

Notes
    This event type, by default, is not subscribed to. It must be explicitly subscribed to using SubscribeToEvent.
Media Supported

| DVD Video | DVD Audio | CD Audio |
|---|---|---|
| X | X | |

A.3.20 RC Button Event
Summary
    Called when a button on the remote control (RC) has been pressed. Returns the button number from the list below.

Return Parameters

| rcButton | Button number, signed 1 byte integer ranging from 1-99 |
|---|---|
| | 1: Stop |
| | 2: Pause |
| | 3: Play |
| | 4: Previous Chapter/Track |
| | 5: Next Chapter/Track |
| | 6: Fast Forward |
| | 7: Fast Reverse |
| | 8: Scan/Slow forward |
| | 9: Scan/Slow reverse |
| | 10: DVD Menu |
| | 11: Title |
| | 12: Audio |
| | 13: Angle |
| | 14: Subtitle or Subpicture |
| | 15: Up arrow |
| | 16: Down arrow |
| | 17: Left arrow |
| | 18: Right arrow |
| | 19: Select |
| | 20: Play Handler (for computer control; not sent during playback) |
| | 21: Fullscreen |

Example
    Trigger an event based on button event.

```
<SCRIPT LANGUAGE="JavaScript">
function RCButtonEvent(rcButton)
    if (rcButton == 5){
        // Trigger event based on Next button pressed
    }
</SCRIPT>
```

Notes
    This event type, by default, is not subscribed to. It must be explicitly subscribed to using SubscribeToEvent.
Media Supported

| DVD Video | DVD Audio | CD Audio |
|---|---|---|
| X | X | |

A.3.21 Number of Angles Event
Summary
    Called when the total number of angles has changed. Returns the new total number of angles in totalNum.
Return Parameters

| totalNum | Total number of angles available, signed 1 byte integer ranging from 1-9 |
|---|---|

Example
    Trigger an event when the total number of angles is greater than 1:

```
<SCRIPT LANGUAGE="JavaScript">
function NumAnglesEvent(totalNum)
    if (totalNum > 1)
    {
```

-continued
```
        // Trigger when multiple angles are available
    }
</SCRIPT>
```

Media Supported

| DVD Video | DVD Audio | CD Audio |
|---|---|---|
| X | | |

A.3.22 Net Event

Summary

Called on state change of the network connectivity.

Return Parameters

| | |
|---|---|
| NetStateNum | State number, signed 1 byte integer ranging from 0-4<br>4: Initializing the network interface or MODEM<br>3: Waiting for dial-tone or signal<br>2: Dialing or connecting<br>1: Logging in to service<br>0: Connected |

Example

After subscribing to this event and calling the NetConnect( ) interface, this event will trigger as the connection is being established:

```
<SCRIPT LANGUAGE="JavaScript">
function NetEvent(NetStateNum)
```

-continued
```
        If (NetStateNum == 0)
        {
                // Load page . . .
        }
</SCRIPT>
```

Notes

This event type, by default, is not subscribed to. It must be explicitly subscribed to using SubscribeToEvent.

Media Supported

| DVD Video | DVD Audio | CD Audio |
|---|---|---|
| X | X | X |

A.4 Interface Applicability

The following matrix depicts the applicability of each component of the interface (commands, properties and events) depending upon the state of the system. An "X" indicates that the entity is executable in this state if the user operations (UOP bits) allow it; these bits are set by the disc content itself.

Stop state means no specific title is selected and on computers, the DVD navigator is not instantiated.

File open means the state reached when calling the advanced API "Open" command with a filename as the argument. In other words, the DVD navigator is instantiated and a file, not a DVD title, has been selected. Hence, the DVD navigation features are not available.

If the JavaScript calls InterActual.Open("DVDVideo") you will automatically transition to the Play state because First PGC will be played.

| | No Disc | Fileopen | Stop | Play | Menu |
|---|---|---|---|---|---|
| BASIC INTERACTUAL API COMMANDS | | | | | |
| InterActual.Play | | | X | | X |
| InterActual.PlayTitle | | | X | X | X |
| InterActual.PlayChapter | | | X | X | X |
| InterActual.PlayChapterAutoStop | | | | | |
| InterActual.PlayTime | | | X | X | X |
| InterActual.PlayTimeAutoStop | | | | | |
| InterActual.PlayTitleGroup | | | X | X | X |
| InterActual.PlayTrack | | | X | X | X |
| InterActual.SearchChapter | | | | X | X |
| InterActual.SearchTime | | | | X | X |
| InterActual.SearchTrack | | | X | X | X |
| InterActual.TotalNumChapters | | | X | | |
| InterActual.NextPG | | | | X | X |
| InterActual.PrevPG | | | | X | X |
| InterActual.GoUp | | | | | X |
| InterActual.NextTrack | | | | X | |
| InterActual.PrevTrack | | | | X | |
| InterActual.TotalTrackTime | | | X | | |
| InterActual.NextSlide | | | | X | |
| InterActual.PrevSlide | | | | X | |
| InterActual.Pause | | | | X | |
| InterActual.Stop | | | | X | X |
| InterActual.FastForward | | | | X | |
| InterActual.Rewind | | | | X | |
| InterActual.Menu | | | X | X | X |
| InterActual.Resume | | | X? | | X |
| InterActual.StillOff | | | | X | X |
| InterActual.SelectUpButton | | | | X | X |
| InterActual.SelectDownButton | | | | X | X |

-continued

|  | No Disc | Fileopen | Stop | Play | Menu |
|---|---|---|---|---|---|
| InterActual.SelectLeftButton |  |  |  | X | X |
| InterActual.SelectRightButton |  |  |  | X | X |
| InterActual.SelectButtonAndActivate |  |  |  | X | X |
| InterActual.ActivateButton |  |  |  | X | X |
| InterActual.SelectAudio |  |  |  | X | X? |
| InterActual.SelectSubpicture |  |  |  | X | X? |
| InterActual.SelectAngle |  |  |  | X | X? |
| InterActual.SelectParentalLevel | X |  |  | X |  |
| InterActual.AudioLanguage |  |  | X | X | X |
| InterActual.AudioLanguageExtension |  |  | X | X | X |
| InterActual.SubpictureLanguage |  |  | X | X | X |
| InterActual.SubpictureLanguageExtension |  |  | X | X | X |
| InterActual.GetGPRM |  |  | X | X | X |
| InterActual.GetSPRM |  |  | X | X | X |
| InterActual.ValidUOP |  |  | X | X | X |
| InterActual.GetBCAField |  |  | X | X | X |
| InterActual.SupportedFeatures | X | X | X | X | X |
| InterActual.EnableSubpicture |  |  |  | X | X |
| InterActual.SetGPRM |  |  |  | X | X |
| InterActual.Mute | X | X | X | X | X |
| InterActual.FullScreen |  |  |  | X | X |
| InterActual.GotoBookmark |  |  | X | X | X |
| InterActual.SaveBookmark |  |  | ? | X | X |
| InterActual.NetConnect | X | X | X | X | X |
| InterActual.NetDisconnect | X | X | X | X | X |
| InterActual.SubscribeToEvent | X | X | X | X | X |
| PROPERTIES |  |  |  |  |  |
| InterActual.ElapsedTime |  |  |  | X | X |
| InterActual.TotalElapsedTime |  |  |  | X |  |
| InterActual.TotalTime |  |  |  | X | X |
| InterActual.TitleNumber |  |  |  | X |  |
| InterActual.PGCNumber |  |  |  | X |  |
| InterActual.ChapterNumber |  |  |  | X |  |
| InterActual.TitleGroupNumber |  |  |  | X |  |
| InterActual.TrackNumber |  |  |  | X |  |
| InterActual.SlideNumber |  |  |  | X |  |
| InterActual.PlayState |  |  | X | X | X |
| InterActual.Domain |  |  | X | X | X |
| InterActual.AudioNumber |  |  |  | X |  |
| InterActual.SubpictureNumber |  |  |  | X |  |
| InterActual.AngleNumber |  |  |  | X |  |
| InterActual.ParentalLevel |  |  |  | X |  |
| InterActual.ButtonNumber |  |  |  | X | X |
| InterActual.TotalNumAudio |  |  |  | X |  |
| InterActual.TotalTracks |  |  |  | X |  |
| InterActual.TotalTitles |  |  |  | X | X |
| InterActual.TotalNumSubpicture |  |  |  | X |  |
| InterActual.TotalNumAngle |  |  |  | X |  |
| InterActual.TotalNumButton |  |  |  | X | X |
| InterActual.MajorVersion | X | X | X | X | X |
| InterActual.MinorVersion | X | X | X | X | X |
| InterActual.PlayerMode | X | X | X | X | X |
| InterActual.MaxFast |  |  |  | X | X |
| InterActual.MaxFastReverse |  |  |  | X | X |
| InterActual.MediaID |  |  | X | X | X |
| InterActual.DiscType | X |  | X | X | X |
| InterActual.Bookmark |  |  | X | X | X |
| InterActual.ROMType |  |  | X | X | X |
| InterActual.InternetStatus | X |  | X | X | X |
| InterActual.FullScreenMode |  |  |  | X | X |
| EVENTS |  |  |  |  |  |
| Title Event |  |  |  | X |  |
| Chapter Event |  |  |  | X |  |
| PGC Event |  |  |  | X |  |
| Time Event |  |  |  | X |  |
| Track Time Event |  |  |  | X |  |
| Title Group Event |  |  |  | X |  |
| Track Event |  |  |  | X |  |
| Slide Event |  |  |  | X |  |
| Angle Event |  |  |  | X |  |
| State Event |  |  | X | X | X |
| Speed Event |  |  |  | X |  |
| UOP Event |  |  | X | X | X |
| Domain Event |  |  | X | X | X |
| Audio Event |  |  |  | X |  |

-continued

|  | No Disc | Fileopen | Stop | Play | Menu |
|---|---|---|---|---|---|
| Subpicture Event |  |  |  | X |  |
| Parental Event |  |  |  | X |  |
| Region Event |  |  |  | X |  |
| Eject Event |  |  | X | X | X |
| Insert Event | X |  |  |  |  |
| GPRM Event |  |  |  | X | X |
| Info Event | X |  | X | X | X |
| RC Button Event | X | X | X | X | X |
| Number of Angles Event |  |  |  | X |  |

Note:
For the RC Button Event, the subtype of PlayHandler (20) will not be sent during playback (Play state or title domain) so that it can be used for resume functionality.

B The DVD-Audio Specific Interface
   B.1 Commands
   B.1.1 InterActual.PlayTitleGroup(g)
   Summary
     Start playback of the specified title group number.
   Parameters

| g | Title group number ranging from 1-9 (within current Volume); signed 1 byte integer |
|---|---|

Example
   Start playing the 3$^{rd}$ title group.
   InterActual.PlayTitleGroup(3)
Notes
   This method shall not be used for playing a Hidden Group. The method InterActual.HiddenPlayGroup( ) shall be used instead.
See also
   InterActual.PlayTrack(g,t)
Media Supported

| DVD Video | DVD Audio | CD Audio |
|---|---|---|
|  | X |  |

Return Values

| Number | Name | Description |
|---|---|---|
| 0 | OK | Successful |
| −1 | GeneralError | Unknown error condition |
| −3 | NotSupported | File type or feature not supported at this time |
| −2 | UOPNotAllowed | Operation not allowed by current UOP fields |
| −5 | NoDisc | Attempt to play with no disc |
| −6 | ParmRangeErr | Parameter out of range or invalid |

B.1.2 InterActual.NextSlide( )
Summary
   Presents the next visual display/slide in the display list to the user.
Parameters
   None required
Example
   Step to the next slide on a DVD-Audio disc.
   InterActual.NextSlide( )
Media Supported

| DVD Video | DVD Audio | CD Audio |
|---|---|---|
|  | X |  |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

B.13 InterActual.PrevSlide( )
Summary
   Presents the previous visual display/slide in the display list to the user.
Parameters
   None required
Example
   Display previous slide in a slide presentation on a DVD-Audio disc.
   InterActual.PrevSlide( )
Media Supported

| DVD Video | DVD Audio | CD Audio |
|---|---|---|
|  | X |  |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |

B.2 Properties
B.2.1 InterActual.TitleGroupNumber
Summary
   Returns the currently playing title group number.

Return Value

| JavaScript Number | Signed 1 byte integer ranging from 1-9 |

Example
  Query the current title group number.
  TitleGrpNum=InterActual.TitleGroupNumber
Media Supported

| DVD Video | DVD Audio | CD Audio |
|---|---|---|
| X | | |

B.2.2 InterActual.SlideNumber
Summary
  Returns the currently playing slide/display number.
Return Value

| JavaScript Number | Signed 1 byte integer ranging from 1-99 |

Example
  Query the current slide/display number.
  CurrSlideNumber=InterActual.SlideNumber
Media Supported

| DVD Video | DVD Audio | CD Audio |
|---|---|---|
| X | | |

B.3 Events
B.3.1 Title Group Event
Summary
  Called when the title group changes. Returns the new title group number in groupNum.
Return Parameters

| groupNum | Signed 1 byte integer ranging from 1-9 |

Example
  Trigger an event when playback reaches Title Group 5:

```
<SCRIPT LANGUAGE="JavaScript">
function TitleGroupEvent(groupNum)
If (groupNum == 5)
{
    // Trigger event once in Title Group 5
}
</SCRIPT>
```

Media Supported

| DVD Video | DVD Audio | CD Audio |
|---|---|---|
| X | | |

B.3.2 Slide Event
Summary
  Called when the slide/display list changes. Returns the new slide number in slideNum.
Return Parameters

| slideNum | Slide number, signed 1 byte integer ranging from 1-99 |

Example
  Trigger an event when slide number 13 is reached:

```
<SCRIPT LANGUAGE="JavaScript">
function SlideEvent(slideNum)
    if (slideNum == 13)
{
        // Trigger event once on Slide 13
}
</SCRIPT>
```

Media Supported

| DVD Video | DVD Audio | CD Audio |
|---|---|---|
| X | | |

B.4 Advanced Commands
B.4.1 InterActual.HiddenPlayGroup(x)
Summary
  Play hidden group if the 4 digit key number is entered properly.
Parameters

| x | Four digit key number; signed 2 byte integer ranging from 0000-9999 |

Example
  Play the hidden group, using the key number 1234.
  InterActual.HiddenPlayGroup(1234)
See also
  InterActual.HiddenPlayTrack(t,x)
  InterActual.HiddenPlayTime(h,m,sx)
Media Supported

| DVD Video | DVD Audio | CD Audio |
|---|---|---|
| X | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

B.4.2 InterActual.HiddenPlayTrack(t,x)
Summary
  Play the desired hidden or locked track within the hidden group specified
Parameters

| | |
|---|---|
| t | Track number ranging from 1-99; signed 1 byte integer |
| x | Four digit key number, signed 2 byte integer ranging from 0000-9999 |

Example
  Play the 5$^{th}$ track of the hidden group, using the key number 1234.
  InterActual.HiddenPlayTrack(5,1234)
See also
  InterActual.HiddenPlayGroup(x)
  InterActual.HiddenPlayTime(h,m,s,x)
Media Supported

| DVD Video | DVD Audio | CD Audio |
|---|---|---|
| | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

B.4.3 InterActual.HiddenPlayTime(h,m,s,x)
Summary
  This command plays from specific time within the Hidden Group.
Parameters

| | |
|---|---|
| h | Hours, integer ranging from 00-23; signed 1 byte integer |
| m | Minutes, integer ranging from 00-59; signed 1 byte integer |
| s | Seconds, integer ranging from 00-59; signed 1 byte integer |
| x | Four digit key number; signed 2 byte integer ranging from 0000-9999 |

Example
  Play starting at 2 minutes in within the Hidden Group, using the key number 1234.
  InterActual.HiddenPlayTime(0,2,0,1234)
Media Supported

| DVD Video | DVD Audio | CD Audio |
|---|---|---|
| | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

B.4.4 InterActual.SelectTextLanguage(n)
Summary
  Selects the language for the Audio Text Data.
Parameters

| | |
|---|---|
| n | Audio text language code; shall adhere ISO-639. See the language codes section in the appendix; Unsigned 2 byte char |

Example
  Set the audio text language to English, which is "en".
  InterActual.SelectTextLanguage("en")
Media Supported

| DVD Video | DVD Audio | CD Audio |
|---|---|---|
| | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C Advanced InterActual API
  The interface described in this appendix are not required, however they can be implemented and an InterActual disc can interrogate the system using the SupportFeatures command to determine if the current device supports them.
C.1 Commands
C.1.1 InterActual.Open(filename|type)
Summary
  Opens specified file name.
Parameters

| | |
|---|---|
| filename | Char string with file name (maximum of 256 chars) |
| type | Char string as follows (max of 8 chars) "DVDVideo" "DVDAudio" "CDAudio" |

Example
  Open the DVD Video File for Playback.
  InterActual.Open("d:\\video_ts\\video_ts.ifo")
  InterActual.Open("DVDVideo")
Notes
  Opening of VOB files and MPEG files are optional, but suggested. Other file types are advanced features. An open file can be played, paused, stopped; fast-forward and rewind are not available. Stopping causes the file pointer to be reset to the start of the file.

Requires

Currently, this command is only available on a computer platform.

Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −4 | FileNotFound | File not found |
| −5 | NoDisc | Attempt to play with no disc |
| −6 | ParmRangeErr | Parameter out of range or invalid |

C.1.2 InterActual.Slow(x)

Summary

Play the current DVD at speed x where the x=2 is for ½ speed.

Parameters

| x | x can range from 2-99; signed 1 byte integer |
|---|---|

Example

Play the current DVD at ¼ the normal speed.

InterActual.Slow(4)

Notes

Some players may only allow values of 2, 4, 8, 16, and 32. If Slow is supported a speed of ½ is required. Other speeds may also be supported; decreasing powers of two are recommended although any value from 2 to 99 is allowed (integer reciprocal values are used for the speeds, such as 2 for ½ and 4 for ¼, etc.). If this command is used with a value not in the list, then the underlying software will approximate to the nearest available value (for instance 3 is specified and 4 is chosen) rather than return with an error code.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |

-continued

| Number | Name | Description |
|---|---|---|
| −3 | NotSupported | File type or feature not supported at this time |
| −5 | NoDisc | Attempt to play with no disc |
| −6 | ParmRangeErr | Parameter out of range or invalid |

C.1.3 InterActual.Step(n)

Summary

This command steps playback of the DVD forward n frames.

Parameters

| n | n can range from 1-30; signed 1 byte integer |
|---|---|

Example

Step playback of the DVD forward 1 frame at a time.

InterActual.Step(1)

Notes

Supported Features should be checked first to determine if capability is supported.

Media Supported

| DVD Video | DVD Audio | CD Audio |
|---|---|---|
| X | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

C.1.4 InterActual.SlowReverse(x)

Summary

Play the current DVD at x speed in reverse (x=2 for ½ speed).

Parameters

| x | x can range from 2-99; signed 1 byte integer |
|---|---|

Example

Play the current DVD in reverse at ½ the normal playback speed.

InterActual.SlowReverse(2)

Notes

Supported Features should be checked first to determine if capability is supported. See note on Slow for recommendations.

Some players will only allow values such as 2, 4, 8, 16, etc. If this command is used with a value not in the list, then the underlying software will approximate to the nearest available value (for instance 3 is specified and 4 is chosen) rather than return with an error code.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

C.1.5 InterActual.Zoom(x,y)

Summary

This command will zoom, or scale, by a percentage factor of x (horizontal) and y (vertical).

Parameters

| x | Unsigned 4 byte (32-bit), 100 times the percentage. Defaults to a value of 10000 meaning 100%. |
|---|---|
| y | Unsigned 4 byte (32-bit), 100 times the percentage. Defaults to a value of 10000 meaning 100%. |

Example

Zoom to 200% maintaining the same aspect ratio.

InterActual.Zoom(20000, 20000)

Notes

Zoom parameters are based on a percentage, so integer values of 10000 and 10000 (x and y) indicate 100% of normal full screen display with no zoom. Normally the x and y scale factors should be the same to maintain a correct aspect ratio. When zooming to a value greater than 100%, by default, the center point of the image remains on the center of the display. Individual players may support various zoom ranges, but 25% to 400% is recommended (2500<x,y<40000).

Panning allows moving the center point of the portion of the image to be displayed. These x and y pan parameters are provided as a percentage of the display from −50% to +50% using integer values from −5000 to +5000. (This is done so that the differences between NTSC and PAL do not have to be calculated in pixels. Additionally, it may also be possible to use the same HTML code for handling 4:3 and 16:9 as well.) If the pan parameters would cause the display to pan off the edge of the video, then the platform software shall only set that panning parameter to the largest or smallest value that keeps the video in the display area.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |
| −7 | MemoryErr | Not enough memory for operation |

C.1.6 InterActual.Pan(x,y)

Summary

This command will set the center point of the zoomed display to x,y coordinates based on the percentage of normal content full screen display.

Parameters

| x | Unsigned 4 byte (32-bit), 100 times the percentage. Defaults to a value of 0. |
|---|---|
| y | Unsigned 4 byte (32-bit), 100 times the percentage. Defaults to a value of 0. |

Example

Set the center point to −10%, 10%.

InterActual.Pan(−1000, 1000)

Notes

Panning allows moving the center point of the portion of the image to be displayed. These x and y pan parameters are provided as a percentage of the display from −50% to +50% using integer values from −5000 to +5000. (This is done so that the differences between NTSC and PAL do not have to be calculated in pixels. Additionally, it may also be possible to use the same HTML code for handling 4:3 and 16:9 as well.) If the pan parameters would cause the display to pan off the edge of the video, then the platform software shall only set that panning parameter to the largest or smallest value that keeps the video in the display area.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |
| −7 | MemoryErr | Not enough memory for operation |

C.1.7 InterActual.EnableCCText(n)

Summary

Enables or disables closed captioning.

Parameters

| n | If n is 0, then disable closed captioning (off)<br>If n is 1, then enable closed captioning (on)<br>Signed 1 byte integer |
|---|---|

Example
  Enable closed captioning:
  InterActual.EnableCCText(1)
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.8 InterActual.MenuLanguage(n, rc)
Summary
  Returns the menu language character code for the specified menu language.
Parameters

| n | Menu language number ranging from 1-30 will be likely, however 1-65535 is the allowable range; signed 2 byte integer |
|---|---|
| rc | Character return value; unsigned 2 bytes char represented by the coded "Language Symbols" defined in ISO-639. See the language codes section in the appendix. |

Return Value

| Number | Name | Description |
|---|---|---|
| 0 | OK | Successful execution but code not specified |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

Example
  Query the language information for menu language 1.
  MenuLanguage=InterActual.MenuLanguage(1)
Media Supported

| DVD Video | DVD Audio | CD Audio |
|---|---|---|
| X | X | |

C.1.9 InterActual.SelectMenuLanguage(n)
Summary
  Selects the language for the Video or Audio Manager Menu according to the language code (n).
Parameters

| n | Menu language code; shall adhere to ISO-639.<br>See the language codes section in the appendix;<br>Unsigned 2 byte char |
|---|---|

Example
  Set the menu language to English, which is "en".
  InterActual.SelectMenuLanguage("en")
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.10 InterActual.SelectParentalCountry(n)
Summary
  Selects the country for the parental level.
Parameters

| n | Country code to be set according to the Alpha-2 code defined in ISO3166.<br>2 byte character |
|---|---|

Example
  Set the Parental Country Code to United States.
  InterActual.SelectParentalCountry("US")
Notes
  This command is only available in Stop State.
Media Supported

| DVD Video | DVD Audio | CD Audio |
|---|---|---|
| X | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −6 | ParmRangeErr | Parameter out of range or invalid |

C.1.11 InterActual.SelectKaraoke(x)
Summary
　　This command changes the audio mode for Karaoke.
Parameters

| x | Signed 1 byte integer; audio mode where x is<br>1: guide vocal 1<br>2: guide vocal 2<br>3: guide melody 1<br>4: guide melody 2 (if present)<br>5: sound effect (if present) |
|---|---|

Example
　　Listen to the guide melody of the current Karaoke disc.
　　InterActual.SelectKaraoke(3)
Media Supported

| DVD Video | DVD Audio | CD Audio |
|---|---|---|
| X | | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.12 InterActual.SetMixVolume(x)
Summary
　　This command sets the primary audio steam volume level to percentage x to allow over-mixing.
Parameters

| x | Percentage for audio stream volume.<br>Signed 1 byte integer ranging from 0-100<br>Setting x to 0 will mute the main audio. |
|---|---|

Example
　　Set volume to 50%.
　　InterActual.SetMixVolume(50)
Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.13 InterActual.Close( )
Summary
　　Close the driver and stop playback of the current DVD while playing on a computer.
Parameters
　　None required
Example
　　Close the driver and stop playback.
　　InterActual.Close( )
Notes
　　This is a computer only command. A consumer electronics device should treat this command as InterActual.Stop( ).
Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

C.1.14 InterActual.ShowControls( )
Summary
　　Show the video controls while playing an InterActual disc on a computer.
Parameters
　　None required
Example
　　Show the controls.
　　InterActual.ShowControls( )
Notes
　　This is a computer only command. A consumer electronics device should ignore this command. The coordinate system for both PC and Macintosh will be defined with top left as 0,0 with x moving from top left to top right and y moving from top left to bottom left.
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

C.1.15 InterActual.HideControls( )
Summary
　　Hide the video controls while playing an InterActual disc on a computer.

Parameters
  None required
Example
  Hide the controls.
  InterActual.HideControls( )
Notes
  This is a computer only command. A consumer electronics device should ignore this command. The coordinate system for both PC and Macintosh will be defined with top left as 0,0 with x moving from top left to top right and y moving from top left to bottom left.
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

C.1.16 InterActual.ShowContextMenu(mask)
Summary
  Controls the right mouse click context menu that displays on a computer.
Parameters

| mask | Unsigned 1 byte integer<br>0x00 Suppress display of context menu<br>0x01 Play, Pause, Stop<br>0x02 Fast forward and rewind<br>0x04 Next chapter, previous chapter<br>0x08 DVD Menu<br>0x10 Sub-picture, audio and angle menus<br>0x20 Full screen menu<br>0x80 Exit menu |
|---|---|

Example
  Show all options in the context menu on a right mouse click
  InterActual.ShowContextMenu(0xBF)
Notes
  This is a computer only command. A consumer electronics device should ignore this command.
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |

-continued

| Number | Name | Description |
|---|---|---|
| −3 | NotSupported | File type or feature not supported at this time |
| −6 | ParmRangeErr | Parameter out of range or invalid |

C.1.17 InterActual.PopUpMenu(n,x,y)
Summary
  Displays and allows the audio languages, sub-pictures, and angles to be set to those currently available.
Parameters

| n | Signed 1 byte integer<br>4 = Audio Language<br>5 = Sub-picture<br>6 = Angle |
|---|---|
| x | X coordinate on computer screen |
| y | Y coordinate on computer screen |

Example
  Show the pop up menu.
  InterActual.PopUpMenu( )
Notes
  This is a computer only command. A consumer electronics device should ignore this command. The coordinate system for both PC and Macintosh will be defined with top left as 0,0 with x moving from top left to top right and y moving from top left to bottom left.
Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.18 InterActual.SuppressErrors(b)
Summary
  Suppresses display of error messages.
Parameters

| b | Signed 1 byte integer<br>If b = 0, suppress the display of messages<br>If b = 1, display error messages |
|---|---|

Example
  Suppress all error messages.
  InterActual.SuppressErrors(0)
Notes
  This is a computer only command. A consumer electronics device should ignore this command.

101

Media Supported

| DVD Video | DVD Audio | CD Audio |
|-----------|-----------|----------|
| X | X | X |

Return Values

| Number | Name | Description |
|--------|------|-------------|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.19 InterActual.AutoMouseHide(b)
Summary
    Show or hide the mouse cursor when the DVD is playing (this is a toggle control). This method is for computers only.
Parameters

| b | Signed 1 byte integer<br>When b = 0, do not hide mouse<br>When b = 1, automatically hide mouse after 2 seconds |
|---|---|

Example
    Automatically hide the mouse after 2 seconds.
    InterActual.AutoMouseHide(1)
Notes
    By default, hiding of the mouse cursor occurs 2 seconds after no activity. This method is for computers only.
Media Supported

| DVD Video | DVD Audio | CD Audio |
|-----------|-----------|----------|
| X | X | X |

Return Values

| Number | Name | Description |
|--------|------|-------------|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −6 | ParmRangeErr | Parameter out of range or invalid |

C.1.20 InterActual.OpenDrive( )
Summary
    This command provides control of the media drive to open the drive, which will eject the media, or close the drive based on the current state of the drive.
Parameters
    None required
Example
    Eject the media from the drive.
    InterActual.OpenDrive( )

102

Notes
    If the device is playing the playback must first be stopped before the media can be ejected.
Media Supported

| DVD Video | DVD Audio | CD Audio |
|-----------|-----------|----------|
| X | X | X |

Return Values

| Number | Name | Description |
|--------|------|-------------|
| 0 | OK | Successful |
| −1 | GeneralError | Unknown error condition |
| −2 | UOPNotAllowed | Operation not allowed by current UOP fields |
| −3 | NotSupported | File type or feature not supported at this time |

C.1.21 InterActual.Launch(a, p)
Summary
    This command provides the ability to launch an application co-located on the disc.
Parameters

| a | Application name and fully qualified path derived from the DiscDirectory property; Char string |
|---|---|
| p | Parameter list for application; Char string<br>If this string contains a disc filename, the path must be fully qualified. |

Example
    Launch the setup application for an extra from the disc.
    ddir=InterActual.DiscDirectory;
    InterActual.Launch(ddir+"/EXTRAS/"+"setup.exe", "");
Notes
    Macintosh does not support parameter lists.
    Note: The ability to launch another application from the JavaScript is both a valuable feature and a potential exposure to system security. As such, this command must be limited to launch only files from the disc directory (as derived from the DiscDirectory property)
Media Supported

| DVD Video | DVD Audio | CD Audio |
|-----------|-----------|----------|
| X | X | X |

Return Values

| Number | Name | Description |
|--------|------|-------------|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −4 | FileNotFound | File not found |
| −7 | MemoryErr | Not enough memory for operation |

C.1.22 InterActual.PresentationMode(a,m)

Summary

This command sets the aspect ratio to either wide screen (16:9) versus full frame (4:3), and the preference for the video display mode when displaying 16:9 material on a 4:3 display.

Parameters

| | |
|---|---|
| a | Aspect ratio of output device; can range from 0-2 where<br>0: 4:3 device<br>1: reserved<br>2: 16:9<br>signed 1 byte integer |
| m | Mode of 16:9; can range from 0-2 where<br>0: wide<br>1: pan scan<br>2: letterbox<br>signed 1 byte integer |

Example

Set the mode to wide screen letterbox

InterActual.PresentationMode(2,2)

Notes

If the mode is not available on the disc, for instance no wide screen 16:9 content, then this command will return a "−3", not supported.

Media Supported

| DVD Video | DVD Audio | CD Audio |
|---|---|---|
| X | X | |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

C.1.23 InterActual.Print(f)

Summary

This command provides the ability to print a file.

Parameters

| | |
|---|---|
| f | File name with fully qualified path; Char string |

Example

Print the file Screenplay.txt from the disc.

ddir=InterActual.DiscDirectory;

InterActual.Print(ddir+"/EXTRAS/"+"screenplay.txt");

Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −4 | FileNotFound | File not found |
| −7 | MemoryErr | Not enough memory for operation |

C.1.24 InterActual.PlayPeriodInTitleAutoStop(t,sh,sm,ss,sf,eh,em,es,ef)

Summary

This command is similar to PlayTimeAutoStop however it supports the use of frames versus milliseconds (as in hh:mm:ss:ff). It starts playback in the specified title number (t) at the specified start time in hours (sh), minutes (sm), seconds (ss) and frames (sf) and ends at the specified end time (using the same variables for hours, minutes, seconds and frames: eh, em, es, ef). For DVD-Audio, the first parameter represents the title group number (t).

Parameters

| | |
|---|---|
| t | DVD-Video: Title number ranging from 1-99<br>DVD-Audio: Title group number ranging from 1-9<br>CD-Audio: Track number ranging from 0-99 where<br>if t = 0 then h, m, s are relative to the<br>start of the CD-Audio,<br>else t is the track number and<br>the h, m, s are relative to that track<br>Signed 1 byte integer |
| sh | Start hour where h can range from 00-23;<br>Signed 1 byte integer |
| sm | Start minutes where m can range from 00-59;<br>Signed 1 byte integer |
| ss | Start seconds where s can range from 00-59;<br>Signed 1 byte integer |
| sf | Start frames where x can range from 0-30 to accommodate either 25 or 30 frames per second.<br>Signed 1 byte integer |
| eh | End hour where h can range from 00-23;<br>Signed 1 byte integer |
| em | End minutes where m can range from 00-59;<br>Signed 1 byte integer |
| es | End seconds where s can range from 00-59;<br>Signed 1 byte integer |
| ef | End frames where x can range from 0-30 to accommodate either 25 or 30 frames per second.<br>Signed 1 byte integer |

Examples

Start playing from the specified time position of the current title to the end position. For example to play title 2 from 1 hour, 10 minutes, 30 seconds, frame 7 in the title to frame 20:

InterActual.PlayPeriodInTitleAutoStop(2,1,10,30,7,1,10,30,20)

Requires

DVD-Video: This command requires that the UOP0 operation be permitted.

Media Supported

| DVD Video | DVD Audio | CD Audio |
|---|---|---|
| X | X | X |

Return Values

| Number | Name | Description |
|---|---|---|
| 0 | OK | Successful |
| −1 | GeneralError | Unknown error condition |
| −2 | UOPNotAllowed | Operation not allowed by current UOP fields |
| −3 | NotSupported | File type or feature not supported at this time |
| −5 | NoDisc | Attempt to play with no disc |
| −6 | ParmRangeErr | Parameter out of range or invalid |

C.2 Properties
C.2.1 InterActual.CurrentMenuLanguage
Summary
 Returns the current menu language.
Return Value

| Char | Unsigned 2 byte char as defined in ISO-639. See the language codes section in the appendix. |
|---|---|

Example
 Query the current menu language.
 MyLanguage=InterActual.CurrentMenuLanguage
Media Supported

| DVD Video | DVD Audio | CD Audio |
|---|---|---|
| X | X | |

C.2.2 InterActual.TotalNumMenuLanguage
Summary
 Returns the total number of menu languages available.
Return Value

| JavaScript Number | Signed 1 byte integer ranging from 0-99; 0 means none available |
|---|---|

Example
 Query the number of menu languages available.
 NumberMenuLang=InterActual.TotalNumMenuLanguage
Media Supported

| DVD Video | DVD Audio | CD Audio |
|---|---|---|
| X | X | |

C.2.3 InterActual.ParentalCountry
Summary
 Returns the current parental country level.
Return Value

| Char | Country code to be set according to the Alpha-2 code defined in ISO3166; unsigned 2 byte character string |
|---|---|

Example
 Query the parental country level.
 PCountry=InterActual.ParentalCountry Media Supported

| DVD Video | DVD Audio | CD Audio |
|---|---|---|
| X | | |

C.2.4 InterActual.CCTextStatus
Summary
 Returns the status of closed captioning.
Return Value

| JavaScript Number | Returns 0 if CC is disabled, or 1 if enable; Signed 1 byte integer |
|---|---|

Example
 Get the status of closed captioning:
 CCstatus=InterActual.CCTextStatus
Media Supported

| DVD Video | DVD Audio | CD Audio |
|---|---|---|
| X | X | |

C.2.5 InterActual.CCText
Summary
 Returns the Closed Caption text string from the current Group of Pictures (GOP).
Return Value

| Character string | Maximum of 256 characters of text |
|---|---|

Example
 Get the Closed Caption text:
 CCstring=InterActual.CCText
Media Supported

| DVD Video | DVD Audio | CD Audio |
|---|---|---|
| X | X | |

C.2.6 InterActual.MaxSlow
Summary
 Returns the maximum number of slow speeds supported.
Return Value

| JavaScript Number | Signed 1 byte integer Number of slow speeds ranging from 0-99 |
|---|---|

Example
 Get the total number of slow speeds supported.
 x=InterActual.MaxSlow
Notes
 This will return zero (0) if there are no slow speeds supported.

Media Supported

| DVD Video | DVD Audio | CD Audio |
|---|---|---|
| X | X | |

C.2.7 InterActual.MaxSlowReverse
Summary
  Returns the maximum number of reverse slow speeds supported.
Return Value

| JavaScript Number | Signed 1 byte integer Number of reverse slow speeds ranging from 0-99 |
|---|---|

Example
  Get the total number of reverse slow speeds supported.
  x=InterActual.MaxSlowReverse
Notes
  This will return zero (0) if there are no reverse slow speeds supported.
Media Supported

| DVD Video | DVD Audio | CD Audio |
|---|---|---|
| X | X | |

C.2.8 InterActual.DiscRegion
Summary
  Returns the region code for the DVD.
Return Value

| JavaScript Number | Signed 1 byte integer<br>0x00 = unknown<br>0x01 = Region 1<br>0x02 = Region 2<br>0x04 = Region 3<br>0x08 = Region 4<br>0x10 = Region 5<br>0x20 = Region 6<br>0x40 = Reserved<br>0x80 = Reserved for sign |
|---|---|

Example
  Query the region code for the disc. Multi-region discs will have multiple bits on.
  regionCode=InterActual.DiscRegion
Media Supported

| DVD Video | DVD Audio | CD Audio |
|---|---|---|
| X | | |

C.2.9 InterActual.DiscDirectory
Summary
  Returns the full path name corresponding to the location of the currently inserted disc's root directory (computer only). Hence, for a PC, we would expect "D:/" in most cases if the DVD-ROM is on drive D.
Return Value

| Character string | Character string containing pathname using "/" for directory separators on all platforms; maximum of 256 (computer only) |
|---|---|

Example
  Query for the current drive/path that contains the disc:
  discPath=InterActual.DiscDirectory
Notes
  Some platforms may be case sensitive in the file and directory names. If this property is parsed and manipulated, the programmer should adhere to the specific platform standards.
Media Supported

| DVD Video | DVD Audio | CD Audio |
|---|---|---|
| X | X | X |

C.2.10 InterActual.LocalDirectory
Summary
  Returns full path of the location corresponding to the local InterActual player (computer only). On a PC, we would expect to see "C:/Program Files/InterActual/InterActual Player/" if it is installed on drive C.
Return Value

| Character string | Character string containing pathname using "/" for directory separators on all platforms; maximum of 256 (computer only)<br>This will be NULL ("") if there is no computer application. |
|---|---|

Example
  Query for the local directory information:
  installedPath=InterActual.LocalDirectory
Notes
  This value will be NULL if there is no computer application and only an InterActual object embedded within a web page.
  Some platforms may be case sensitive in the file and directory names. If this property is parsed and manipulated, the programmer should adhere to the specific platform standards.
Media Supported

| DVD Video | DVD Audio | CD Audio |
|---|---|---|
| X | X | X |

C.2.11 InterActual.CurrentZoomX
Summary
  Returns the current zoom x value
Return Value

| JavaScript Number | Value of x for zoom; unsigned 4 byte (32-bit) value |
|---|---|

Example
  Get the x value for the current zoom.
  x=InterActual.CurrentZoomX

Media Supported

| DVD Video | DVD Audio | CD Audio |
|---|---|---|
| X | X | |

C.2.12 InterActual.CurrentZoomY
Summary
   Returns the current zoom y value
Return Value

| JavaScript Number | Value of y for zoom; unsigned 4 byte (32-bit) value |
|---|---|

Example
   Get the y value for the current zoom.
   y=InterActual.CurrentZoomY
Media Supported

| DVD Video | DVD Audio | CD Audio |
|---|---|---|
| X | X | |

C.2.13 InterActual.CurrentPanX
Summary
   Returns the current Pan x value.
Return Value

| JavaScript Number | Value of x for pan; unsigned 4 byte (32-bit) value |
|---|---|

Example
   Get the x value for the current pan.
   x=InterActual.CurrentPanX
Media Supported

| DVD Video | DVD Audio | CD Audio |
|---|---|---|
| X | X | |

C.2.14 InterActual.CurrentPanY
Summary
   Returns the current Pan y value.
Return Value

| JavaScript Number | Value of y for pan; unsigned 4 byte (32-bit) value |
|---|---|

Example
   Get the y value for the current pan.
   y=InterActual.CurrentPanY
Media Supported

| DVD Video | DVD Audio | CD Audio |
|---|---|---|
| X | X | |

C.2.15 InterActual.MixVolume
Summary
   Returns the current primary audio stream volume level as a percentage of full volume.
Return Value

| JavaScript Number | Percentage for audio stream volume. Signed 1 byte integer ranging from 0-100 |
|---|---|

Example
   Get the current mix volume level.
   MixVolume_percentage=InterActual.MixVolume
Media Supported

| DVD Video | DVD Audio | CD Audio |
|---|---|---|
| X | X | X |

C.2.16 InterActual.FramesPerSecond
Summary
   Returns the video frame rate for the current DVD title correlating to NTSC/SECAM or PAL television frame rates.
Return Value

| JavaScript Number | 25: frames per second (NTSC/SECAM) 30: frames per second (PAL) Signed 1 byte integer |
|---|---|

Example
   Get the current frames per seconds setting.
   TV_TYPE=InterActual.FramesPerSecond
Media Supported

| DVD Video | DVD Audio | CD Audio |
|---|---|---|
| X | X | X |

C.3 Events
Sample private advanced event functions

C3.1 Mouse Event
Summary
   Called when the user clicks either the left or right mouse button based on the video coordinates.
   Returns mouse button number and coordinates.
Return Parameters

| mouseButton | Button, 0 = left mouse button, 1 = right mouse button |
|---|---|
| x | X coordinate of click, signed 2 byte integer ranging from 0-719 |
| y | Y coordinate of click, signed 2 byte integer ranging from 0-479 or 575 depending on NTSC versus PAL |

Example
Trigger an event when user clicks the mouse:

```
<SCRIPT LANGUAGE="JavaScript">
function MouseEvent(mouseButton, x, y)
    if (mouseButton == 0){
        // Trigger event based on left mouse click
    }
</SCRIPT>
```

Notes
The coordinate system for both PC and Macintosh will be defined with top left as 0,0 with x moving from top left to top right and y moving from top left to bottom left.

Media Supported

| DVD Video | DVD Audio | CD Audio |
|---|---|---|
| X | X | X |

C3.2 Menu Button Event
Summary
    Called when a button is highlighted. Returns the button number.
Return Parameters

| | |
|---|---|
| menuButton | Button number, signed 1 byte integer ranging from 1-36 |

Example
    Trigger an event based on button event.

```
<SCRIPT LANGUAGE="JavaScript">
function MenuButtonEvent(menuButton)
    if (menuButton == 1){
        // Trigger event based on button highlight
    }
</SCRIPT>
```

Media Supported

| DVD Video | DVD Audio | CD Audio |
|---|---|---|
| X | X | |

C3.3 Karaoke Event
Summary
    Called when a Karaoke event changes.
Return Parameters

| | |
|---|---|
| karaokeNum | Karaoke event, where it will return a signed 1 byte integer as follows<br>1: if karaoke track has begun playing<br>0: if just finished |

Example
Set the KaraokeEvent and test when it triggers:

```
<SCRIPT LANGUAGE="JavaScript">
function KaraokeEvent(karaokeNum)
    if (karaokeNum == 1){
        // do stuff while it is playing ...
    }
</SCRIPT>
```

Media Supported

| DVD Video | DVD Audio | CD Audio |
|---|---|---|
| X | X | |

C.3.4 Still Event
Summary
    Called when Still state changes, e.g. when change of state from StillOn to StillOff or vice versa.
Return Parameters

| | |
|---|---|
| state | New state, signed 1 byte integer ranging from 0-1<br>0: StillOff now<br>1: StillOn now |

Example
    Trigger an event when Still state changes:

```
<SCRIPT LANGUAGE="JavaScript">
function StillEvent(state)
    if (state == 1)
    {
        // Do something while still is up on screen
    }
</SCRIPT>
```

Media Supported

| DVD Video | DVD Audio | CD Audio |
|---|---|---|
| X | X | |

C.3.5 CC Text Event
Summary
    Called when the CC text changes for a new GOP.
Return Parameters
    None
Example
    Trigger an event when the CC Text changes:

```
<SCRIPT LANGUAGE="JavaScript">
function CCTextEvent( )
current = InterActual.CCText
if (current.length)
{
    // Display CC text somewhere
}
</SCRIPT>
```

Media Supported

| DVD Video | DVD Audio | CD Audio |
|---|---|---|
| X | X | |

C3.6 FullScreen Event (PC only)
Summary
  Called when video transitions from full screen to windowed mode and vice versa.
Return Parameters

| transition | 1: video playback transitions from window to full screen mode  0: video playback transitions from full screen to window mode  Signed 1 byte integer |
|---|---|

Notes
  This event is also thrown when playback is stopped (returning a "0"). It is expected that the event monitor code will call HideControls( ) upon receiving a return of "0" and will call ShowControls( ) upon receiving a return of "1".
Example
  Trigger an event when changing from full screen video to windowed mode:

```
<SCRIPT LANGUAGE="JavaScript">
function FS2Win(t)
    if (t == 0)
    {
        // Trigger here
    }
</SCRIPT>
```

Media Supported

| DVD Video | DVD Audio | CD Audio |
|---|---|---|
| X | | |

What is claimed is:

1. A method for reproducing contents information in an interactive optical disc device, comprising the steps of:
   a) synchronizing and reproducing data read from an interactive optical disc and contents information sent and downloaded from a contents provider server connected via the Internet;
   b) if the sending of said contents information from said contents provider server is suspended or delayed, generating a command for requesting re-sending of specific contents information, with reference to specific information contained in normally reproduced last contents information, and sending the generated command to said contents provider server; and
   c) reproducing said specific contents information re-sent from said contents provider server in response to said command together with data read from said interactive optical disc while re-synchronizing it with said data read from said interactive optical disc.

2. The method as set forth in claim 1, wherein said specific information contained in said normally reproduced last contents information includes at least one of playback time information, contents information offset information, and offset information of said data read from said interactive optical disc.

3. The method as set forth in claim 2, wherein said step b) includes the steps of:
   b-1) checking said specific information contained in said normally reproduced last contents information if the sending of said contents information from said contents provider server is suspended or delayed;
   b-2) calculating information regarding re-synchronizable contents information based upon said checked specific information; and
   b-3) generating a command for requesting re-sending of specific contents information corresponding to the calculated information regarding said re-synchronizable contents information and sending the generated command to said contents provider server.

4. The method as set forth in claim 3, wherein said information regarding said re-synchronizable contents information is calculated with reference to a bandwidth of a current network bit rate.

5. The method as set forth in claim 3, wherein said command for requesting the re-sending of said specific contents information includes a parameter, said parameter being said information regarding said re-synchronizable contents information.

6. The method as set forth in claim 3, wherein said step c) includes the steps of:
   c-1) extracting said specific information from said specific contents information re-sent from said contents provider server; and
   c-2) re-synchronizing and reproducing said data read from said interactive optical disc and said re-sent specific contents information based upon the extracted specific information.

7. The method as set forth in claim 6, wherein said step c) further includes the step of receiving a command for notification of the re-sending of said specific contents information from said contents provider server before said step c-1) is performed.

8. The method as set forth in claim 2, wherein said step b) includes the steps of:
   b-1) if the sending of said contents information from said contents provider server is suspended or delayed, determining whether a size of contents information downloaded into a buffer memory of said interactive optical disc device and not reproduced yet is below a predetermined reference value;
   b-2) automatically pausing a data reproducing operation of said interactive optical disc if the size of said contents information downloaded into said buffer memory and not reproduced yet is below said predetermined reference value; and
   b-3) generating said command for requesting the re-sending of said specific contents information, with reference to said specific information contained in said normally reproduced last contents information, and sending the generated command to said contents provider server.

9. The method as set forth in claim 8, wherein said step b-3) includes the steps of:
   b-3-1) checking said specific information contained in said normally reproduced last contents information;
   b-3-2) calculating information regarding contents information subsequent to said normally reproduced last contents information based upon the checked specific information; and b-3-3) generating a command for requesting re-sending of specific contents information corresponding to the calculated information and sending the generated command to said contents provider server.

10. The method as set forth in claim 9, wherein said command for requesting the re-sending of said specific contents information includes a parameter, said parameter being said information regarding said contents information subsequent to said normally reproduced last contents information.

11. The method as set forth in claim 8, wherein said step c) includes the steps of:
   c-1) receiving a command for notification of the re-sending of said specific contents information from said contents provider server;
   c-2) after said re-sending notification command is received, extracting said specific information from said specific contents information re-sent from said contents provider server; and
   c-3) re-synchronizing and reproducing said data read from said interactive optical disc and said re-sent specific contents information based upon the extracted specific information.

12. A method for providing contents information in a contents provider server, comprising the steps of:
   a) sequentially sending data packets containing contents information whose sending is requested by an interactive optical disc device connected via the Internet, and specific information regarding said contents information whose sending is requested;
   b) if the sending of said requested contents information is suspended or delayed, receiving a command for requesting re-sending of specific contents information, from said interactive optical disc device; and
   c) re-sending a data packet containing said specific contents information and specific information regarding it to said interactive optical disc device in response to said command.

13. The method as set forth in claim 12, wherein said sent contents information is audio data to be reproduced synchronously with video data read from an interactive optical disc in said interactive optical disc device.

14. The method as set forth in claim 12, wherein said specific information includes at least one of playback time information, contents information offset information, and offset information of data read from an interactive optical disc.

15. The method as set forth in claim 12, wherein said command for requesting the re-sending of said specific contents information includes a parameter, said parameter being information regarding said specific contents information.

16. The method as set forth in claim 15, wherein said step c) includes the steps of:
   c-1) seeking a position of data corresponding to said information regarding said specific contents information;
   c-2) sending a command for notification of the re-sending of said specific contents information to said interactive optical disc device; and
   c-3) reading said specific contents information at said position and re-sending said data packet containing said specific contents information and said specific information regarding it to said interactive optical disc device.

17. A method for reproducing contents information in an interactive optical disc device, comprising the steps of:
   a) downloading and managing offset table information from a contents provider server connected via the Internet;
   b) synchronizing and reproducing contents information sent and downloaded from said contents provider server and data read from an interactive optical disc;
   c) if the sending of said contents information from said contents provider server is suspended or delayed, generating a command for requesting re-sending of specific contents information, with reference to said offset table information, and sending the generated command to said contents provider server; and
   d) reproducing said specific contents information re-sent from said contents provider server in response to said command together with data read from said interactive optical disc while re-synchronizing it with said data read from said interactive optical disc.

18. The method as set forth in claim 17, wherein said offset table information includes playback time information, offset information of said data read from said interactive optical disc and contents information offset information in a linked manner.

19. The method as set forth in claim 17, wherein said step c) includes the steps of:
   c-1) extracting information regarding normally reproduced last contents information from said offset table information if the sending of said contents information from said contents provider server is suspended or delayed;
   c-2) calculating information regarding re-synchronizable contents information based upon the extracted information; and
   c-3) generating a command for requesting re-sending of specific contents information corresponding to the calculated information regarding said re-synchronizable contents information and sending the generated command to said contents provider server.

20. The method as set forth in claim 19, wherein said information regarding said re-synchronizable contents information is calculated with reference to a bandwidth of a current network bit rate.

21. The method as set forth in claim 19, wherein said command for requesting the re-sending of said specific contents information includes a parameter, said parameter being said information regarding said re-synchronizable contents information.

22. The method as set forth in claim 17, wherein said step d) includes the steps of:
   d-1) receiving a command for notification of the re-sending of said specific contents information from said contents provider server; and
   d-2) after said re-sending notification command is received, reproducing said specific contents information re-sent from said contents provider server together with said data read from said interactive optical disc while re-synchronizing it with said data read from said interactive optical disc.

23. The method as set forth in claim 17, wherein said contents information sent from said contents provider server is audio data, and said data read from said interactive optical disc includes video data.

24. The method as set forth in claim 1, wherein said contents information sent from said contents provider server is audio data, and said data read from said interactive optical disc includes video data.

25. A method for providing contents information in a contents provider server, comprising the steps of:
   a) sending offset table information regarding contents information whose sending is requested by an interactive optical disc device connected via the Internet;

b) if the sending of said offset table information is completed, sequentially sending said contents information whose sending is requested by said interactive optical disc device;

c) if the sending of said requested contents information is suspended or delayed, receiving a command for requesting re-sending of specific contents information, from said interactive optical disc device; and d) re-sending said specific contents information to said interactive optical disc device in response to said command.

26. The method as set forth in claim 25, wherein said sent contents information is audio data to be reproduced synchronously with video data read from an interactive optical disc in said interactive optical disc device.

27. The method as set forth in claim 25, wherein said offset table information includes playback time information, offset information of data read from an interactive optical disc and contents information offset information in a linked manner.

28. The method as set forth in claim 25, wherein said command for requesting the re-sending of said specific contents information includes a parameter, said parameter being information regarding said specific contents information.

29. The method as set forth in claim 28, wherein said step d) includes the steps of:

d-1) seeking a position of data corresponding to said information regarding said specific contents information;

d-2) sending a command for notification of the re-sending of said specific contents information to said interactive optical disc device; and d-3) reading said specific contents information at said position and re-sending it to said interactive optical disc device.

* * * * *

UNITED STATES PATENT AND TRADEMARK OFFICE
CERTIFICATE OF CORRECTION

| | | |
|---|---|---|
| PATENT NO. | : 7,454,515 B2 | Page 1 of 1 |
| APPLICATION NO. | : 11/134794 | |
| DATED | : November 18, 2008 | |
| INVENTOR(S) | : Lamkin et al. | |

It is certified that error appears in the above-identified patent and that said Letters Patent is hereby corrected as shown below:

In the Specification:
Column 1, line 41, delete "6,679,130" and insert --6,769,130--.

Signed and Sealed this

Twenty-fourth Day of March, 2009

JOHN DOLL
*Acting Director of the United States Patent and Trademark Office*